US008869144B2

(12) United States Patent
Pratt et al.

(10) Patent No.: US 8,869,144 B2
(45) Date of Patent: Oct. 21, 2014

(54) MANAGING FORWARDING OF INPUT EVENTS IN A VIRTUALIZATION ENVIRONMENT TO PREVENT KEYLOGGING ATTACKS

(75) Inventors: Ian Pratt, Cambridge (GB); Jean Guyader, Cambridge (GB); Vincent Hanquez, Cambridge (GB)

(73) Assignee: Citrix Systems, Inc., Fort Lauderdale, FL (US)

( * ) Notice: Subject to any disclaimer, the term of this patent is extended or adjusted under 35 U.S.C. 154(b) by 852 days.

(21) Appl. No.: 12/968,069

(22) Filed: Dec. 14, 2010

(65) Prior Publication Data
US 2011/0145820 A1 Jun. 16, 2011

Related U.S. Application Data

(60) Provisional application No. 61/286,263, filed on Dec. 14, 2009, provisional application No. 61/286,266,
(Continued)

(51) Int. Cl.
*G06F 9/455* (2006.01)
*G06F 9/44* (2006.01)
(Continued)

(52) U.S. Cl.
CPC ............ *G06F 21/629* (2013.01); *G06F 21/554* (2013.01); *G06F 9/45533* (2013.01); *G06F 2009/45587* (2013.01); *G06F 21/83* (2013.01); *G06F 2221/2101* (2013.01); *G06F 2221/2147* (2013.01); *G06F 21/556* (2013.01); *G06F 9/45558* (2013.01); *G06F 21/57* (2013.01); *G06F 21/53* (2013.01); *G06F 2221/2107* (2013.01); *G06F 21/31* (2013.01); *G06F 2221/2143* (2013.01); *G06F 2221/2115* (2013.01); *H04L 63/20* (2013.01); *G06F 21/79* (2013.01); *G06F 21/85* (2013.01)
USPC ...................... 718/1; 718/101; 726/2; 726/22

(58) Field of Classification Search
None
See application file for complete search history.

(56) References Cited

U.S. PATENT DOCUMENTS 4,887,202 A 12/1989 Tanaka et al.
5,900,024 A * 5/1999 Morearty ...................... 712/225
(Continued)

FOREIGN PATENT DOCUMENTS

CN 1700171 11/2005
KR 10775887 11/2007

OTHER PUBLICATIONS

Dubnicki, D. et al, Design and implementation of virtual memory-mapped communication on Myrinet, IN: the 11th international parallel processing symposium, Apr. 1-5, 1997, IEEE, pp. 388-396. (Dubnicki, D. et al) See abstract, chapter 2, and 4.5.

(Continued)

*Primary Examiner* — Emerson Puente
*Assistant Examiner* — Benjamin Wu
(74) *Attorney, Agent, or Firm* — Foley and Lardner LLP; John D. Lanza

(57) ABSTRACT

The methods and systems described herein provide functionality for managing injection of input events to one virtual machine of a plurality of guest virtual machines, in a computing device executing a hypervisor hosting a trusted virtual machine and a non-trusted virtual machine. An input manager receives a first item of input data from an input device communicating with the computing device. The input manager identifies whether the first item of input data includes a predetermined string. The input manager forwards, responsive to the identification, the first item of input data to one of (i) a first virtual machine of a plurality of guest virtual machines executed by the processor of the computing device and (ii) an application executed by the control virtual machine, wherein at least one virtual machine of the plurality of guest virtual machines is a trusted virtual machine.

18 Claims, 24 Drawing Sheets

Related U.S. Application Data filed on Dec. 14, 2009, provisional application No. 61/286,215, filed on Dec. 14, 2009, provisional application No. 61/286,216, filed on Dec. 14, 2009, provisional application No. 61/286,218, filed on Dec. 14, 2009, provisional application No. 61/286,636, filed on Dec. 15, 2009, provisional application No. 61/286,619, filed on Dec. 15, 2009.

(51) Int. Cl.

| | | |
|---|---|---|
| *G06F 21/00* | (2013.01) | |
| *G06F 21/55* | (2013.01) | |
| *G06F 21/83* | (2013.01) | |
| *G06F 21/57* | (2013.01) | |
| *G06F 21/62* | (2013.01) | |
| *G06F 21/53* | (2013.01) | |
| *G06F 21/31* | (2013.01) | |
| *H04L 29/06* | (2006.01) | |
| *G06F 21/79* | (2013.01) | |
| *G06F 21/85* | (2013.01) | |

(56) References Cited

U.S. PATENT DOCUMENTS

| | | | |
|---|---|---|---|
| 6,131,901 A | 10/2000 | Hirohata | |
| 6,453,392 B1 | 9/2002 | Flynn, Jr. | |
| 7,380,049 B2 | 5/2008 | Rajagopal et al. | |
| 7,716,377 B2 | 5/2010 | Harris et al. | |
| 7,757,231 B2 | 7/2010 | Anderson et al. | |
| 7,937,701 B2 | 5/2011 | Kinney et al. | |
| 8,099,274 B2 | 1/2012 | Bohizic et al. | |
| 8,145,836 B2 | 3/2012 | Nelson et al. | |
| 8,181,253 B1 | 5/2012 | Zaitsev et al. | |
| 8,261,320 B1 | 9/2012 | Serenyi et al. | |
| 2001/0034736 A1 | 10/2001 | Eylon et al. | |
| 2003/0126242 A1 | 7/2003 | Chang | |
| 2005/0091530 A1* | 4/2005 | Avraham et al. | 713/201 |
| 2005/0102671 A1 | 5/2005 | Baumberger | |
| 2005/0210158 A1 | 9/2005 | Cowperthwaite et al. | |
| 2005/0216920 A1 | 9/2005 | Tewari et al. | |
| 2005/0228921 A1 | 10/2005 | Sethi et al. | |
| 2005/0235068 A1 | 10/2005 | Moriki et al. | |
| 2005/0246453 A1 | 11/2005 | Erlingsson et al. | |
| 2005/0268095 A1 | 12/2005 | O'Connor | |
| 2006/0075264 A1* | 4/2006 | Willman et al. | 713/194 |
| 2006/0146057 A1 | 7/2006 | Blythe | |
| 2006/0200616 A1 | 9/2006 | Maliszewski | |
| 2006/0206702 A1 | 9/2006 | Fausak | |
| 2006/0256105 A1 | 11/2006 | Scarlata et al. | |
| 2007/0182714 A1* | 8/2007 | Pemmaraju | 345/168 |
| 2007/0240212 A1* | 10/2007 | Matalytski | 726/22 |
| 2008/0005320 A1* | 1/2008 | Chen | 709/224 |
| 2008/0091934 A1 | 4/2008 | Peterson et al. | |
| 2008/0126614 A1 | 5/2008 | Ooi et al. | |
| 2008/0172555 A1 | 7/2008 | Keenan | |
| 2009/0019442 A1* | 1/2009 | Liu | 718/102 |
| 2009/0089879 A1 | 4/2009 | Wang et al. | |
| 2009/0102838 A1 | 4/2009 | Bullard et al. | |
| 2009/0125902 A1 | 5/2009 | Ghosh et al. | |
| 2009/0172663 A1 | 7/2009 | Sahita et al. | |
| 2009/0204964 A1* | 8/2009 | Foley et al. | 718/1 |
| 2009/0210888 A1 | 8/2009 | Lee et al. | |
| 2009/0222814 A1 | 9/2009 | Astrand | |
| 2010/0011219 A1* | 1/2010 | Burton et al. | 713/182 |
| 2010/0174924 A1 | 7/2010 | Banga et al. | |
| 2011/0029699 A1* | 2/2011 | Siegman et al. | 710/38 |
| 2011/0047618 A1 | 2/2011 | Evans et al. | |
| 2011/0050712 A1 | 3/2011 | Jackson | |
| 2011/0141124 A1 | 6/2011 | Halls et al. | |
| 2012/0166653 A1 | 6/2012 | Twitchell | |
| 2012/0240224 A1* | 9/2012 | Payne et al. | 726/21 |
| 2012/0278818 A1 | 11/2012 | Green et al. | |

OTHER PUBLICATIONS

Ghodke; Virtualization Techniques to Enable Transparent Access to Peripheral Devices Across Networks, University of Florida 2004.
International Preliminary Report on Patentability on PCT/US2010/060309 dated Jun. 28, 2012.
International Preliminary Report on Patentability on PCT/US2010/060329 dated Jun. 28, 2012.
International Search Report on PCT/US2010/060309 dated Sep. 1, 2011.
International Search Report on PCT/US2010/060329 dated Aug. 30, 2011.
Notice of Allowance U.S. Appl. No. 12/967,358 dated Oct. 3, 2013.
Notice of Allowance on U.S. Appl. No. 12/967,348 dated Sep. 19, 2013.
Notice of Allowance on U.S. Appl. No. 12/967,362 dated Oct. 9, 2013.
Notice of Allowance on U.S. Appl. No. 12/968,066 dated Jun. 18, 2013.
Notice of Allowance on U.S. Appl. No. 12/968,082 dated Oct. 4, 2013.
Notice of Allowance on U.S. Appl. No. 12/968,084 dated Nov. 12, 2013.
Office Action on 09 U.S. Appl. No. 12/968,084 dated Nov. 13, 2012.
Office Action on U.S. Appl. No. 12/967,348 dated May 7, 2013.
Office Action on U.S. Appl. No. 12/967,348 dated Sep. 13, 2012.
Office Action on U.S. Appl. No. 12/967,358 dated Mar. 22, 2013.
Office Action on U.S. Appl. No. 12/967,358 dated Aug. 24, 2012.
Office Action on U.S. Appl. No. 12/967,362 dated Jun. 18, 2013.
Office Action on U.S. Appl. No. 12/968,066 dated Dec. 12, 2012.
Office Action on U.S. Appl. No. 12/968,077 dated Oct. 28, 2013.
Office Action on U.S. Appl. No. 12/968,077 dated Jun. 19, 2013.
Office Action on U.S. Appl. No. 12/968,082 dated Jun. 12, 2013.
Office Action on U.S. Appl. No. 12/968,084 dated May 23, 2013.
Office Action on U.S. Appl. No. 12/968,091 dated Dec. 2, 2013.
Office Action on U.S. Appl. No. 12/968,091 dated Apr. 8, 2013.
Office Action on U.S. Appl. No. 12/968,091 dated Sep. 11, 2013.
Okhravi, H. and Nicol, D., TrustGraph: Trusted Graphics Subsystem for High Assurance Systems, In ACSAC '09: Proceedings of the 2009 Annual Computer Security Applications Conference (Washington, DC, USA, 2009), IEEE Computer Society, pp. 254-265.
Written Opinion on PCT/US2010/060309 dated Sep. 1, 2011.
Written Opinion on PCT/US2010/060329 dated Aug. 30, 2011.
Chinese Office Action on 201080063762.6 dated Apr. 25, 2014.
Office Action on U.S. Appl. No. 12/968,091 dated May 27, 2014.

* cited by examiner

MANAGING FORWARDING OF INPUT EVENTS IN A VIRTUALIZATION ENVIRONMENT TO PREVENT KEYLOGGING ATTACKS

RELATED APPLICATIONS

This present application claims the benefit of and priority to: U.S. Provisional Patent Application No. 61/286,263 entitled "Methods and Systems for Managing Injection of Input Data into a Virtualization Environment," filed Dec. 14, 2009; U.S. Provisional Patent Application No. 61/286,215 entitled "Methods and Systems for Providing, to Virtual Machines, via a Designated Wireless Local Area Network Driver, Access to Data Associated With a Connection to a Wireless Local Area Network," filed Dec. 14, 2009; U.S. Provisional Patent Application No. 61/286,266 entitled "Virtual Firmware Servicing Interrupts Generated Responsive to Actuation of Hardware," filed Dec. 14, 2009; U.S. Provisional Patent Application No. 61/286,216 entitled "Methods and Systems for Allocating a USB Device to a Secure Virtual Machine or an Unsecure Virtual Machine," filed Dec. 14, 2009; U.S. Provisional Patent Application No. 61/286,218 entitled "Drive Manager Controlling Virtual Machine Access to an Optical Disk Drive," filed Dec. 14, 2009; U.S. Provisional Patent Application No. 61/286,636 entitled "Methods and Systems for Communicating Between Secure and Unsecure Virtual Machines," filed Dec. 15, 2009; and U.S. Provisional Patent Application No. 61/286,619 entitled "Methods and Systems for Preventing Access to Display Graphics Generated by a Secure Virtual Machine," filed Dec. 15, 2009; all of which are incorporated by reference in their entirety.

FIELD OF THE INVENTION

The present disclosure relates to virtualization technology and virtual machines hosted by a hypervisor. In particular, the present disclosure relates to methods and systems for managing injection of input data into a virtualization environment.

BACKGROUND OF THE INVENTION

As the number of mobile employees, remote employees, guest employees and task-based employees increases, so does the need for computing systems that restrict the information available to each type of employee, and isolate an employee's personal data from work-related data. Many companies provide their employees with laptops, remote access to the company's intranet, remote access to applications used by an employee, remote access to an employee's files, and access to remote desktops, virtual machines, or remote applications. In many instances, employees can access company resources from any geographical location, using any machine and/or network.

Some companies can provide their employees with machines that can be used to access company resources. In some instances, these machines can execute one or more hypervisors that can manage virtual machines dedicated to executing company applications and accessing company resources. A computer having this type of configuration can sometimes lack a host operating system. Furthermore, a user may be restricted from accessing personal resources while logged into a work-issued virtual machine or virtual desktop. Thus, a user may need an additional virtual machine within which the user can access personal resources and programs. In some systems, when accessing personal resources and programs, a user may be prevented from accessing company resources. Likewise, when functioning within a company-specific virtual machine or virtual desktop, the user may be prevented from accessing personal resources and programs.

BRIEF SUMMARY OF THE INVENTION

In one embodiment, the methods and systems described herein provide various functionality for managing and allocating resources interacting in virtual machines. Specifically, the methods and systems described herein are directed to methods and systems for managing injection of input data into a virtualization environment. In one aspect, the present disclosure is directed to a method for managing forwarding of input events to one virtual machine of a plurality of guest virtual machines, in a computing device executing a hypervisor hosting a trusted virtual machine and a non-trusted virtual machine. The method includes receiving, by an input manager executed by a hypervisor executed by a processor of a computing device, a first item of input data from an input device communicating with the computing device. The method also includes identifying, by the input manager, whether the first item of input data includes a predetermined string. The method further includes forwarding, by the input manager and responsive to the identification, the first item of input data to one of (i) a first virtual machine of a plurality of guest virtual machines executed by the processor of the computing device and (ii) an application executed by the control virtual machine, wherein at least one virtual machine of the plurality of guest virtual machines is a trusted virtual machine.

In one embodiment, the first item of input data includes a predetermined string comprising a secure key combination; and the method includes forwarding the first item of input data to an application executed by the hypervisor. In another embodiment, the first virtual machine of the plurality of guest virtual machines is a trusted virtual machine, and the method includes determining whether a window generated by an application executed by the first virtual machine has focus; and forwarding the first item of input data responsive to the determination. In a further embodiment, the window generated by the application has focus and the first item of input data does not include the predetermined string, and the method includes forwarding the first item of input data to the trusted virtual machine. In another further embodiment, the window generated by the application does not have focus and the first item of input data includes the predetermined string, and the method includes forwarding the first item of input data to the trusted virtual machine. In yet another further embodiment, the method includes generating a visual indicator to indicate that the input data is forwarded to the trusted virtual machine.

In another embodiment, the first virtual machine of the plurality of guest virtual machines is a non-trusted virtual machine and a second virtual machine of the plurality of guest virtual machines is a trusted virtual machine, and the method includes determining whether a window generated by an application executed by the trusted virtual machine has focus; forwarding the first item of input data responsive to the determination. In a further embodiment, the window generated by the application has focus and the first item of input data includes the predetermined string, and the method includes forwarding the first item of input data to the non-trusted virtual machine. In another further embodiment, the window generated by the application does not have focus and the first item of input data does not include the predetermined string, and the method includes forwarding the first item of input data to the non-trusted virtual machine.

In another aspect, the present disclosure is directed to a system for managing forwarding of input events to one virtual machine of a plurality of guest virtual machines, in a computing device executing a hypervisor hosting a trusted virtual machine and a non-trusted virtual machine. The system includes a computing device comprising a processor executing a hypervisor, a control virtual machine, a plurality of guest virtual machines, and an input manager. The system also includes an input device communicating with the computing device. The input manager is configured to receive a first item of input data from an input device communicating with the computing device, identify whether the first item of input data includes a predetermined string, and forward, responsive to the identification, the first item of input data to one of (i) a first virtual machine of the plurality of guest virtual machines and (ii) an application executed by the control virtual machine, wherein at least one virtual machine of the plurality of guest virtual machines is a trusted virtual machine.

In one embodiment of the system, the first item of input data includes a predetermined string comprising a secure key combination; and the input manager is configured to forward the first item of input data to an application executed by the hypervisor. In another embodiment of the system, the first virtual machine of the plurality of guest virtual machines is a trusted virtual machine, and the input manager is further configured to determine whether a window generated by an application executed by the first virtual machine has focus, and forward the first item of input data, responsive to the determination. In yet another embodiment of the system, the window generated by the application has focus and the first item of input data does not include the predetermined string, and the input manager is further configured to forward the first item of input data to the trusted virtual machine. In yet still another further embodiment of the system, the window generated by the application does not have focus and the first item of input data includes the predetermined string, and the input manager is further configured to forward the first item of input data to the trusted virtual machine. In some embodiments of the system, the input manager is further configured to generate a visual indicator to indicate that the input data is forwarded to the trusted virtual machine.

In another embodiment of the system, the first virtual machine of the plurality of guest virtual machines is a non-trusted virtual machine and a second virtual machine of the plurality of guest virtual machines is a trusted virtual machine, and the input manager is further configured to determine whether a window generated by an application executed by the trusted virtual machine has focus; and forward the first item of input data responsive to the determination. In a further embodiment of the system, the window generated by the application has focus and the first item of input data includes the predetermined string, and the input manager is further configured to forward the first item of input data to the non-trusted virtual machine. In another further embodiment of the system, the window generated by the application does not have focus and the first item of input data does not include the predetermined string, and the input manager is further configured to forward the first item of input data to the non-trusted virtual machine.

The details of various embodiments of the invention are set forth in the accompanying drawings and the description below.

BRIEF DESCRIPTION OF THE FIGURES

The foregoing and other objects, aspects, features, and advantages of the disclosure will become more apparent and better understood by referring to the following description taken in conjunction with the accompanying drawings, in which.

Figure 1A:
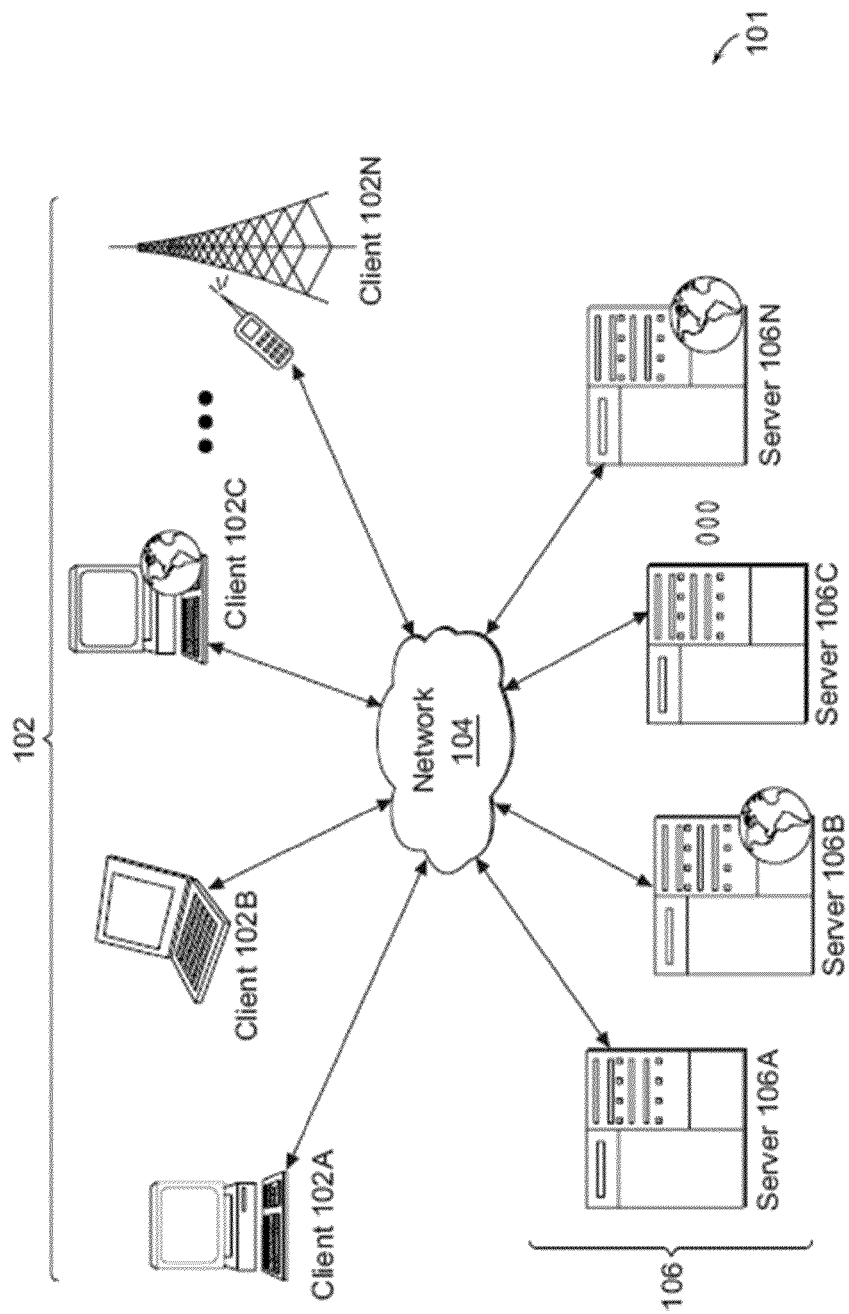
FIG. 1A is a block diagram depicting an embodiment of a network environment comprising local machines in communication with remote machines.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION OF THE INVENTION

For purposes of reading the description of the various embodiments below, the following descriptions of the sections of the specification and their respective contents may be helpful:
Section A describes a network environment and computing environment which may be useful for practicing embodiments described herein;
Section B describes embodiments of systems including a virtualization environment which may be useful for practicing embodiments described herein;
Section C describes embodiments of systems and methods for communication between trusted and non-trusted virtual machines;
Section D describes embodiments of systems and methods for managing injection of input data into a virtualization environment;
Section E describes embodiments of systems and methods for servicing interrupts generated responsive to actuation of hardware via virtual firmware;
Section F describes embodiments of systems and methods for allocating a universal serial bus (USB) device to a trusted virtual machine or a non-trusted virtual machine;
Section G describes embodiments of systems and methods for controlling virtual machine access to an optical disc drive;
Section H describes embodiments of systems and methods for providing to virtual machines, via a designated wireless local area network driver, access to data associated with a connection to a wireless local area network;
Section I describes embodiments of systems and methods for preventing access to display graphics generated by a trusted virtual machine; and
Section J describes embodiments of systems and methods for securing sensitive information using a hypervisor-trusted client.

A. Network and Computing Environment

Referring now to FIG. 1A, an embodiment of a network environment is depicted. In brief overview, the network environment comprises one or more local machines 102a-102n (also generally referred to as local machine(s) 102, client(s) 102, client node(s) 102, client machine(s) 102, client computer(s) 102, client device(s) 102, endpoint(s) 102, or endpoint node(s) 102) in communication with one or more remote machines 106a-106n (also generally referred to as server(s) 106 or remote machine(s) 106) via one or more networks 104. In some embodiments, a local machine 102 has the capacity to function as both a client node seeking access to resources provided by a server and as a server providing access to hosted resources for other clients 102a-102n.

Although FIG. 1A shows a network 104 between the local machines 102 and the remote machines 106, the local machines 102 and the remote machines 106 may be on the same network 104. The network 104 can be a local-area network (LAN), such as a company Intranet, a metropolitan area network (MAN), or a wide area network (WAN), such as the Internet or the World Wide Web. In some embodiments, there are multiple networks 104 between the local machines 102 and the remote machines 106. In one of these embodiments, a network 104' (not shown) may be a private network and a network 104 may be a public network. In another of these embodiments, a network 104 may be a private network and a network 104' a public network. In still another embodiment, networks 104 and 104' may both be private networks. In yet another embodiment, networks 104 and 104' may both be public networks.

The network 104 may be any type and/or form of network and may include any of the following: a point to point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. In some embodiments, the network 104 may comprise a wireless link, such as an infrared channel or satellite band. The topology of the network 104 may be a bus, star, or ring network topology. The network 104 may be of any such network topology as known to those ordinarily skilled in the art capable of supporting the operations described herein. The network may comprise mobile telephone networks utilizing any protocol or protocols used to communicate among mobile devices, including AMPS, TDMA, CDMA, GSM, GPRS or UMTS. In some embodiments, different types of data may be transmitted via different protocols. In other embodiments, the same types of data may be transmitted via different protocols.

In some embodiments, the system may include multiple, logically-grouped remote machines 106. In one of these embodiments, the logical group of remote machines may be referred to as a server farm. In another of these embodiments, the remote machines 106 may be geographically dispersed. In other embodiments, a server farm may be administered as a single entity. In still other embodiments, the server farm comprises a plurality of server farms. The remote machines 106 within each server farm can be heterogeneous—one or more of the remote machines 106 can operate according to one type of operating system platform (e.g., WINDOWS NT, WINDOWS 2003, WINDOWS 2008, WINDOWS 7 and WINDOWS Server 2008 R2, all of which are manufactured by Microsoft Corp. of Redmond, Wash.), while one or more of the other remote machines 106 can operate on according to another type of operating system platform (e.g., Unix or Linux).

The remote machines 106 of each server farm do not need to be physically proximate to another remote machine 106 in the same server farm. Thus, the group of remote machines 106 logically grouped as a server farm may be interconnected using a wide-area network (WAN) connection or a metropolitan-area network (MAN) connection. For example, a server farm 38 may include remote machines 106 physically located in different continents or different regions of a continent, country, state, city, campus, or room. Data transmission speeds between remote machines 106 in the server farm can be increased if the remote machines 106 are connected using a local-area network (LAN) connection or some form of direct connection.

A remote machine 106 may be a file server, application server, web server, proxy server, appliance, network appliance, gateway, application gateway, gateway server, virtualization server, deployment server, SSL VPN server, or firewall. In some embodiments, a remote machine 106 provides a remote authentication dial-in user service, and is referred to as a RADIUS server. In other embodiments, a remote machine 106 may have the capacity to function as either an application server or as a master application server. In still other embodiments, a remote machine 106 is a blade server. In yet other embodiments, a remote machine 106 executes a virtual machine providing, to a user or client computer 102, access to a computing environment.

In one embodiment, a remote machine 106 may include an Active Directory. The remote machine 106 may be an application acceleration appliance. For embodiments in which the remote machine 106 is an application acceleration appliance, the remote machine 106 may provide functionality including firewall functionality, application firewall functionality, or load balancing functionality. In some embodiments, the remote machine 106 comprises an appliance such as one of the line of appliances manufactured by the Citrix Application Networking Group, of San Jose, Calif., or Silver Peak Systems, Inc., of Mountain View, Calif., or of Riverbed Technology, Inc., of San Francisco, Calif., or of F5 Networks, Inc., of Seattle, Wash., or of Juniper Networks, Inc., of Sunnyvale, Calif.

In some embodiments, a remote machine 106 executes an application on behalf of a user of a local machine 102. In other embodiments, a remote machine 106 executes a virtual machine, which provides an execution session within which applications execute on behalf of a user of a local machine 102. In one of these embodiments, the execution session is a hosted desktop session. In another of these embodiments, the execution session provides access to a computing environment, which may comprise one or more of: an application, a plurality of applications, a desktop application, and a desktop session in which one or more applications may execute.

In some embodiments, a local machine 102 communicates with a remote machine 106. In one embodiment, the local machine 102 communicates directly with one of the remote machines 106 in a server farm 38. In another embodiment, the local machine 102 executes a program neighborhood application to communicate with a remote machine 106 in a server farm 38. In still another embodiment, the remote machine 106 provides the functionality of a master node. In some embodiments, the local machine 102 communicates with the remote machine 106 in the server farm 38 through a network 104. Over the network 104, the local machine 102 can, for example, request execution of various applications hosted by the remote machines 106a-106n in the server farm 38 and receive output of the results of the application execution for display. In some embodiments, only a master node provides the functionality required to identify and provide address information associated with a remote machine 106b hosting a requested application.

In one embodiment, the remote machine 106 provides the functionality of a web server. In another embodiment, the remote machine 106a receives requests from the local machine 102, forwards the requests to a second remote machine 106b and responds to the request by the local machine 102 with a response to the request from the remote machine 106b. In still another embodiment, the remote machine 106a acquires an enumeration of applications available to the local machine 102 and address information associated with a remote machine 106b hosting an application identified by the enumeration of applications. In yet another embodiment, the remote machine 106 presents the response to the request to the local machine 102 using a web interface. In one embodiment, the local machine 102 communicates directly with the remote machine 106 to access the identified application. In another embodiment, the local machine 102 receives output data, such as display data, generated by an execution of the identified application on the remote machine 106.

In some embodiments, the remote machine 106 or a server farm 38 may be running one or more applications, such as an application providing a thin-client computing or remote display presentation application. In one embodiment, the remote machine 106 or server farm 38 executes as an application any portion of the CITRIX ACCESS SUITE by Citrix Systems, Inc., such as the METAFRAME or CITRIX PRESENTATION SERVER products, any of the following products manufactured by Citrix Systems, Inc.: CITRIX XENAPP, CITRIX XENDESKTOP, CITRIX ACCESS GATEWAY, and/or any of the MICROSOFT WINDOWS Terminal Services manufactured by the Microsoft Corporation. In another embodiment, the application is an ICA client, developed by Citrix Systems, Inc. of Fort Lauderdale, Fla. In still another embodiment, the remote machine 106 may run an application, which, for example, may be an application server providing email services such as MICROSOFT EXCHANGE manufactured by the Microsoft Corporation of Redmond, Wash., a web or Internet server, or a desktop sharing server, or a collaboration server. In yet another embodiment, any of the applications may comprise any type of hosted service or products, such as GOTOMEETING provided by Citrix Online Division, Inc. of Santa Barbara, Calif., WEBEX provided by WebEx, Inc. of Santa Clara, Calif., or Microsoft Office LIVE MEETING provided by Microsoft Corporation of Redmond, Wash.

A local machine 102 may execute, operate or otherwise provide an application, which can be any type and/or form of software, program, or executable instructions such as any type and/or form of web browser, web-based client, client-server application, a thin-client computing client, an ActiveX control, or a Java applet, or any other type and/or form of executable instructions capable of executing on local machine 102. In some embodiments, the application may be a server-based or a remote-based application executed on behalf of the local machine 102 on a remote machine 106. In other embodiments, the remote machine 106 may display output to the local machine 102 using any thin-client protocol, presentation layer protocol, or remote-display protocol, such as the Independent Computing Architecture (ICA) protocol manufactured by Citrix Systems, Inc. of Ft. Lauderdale, Fla.; the Remote Desktop Protocol (RDP) manufactured by the Microsoft Corporation of Redmond, Wash.; the X11 protocol; the Virtual Network Computing (VNC) protocol, manufactured by AT&T Bell Labs; the SPICE protocol, manufactured by Qumranet, Inc., of Sunnyvale, Calif., USA, and of Raanana, Israel; the Net2 Display protocol, manufactured by VESA, of Milpitas, Calif.; the PC-over-IP protocol, manufactured by Teradici Corporation, of Burnaby, B.C.; the TCX protocol, manufactured by Wyse Technology, Inc., of San Jose, Calif.; the THINC protocol developed by Columbia University in the City of New York, of New York, N.Y.; or the Virtual-D protocols manufactured by Desktone, Inc., of Chelmsford, Mass. The application can use any type of protocol and it can be, for example, an HTTP client, an FTP client, an Oscar client, or a Telnet client. In still other embodiments, the application comprises any type of software related to voice over Internet protocol (VoIP) communications, such as a soft IP telephone. In further embodiments, the application comprises any application related to real-time data communications, such as applications for streaming video and/or audio.

The local machine 102 and remote machine 106 may be deployed as and/or executed on any type and form of computing device, such as a computer, network device or appliance capable of communicating on any type and form of network and performing the operations described herein.

Figure 1B:
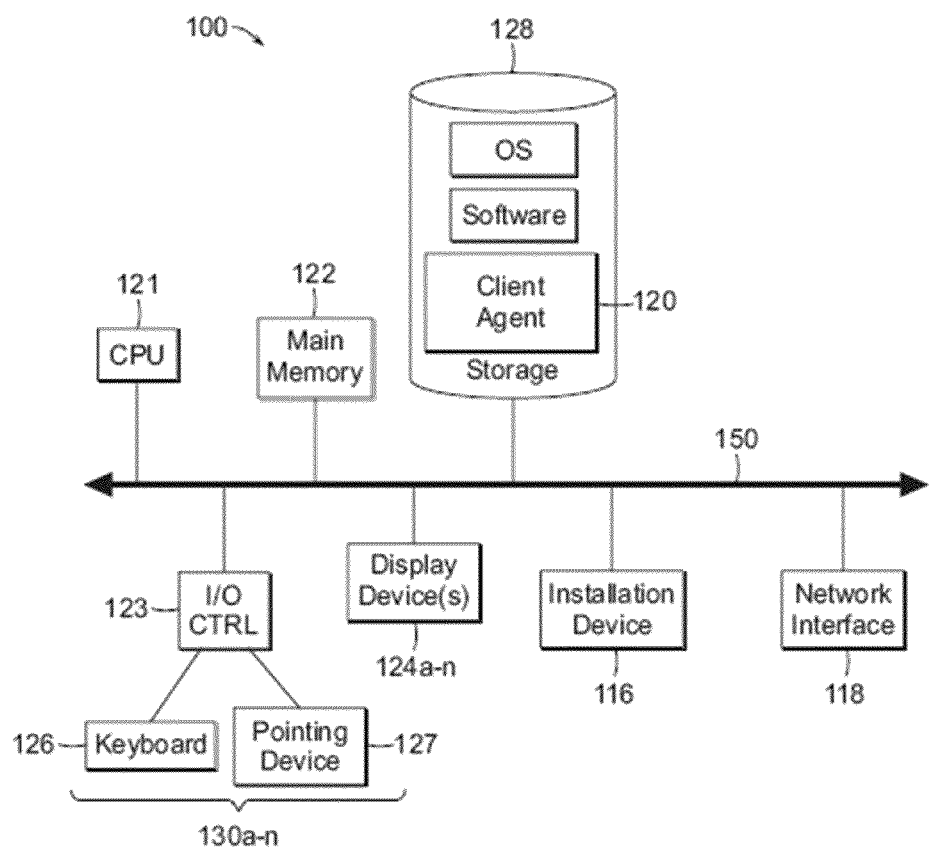
FIGS. 1B-1E are block diagrams depicting embodiments of computers useful in connection with the methods and systems described herein.
Figure 1C:
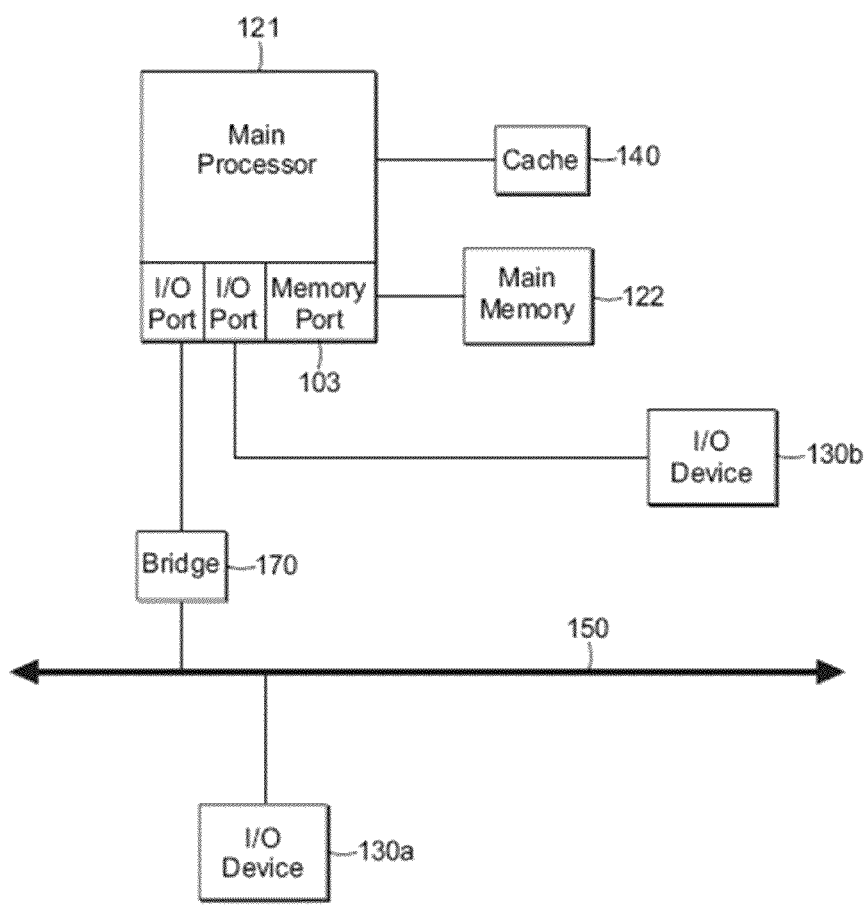

FIGS. 1B and 1C depict block diagrams of a computing device 100 useful for practicing an embodiment of the local machine 102 or a remote machine 106. As shown in FIGS. 1B and 1C, each computing device 100 includes a central processing unit 121, and a main memory unit 122. As shown in FIG. 1B, a computing device 100 may include a storage device 128, an installation device 116, a network interface 118, an I/O controller 123, display devices 124a-n, a keyboard 126 and a pointing device 127, such as a mouse. The storage device 128 may include, without limitation, an operating system, software, and a client agent 120. As shown in FIG. 1C, each computing device 100 may also include additional optional elements, such as a memory port 103, a bridge 170, one or more input/output devices 130a-130n (generally referred to using reference numeral 130), and a cache memory 140 in communication with the central processing unit 121.

The central processing unit 121 is any logic circuitry that responds to and processes instructions fetched from the main memory unit 122. In many embodiments, the central processing unit 121 is provided by a microprocessor unit, such as: those manufactured by Intel Corporation of Mountain View, Calif.; those manufactured by Motorola Corporation of Schaumburg, Ill.; those manufactured by Transmeta Corporation of Santa Clara, Calif.; the RS/6000 processor, those manufactured by International Business Machines of White Plains, N.Y.; or those manufactured by Advanced Micro Devices of Sunnyvale, Calif. The computing device 100 may be based on any of these processors, or any other processor capable of operating as described herein.

Main memory unit 122 may be one or more memory chips capable of storing data and allowing any storage location to be directly accessed by the microprocessor 121, such as Static random access memory (SRAM), Burst SRAM or Synch-Burst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC 100 SDRAM, Double Data Rate SDRAM (DDR SDRAM), Enhanced SDRAM (ESDRAM), SyncLink DRAM (SLDRAM), Direct Rambus DRAM (DRDRAM), or Ferroelectric RAM (FRAM). The main memory 122 may be based on any of the above described memory chips, or any other available memory chips capable of operating as described herein. In the embodiment shown in FIG. 1B, the processor 121 communicates with main memory 122 via a system bus 150 (described in more detail below). FIG. 1C depicts an embodiment of a computing device 100 in which the processor communicates directly with main memory 122 via a memory port 103. For example, in FIG. 1C the main memory 122 may be DRDRAM.

FIG. 1C depicts an embodiment in which the main processor 121 communicates directly with cache memory 140 via a secondary bus, sometimes referred to as a backside bus. In other embodiments, the main processor 121 communicates with cache memory 140 using the system bus 150. Cache memory 140 typically has a faster response time than main memory 122 and is typically provided by SRAM, BSRAM, or EDRAM. In the embodiment shown in FIG. 1B, the processor 121 communicates with various I/O devices 130 via a local system bus 150. Various buses may be used to connect the central processing unit 121 to any of the I/O devices 130, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 124, the processor 121 may use an Advanced Graphics Port (AGP) to communicate with the display 124. FIG. 1C depicts an embodiment of a computer 100 in which the main processor 121 communicates directly with I/O device 130b via HYPERTRANSPORT, RAPIDIO, or INFINIBAND communications technology. FIG. 1C also depicts an embodiment in which local busses and direct communication are mixed: the processor 121 communicates with I/O device 130a using a local interconnect bus while communicating with I/O device 130b directly.

A wide variety of I/O devices 130a-130n may be present in the computing device 100. Input devices include keyboards, mice, trackpads, trackballs, microphones, and drawing tablets. Output devices include video displays, speakers, inkjet printers, laser printers, and dye-sublimation printers. An I/O controller 123, as shown in FIG. 1B, may control the I/O devices. The I/O controller may control one or more I/O devices such as a keyboard 126 and a pointing device 127, e.g., a mouse or optical pen. Furthermore, an I/O device may also provide storage and/or an installation medium 116 for the computing device 100. In still other embodiments, the computing device 100 may provide USB connections (not shown) to receive handheld USB storage devices such as the USB Flash Drive line of devices manufactured by Twintech Industry, Inc. of Los Alamitos, Calif.

Referring again to FIG. 1B, the computing device 100 may support any suitable installation device 116, such as a floppy disk drive for receiving floppy disks such as 3.5-inch, 5.25-inch disks or ZIP disks, a CD-ROM drive, a CD-R/RW drive, a DVD-ROM drive, tape drives of various formats, USB device, hard-drive or any other device suitable for installing software and programs. The computing device 100 may further comprise a storage device, such as one or more hard disk drives or redundant arrays of independent disks, for storing an operating system and other related software, and for storing application software programs such as any program related to the client agent 120. Optionally, any of the installation devices 116 could also be used as the storage device. Additionally, the operating system and the software can be run from a bootable medium, for example, a bootable CD, such as KNOPPIX, a bootable CD for GNU/Linux that is available as a GNU/Linux distribution from knoppix.net.

Furthermore, the computing device 100 may include a network interface 118 to interface to the network 104 through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, CDMA, GSM, WiMax and direct asynchronous connections). In one embodiment, the computing device 100 communicates with other computing devices 100' via any type and/or form of gateway or tunneling protocol such as Secure Socket Layer (SSL) or Transport Layer Security (TLS), or the Citrix Gateway Protocol manufactured by Citrix Systems, Inc. of Ft. Lauderdale, Fla. The network interface 118 may comprise a built-in network adapter, network interface card, PCMCIA network card, card bus network adapter, wireless network adapter, USB network adapter, modem or any other device suitable for interfacing the computing device 100 to any type of network capable of communication and performing the operations described herein.

In some embodiments, the computing device 100 may comprise or be connected to multiple display devices 124a-124n, which each may be of the same or different type and/or form. As such, any of the I/O devices 130a-130n and/or the I/O controller 123 may comprise any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect or otherwise use the display devices 124a-124n. In one embodiment, a video adapter may comprise multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices, such as computing devices 100a and 100b connected to the computing device 100, for example, via a network. These embodiments may include any type of software designed and constructed to use another computer's display device as a second display device 124a for the computing device 100. One ordinarily skilled in the art will recognize and appreciate the various ways and embodiments that a computing device 100 may be configured to have multiple display devices 124a-124n.

In further embodiments, an I/O device 130 may be a bridge between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a Fibre-Channel bus, or a Serial Attached small computer system interface bus.

A computing device 100 of the sort depicted in FIGS. 1B and 1C typically operates under the control of operating systems, which control scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 3.x, WINDOWS 95, WINDOWS 98, WINDOWS 2000, WINDOWS NT 3.51, WINDOWS NT 4.0, WINDOWS 7, WINDOWS CE, WINDOWS XP, and WINDOWS VISTA, all of which are manufactured by Microsoft Corporation of Redmond, Wash.; MAC OS, manufactured by Apple Inc., of Cupertino, Calif.; OS/2, manufactured by International Business Machines of Armonk, N.Y.; and Linux, a freely-available operating system distributed by Caldera Corp. of Salt Lake City, Utah, or any type and/or form of a Unix operating system, among others.

The computing device 100 can be any workstation, desktop computer, laptop or notebook computer, server, handheld computer, mobile telephone or other portable telecommunication device, media playing device, a gaming system, mobile computing device, or any other type and/or form of computing, telecommunications or media device that is capable of communication and that has sufficient processor power and memory capacity to perform the operations described herein. For example, the computing device 100 may comprise a device of the IPOD family of devices manufactured by Apple Inc., of Cupertino, Calif., a PLAYSTATION 2, PLAYSTATION 3, or PERSONAL PLAYSTATION PORTABLE (PSP) device manufactured by the Sony Corporation of Tokyo, Japan, a NINTENDO DS, NINTENDO GAMEBOY, NINTENDO GAMEBOY ADVANCED or NINTENDO REVOLUTION device manufactured by Nintendo Co., Ltd., of Kyoto, Japan, or an XBOX or XBOX 360 device manufactured by the Microsoft Corporation of Redmond, Wash.

In some embodiments, the computing device 100 may have different processors, operating systems, and input devices consistent with the device. For example, in one embodiment, the computing device 100 is a TREO 180, 270, 600, 650, 680, 700p, 700w/wx, 750, 755p, 800w, Centro, or Pro smart phone manufactured by Palm, Inc. In some of these embodiments, the TREO smart phone is operated under the control of the PalmOS operating system and includes a stylus input device as well as a five-way navigator device.

In other embodiments the computing device 100 is a mobile device, such as a JAVA-enabled cellular telephone or personal digital assistant (PDA), such as the i55sr, i58sr, i85s, i88s, i90c, i95cl, i335, i365, i570, I576, i580, i615, i760, i836, i850, i870, i880, i920, i930, ic502, ic602, ic902, i776 or the im1100, all of which are manufactured by Motorola Corp. of Schaumburg, Ill., the 6035 or the 7135, manufactured by Kyocera of Kyoto, Japan, or the i300 or i330, manufactured by Samsung Electronics Co., Ltd., of Seoul, Korea. In some embodiments, the computing device 100 is a mobile device manufactured by Nokia of Finland, or by Sony Ericsson Mobile Communications AB of Lund, Sweden.

In still other embodiments, the computing device 100 is a Blackberry handheld or smart phone, such as the devices manufactured by Research In Motion Limited, including the Blackberry 7100 series, 8700 series, 7700 series, 7200 series, the Blackberry 7520, the Blackberry PEARL 8100, the 8700 series, the 8800 series, the Blackberry Storm, Blackberry Bold, Blackberry Curve 8900, and the Blackberry Pearl Flip. In yet other embodiments, the computing device 100 is a smart phone, Pocket PC, Pocket PC Phone, or other handheld mobile device supporting Microsoft Windows Mobile Software. Moreover, the computing device 100 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

In some embodiments, the computing device 100 is a digital audio player. In one of these embodiments, the computing device 100 is a digital audio player such as the Apple IPOD, IPOD Touch, IPOD NANO, and IPOD SHUFFLE lines of devices, manufactured by Apple Inc., of Cupertino, Calif. In another of these embodiments, the digital audio player may function as both a portable media player and as a mass storage device. In other embodiments, the computing device 100 is a digital audio player such as the DigitalAudioPlayer Select MP3 players, manufactured by Samsung Electronics America, of Ridgefield Park, N.J., or the Motorola m500 or m25 Digital Audio Players, manufactured by Motorola Inc. of Schaumburg, Ill. In still other embodiments, the computing device 100 is a portable media player, such as the Zen Vision W, the Zen Vision series, the Zen Portable Media Center devices, or the Digital MP3 line of MP3 players, manufactured by Creative Technologies Ltd. In yet other embodiments, the computing device 100 is a portable media player or digital audio player supporting file formats including, but not limited to, MP3, WAV, M4A/AAC, WMA Protected AAC, RIFF, Audible audiobook, Apple Lossless audio file formats and .mov, .m4v, and .mp4MPEG-4 (H.264/MPEG-4 AVC) video file formats.

In some embodiments, the computing device 100 comprises a combination of devices, such as a mobile phone combined with a digital audio player or portable media player. In one of these embodiments, the computing device 100 is a Motorola RAZR or Motorola ROKR line of combination digital audio players and mobile phones. In another of these embodiments, the computing device 100 is a device in the iPhone line of smartphones, manufactured by Apple Inc., of Cupertino, Calif.

In one embodiment, a computing device 102a may request resources from a remote machine 106, while providing the functionality of a remote machine 106 to a client 102b. In such an embodiment, the computing device 102a may be referred to as a client with respect to data received from the remote machine 106 (which may be referred to as a server) and the computing device 102a may be referred to as a server with respect to the second client 102b. In another embodiment, the client 102 may request resources from the remote machine 106 on behalf of a user of the client 102.

Figure 1D:
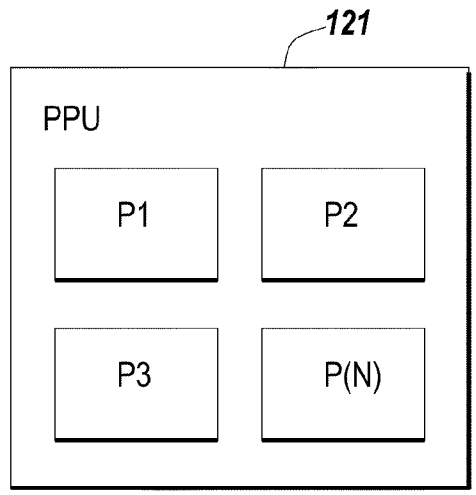

As shown in FIG. 1D, the computing device 100 may comprise multiple processors and may provide functionality for simultaneous execution of instructions or for simultaneous execution of one instruction on more than one piece of data. In some embodiments, the computing device 100 may comprise a parallel processor with one or more cores. In one of these embodiments, the computing device 100 is a shared memory parallel device, with multiple processors and/or multiple processor cores, accessing all available memory as a single global address space. In another of these embodiments, the computing device 100 is a distributed memory parallel device with multiple processors each accessing local memory only. In still another of these embodiments, the computing device 100 has both some memory which is shared and some memory which can only be accessed by particular processors or subsets of processors. In still even another of these embodiments, the computing device 100, such as a multicore microprocessor, combines two or more independent processors into a single package, often a single integrated circuit (IC). In yet another of these embodiments, the computing device 100 includes a chip having a CELL BROADBAND ENGINE architecture and including a Power processor element and a plurality of synergistic processing elements, the Power processor element and the plurality of synergistic processing elements linked together by an internal high speed bus, which may be referred to as an element interconnect bus.

In some embodiments, the processors provide functionality for execution of a single instruction simultaneously on multiple pieces of data (SIMD). In other embodiments, the processors provide functionality for execution of multiple instructions simultaneously on multiple pieces of data (MIMD). In still other embodiments, the processor may use any combination of SIMD and MIMD cores in a single device.

Figure 1E:
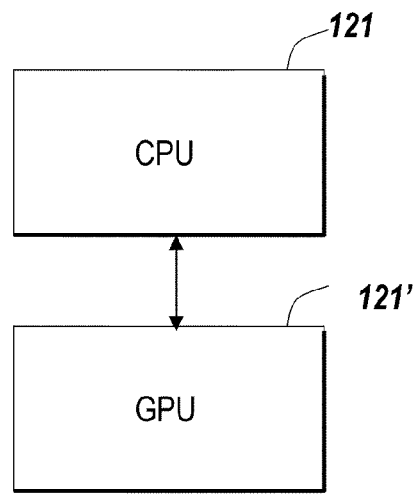

In some embodiments, the computing device 100 may comprise a graphics processing unit. In one of these embodiments, depicted in FIG. 1E, the computing device 100 includes at least one central processing unit 121 and at least one graphics processing unit. In another of these embodiments, the computing device 100 includes at least one parallel processing unit and at least one graphics processing unit. In still another of these embodiments, the computing device 100 includes a plurality of processing units of any type, one of the plurality of processing units comprising a graphics processing unit.

In one embodiment, a resource may be a program, an application, a document, a file, a plurality of applications, a plurality of files, an executable program file, a desktop environment, a computing environment, or other resource made available to a user of the local computing device 102. The resource may be delivered to the local computing device 102 via a plurality of access methods including, but not limited to, conventional installation directly on the local computing device 102, delivery to the local computing device 102 via a method for application streaming, delivery to the local computing device 102 of output data generated by an execution of the resource on a third computing device 106b and communicated to the local computing device 102 via a presentation layer protocol, delivery to the local computing device 102 of output data generated by an execution of the resource via a virtual machine executing on a remote computing device 106, or execution from a removable storage device connected to the local computing device 102, such as a USB device, or via a virtual machine executing on the local computing device 102 and generating output data. In some embodiments, the local computing device 102 transmits output data generated by the execution of the resource to another client computing device 102b.

In some embodiments, a user of a local computing device 102 connects to a remote computing device 106 and views a display on the local computing device 102 of a local version of a remote desktop environment, comprising a plurality of data objects, generated on the remote computing device 106. In one of these embodiments, at least one resource is provided to the user by the remote computing device 106 (or by a second remote computing device 106b) and displayed in the remote desktop environment. However, there may be resources that the user executes on the local computing device 102, either by choice, or due to a policy or technological requirement. In another of these embodiments, the user of the local computing device 102 would prefer an integrated desktop environment providing access to all of the resources available to the user, instead of separate desktop environments for resources provided by separate machines. For example, a user may find navigating between multiple graphical displays confusing and difficult to use productively. Or, a user may wish to use the data generated by one application provided by one machine in conjunction with another resource provided by a different machine. In still another of these embodiments, requests for execution of a resource, windowing moves, application minimize/maximize, resizing windows, and termination of executing resources may be controlled by interacting with a remote desktop environment that integrates the display of the remote resources and of the local resources. In yet another of these embodiments, an application or other resource accessible via an integrated desktop environment—including those resources executed on the local computing device 102 and those executed on the remote computing device 106—is shown in a single desktop environment.

In one embodiment, data objects from a remote computing device 106 are integrated into a desktop environment generated by the local computing device 102. In another embodiment, the remote computing device 106 maintains the integrated desktop. In still another embodiment, the local computing device 102 maintains the integrated desktop.

In some embodiments, a single remote desktop environment 204 is displayed. In one of these embodiments, the remote desktop environment 204 is displayed as a full-screen desktop. In other embodiments, a plurality of remote desktop environments 204 is displayed. In one of these embodiments, one or more of the remote desktop environments are displayed in non-full-screen mode on one or more display devices 124. In another of these embodiments, the remote desktop environments are displayed in full-screen mode on individual display devices. In still another of these embodiments, one or more of the remote desktop environments are displayed in full-screen mode on one or more display devices 124.

B. Systems Including Virtualization Environments

Figure 2A:
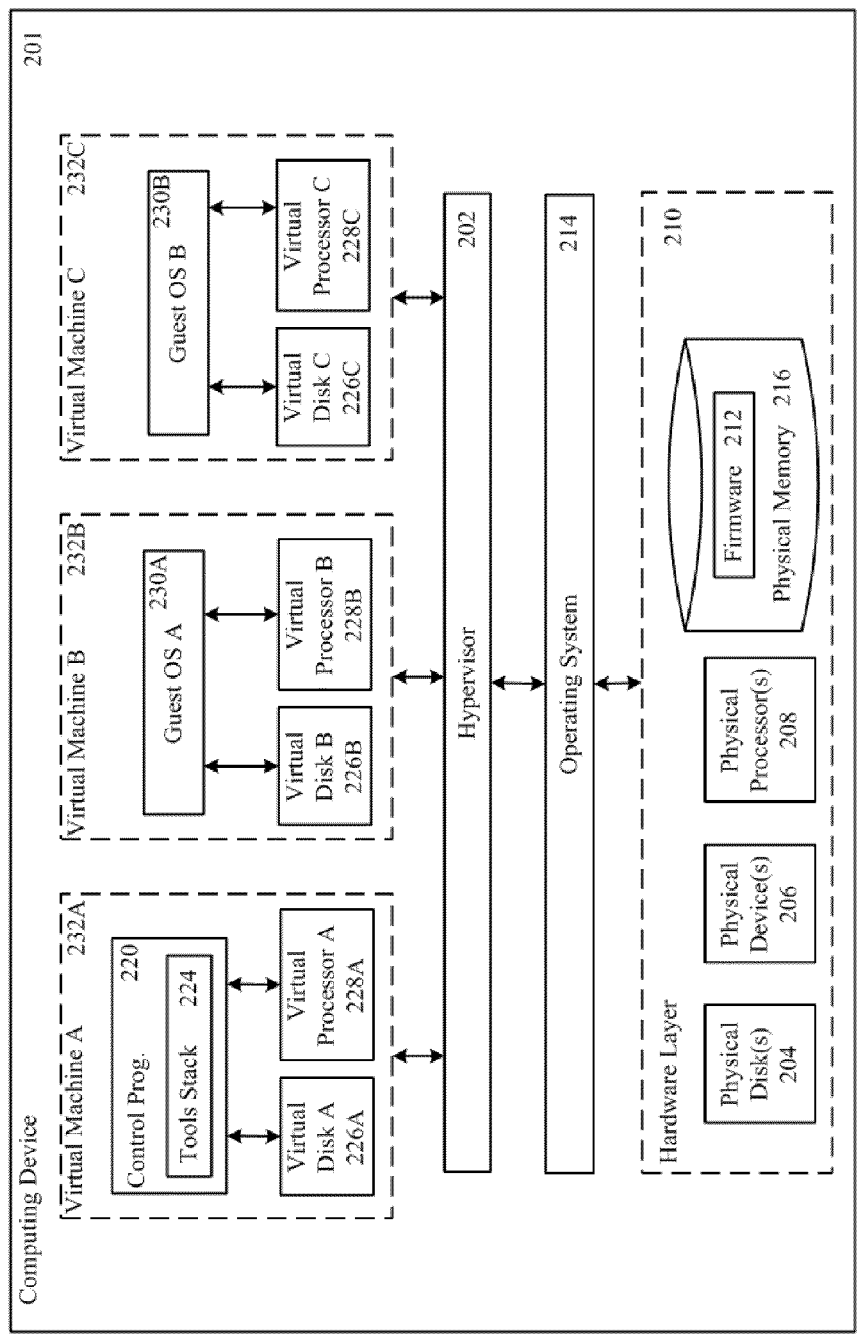
FIGS. 2A and 2B are block diagrams depicting embodiments of a virtualization environment.

Illustrated in FIG. 2A is one embodiment of a virtualization environment. Included on a computing device 201 is a hardware layer that can include one or more physical disks 204, one or more physical devices 206, one or more physical processors 208 and a physical memory 216. In some embodiments, firmware 212 can be stored within a memory element in the physical memory 216 and can be executed by one or more of the physical processors 208. The computing device 201 can further include an operating system 214 that can be stored in a memory element in the physical memory 216 and executed by one or more of the physical processors 208. Still further, a hypervisor 202 can be stored in a memory element in the physical memory 216 and can be executed by one or more of the physical processors 208. Executing on one or more of the physical processors 208 can be one or more virtual machines 232A-C (generally 232). Each virtual machine 232 can have a virtual disk 226A-C and a virtual processor 228A-C. In some embodiments, a first virtual machine 232A can execute, on a virtual processor 228A, a control program 220 that includes a tools stack 224. In other embodiments, one or more virtual machines 232B-C can executed, on a virtual processor 228B-C, a guest operating system 230A-B.

Further referring to FIG. 2A, and in more detail, in one embodiment the virtualization environment described includes a Type 2 hypervisor 202, or a hypervisor that executes within an operating system 214 executing on the computing device 201. A Type 2 hypervisor, in some embodiments, executes within an operating system 214 environment and virtual machines execute at a level above the hypervisor. In many embodiments, the Type 2 hypervisor executes within the context of a user's operating system such that the Type 2 hypervisor interacts with the user's operating system.

In some embodiments, the virtualization environment includes a computing device 201. The computing device 201 can be any computing device, and in some embodiments the computing device 201 can be any computer, device or computing machine described herein. While FIG. 2A illustrates a single computing device 201, in some embodiments the modules, programs, virtual machines, and commands stored and executed by the computing device 201 can be executed by more than one computing device 201. In still other embodiments, the computing device 201 can be a server farm.

In one embodiment, the computing device 201 can include a hardware layer 210 that includes one or more pieces of hardware that communicates with the computing machine 201. In some embodiments, the hardware layer 210 can include any hardware included in the computing device 201. In other embodiments, the hardware layer 210 can include one or more physical disks 204, one or more physical devices 206, one or more physical processors 208 and memory 216.

The hardware layer 210, in some embodiments, can include one or more physical disks 204. A physical disk 204 can be any hard disk, while in some embodiments a physical disk 204 can be any hard disk described herein. In some embodiments, the hardware layer 210 can include one physical disk 204. In other embodiments, the hardware layer 210 can include more than one physical disk 204. The computing device 201, in some embodiments, can communicate with an external hard disk that is included in the hardware layer 210 as a physical disk 204.

In other embodiments, the hardware layer 210 can include a processor 208. The processor 208, in some embodiments, can be any processor, while in other embodiments the processor 208 can be any processor described herein. The processor 208 can include one or more processing cores. In other embodiments the computing device 201 can include one or more processors 208. In some embodiments, the computing device 201 can include one or more different processors, e.g. a processing unit, a graphics processing unit, or a physics engine.

Physical devices 206, in some embodiments, can be any device included in the computing device 201. In some embodiments, physical devices 206 can be any combination of devices included in the computing device 201 and external devices that communicate with the computing device 201. The computing device 201, in some embodiments, can include one or more physical devices 206. A physical device 206 can be any of the following: a network interface card; a video card; a keyboard; a mouse; an input device; a monitor; a display device; speakers; an optical drive; a storage device; a universal serial bus connection; any device connected to the computing device 201; any device communicating with the computing device 201; a printer; a scanner; or any other device or device described herein. In various other figures provided herein, a physical device 206 may be shown external to computing device 201, for clarity and without limitation or implication of distinction between internal and external devices.

The hardware layer 210 can further include physical memory 216 that can include any type of memory. In some embodiments, the physical memory 216 can include any memory type described herein. The physical memory 216 can store data, and in some embodiments can store one or more programs, or set of executable instructions. FIG. 2A illustrates one embodiment where firmware 212 is stored within the physical memory 216 of the computing device 201. Programs or executable instructions stored in the physical memory 216 can be executed by the one or more processors 208 of the computing device 201.

Firmware 212, in some embodiments, can be any combination of executable instructions and hardware that controls hardware communicating with or included within the computing device 201. In some embodiments, the firmware 212 can control one or more pieces of hardware within the hardware layer 210. Firmware 212, in many embodiments, can be executed by one or more processors 208 within the computing device 201. In some embodiments, the firmware 212 can be boot firmware such as the basic input/output system (BIOS.) Additional firmware 212 executing on the computing device 201 can interface with the BIOS.

In one embodiment, the computing device 201 can include an operating system 214 executed by one or more physical processors 208. In some embodiments, the operating system 214 is a user operating system that can directly access the hardware devices in the hardware layer 210. The operating system 214 can be any operating system and in some embodiments, the operating system 214 can be any operating system described herein. FIG. 2A illustrates one embodiment where the hypervisor 202 executes within the context of the operating system 214 executing on the computing device 201. In this embodiment, the operating system 214 can be referred to as a host operating system 214, while the other operating systems can be referred to as guest operating systems. Guest operating systems can include the guest operating systems 230A-B executing on the virtual machines 232, and/or the control program 220.

In some embodiments, the computing device 201 can include a hypervisor 202. A hypervisor 202, in some embodiments, can be a program that executed by processors 208 on the computing device 201 to manage any number of virtual machines. The hypervisor 202 can be referred to as a virtual machine monitor, or platform virtualization software. In some embodiments, a hypervisor 202 can be any combination of executable instructions and hardware that monitors virtual machines executing on a computing machine. While FIG. 2A illustrates a virtualization environment that includes a Type 2 hypervisor 202, the computing device 201 can execute any other type of hypervisor. For example, the computing device 201 can execute a virtualization environment that includes a Type 1 hypervisor 202. In some embodiments, the computing device 201 can execute one or more hypervisors 202. These one or more hypervisors 202 can be the same type of hypervisor, or in other embodiments can be different hypervisor types.

The hypervisor 202, in some embodiments, can provide virtual resources to operating systems 230 or control programs 220 executing on virtual machines 232 in any manner that simulates the operating systems 230 or control programs 220 having direct access to system resources. System resources can include: physical devices; physical disks; physical processors; physical memory 216 and any other component included in the computing device 201 hardware layer 210. In these embodiments, the hypervisor 202 may be used to emulate virtual hardware, partition physical hardware, virtualize physical hardware, or execute virtual machines that provide access to computing environments. In still other embodiments, the hypervisor 202 controls processor scheduling and memory partitioning for a virtual machine 232 executing on the computing device 201. Hypervisor 202 may include those manufactured by VMWare, Inc., of Palo Alto, Calif.; the XEN hypervisor, an open source product whose development is overseen by the open source Xen.org community; HyperV, VirtualServer or virtual PC hypervisors provided by Microsoft, or others. In some embodiments, a computing device 201 executes a hypervisor 202 that creates a virtual machine platform on which guest operating systems may execute. In these embodiments, the computing device 201 can be referred to as a host server. An example of such a computing device is the XEN SERVER provided by Citrix Systems, Inc., of Fort Lauderdale, Fla.

In one embodiment, the hypervisor 202 can create a virtual machine 232A-B (generally 232) in which an operating system 230 executes. In one of these embodiments, for example, the hypervisor 202 loads a virtual machine image to create a virtual machine 232. In another of these embodiments, the hypervisor 202 executes an operating system 230 within the virtual machine 232. In still another of these embodiments, the virtual machine 232 executes an operating system 230.

In one embodiment, the hypervisor 202 controls the execution of at least one virtual machine 232. In another embodiment, the hypervisor 202 presents at least one virtual machine 232 with an abstraction of at least one hardware resource provided by the computing device 201. The abstraction can further be referred to as a virtualization or virtual view of the hardware, memory processor and other system resources available on the computing device 201. Hardware or hardware resources, in some embodiments, can be any hardware resource available within the hardware layer 210. In other embodiments, the hypervisor 202 controls the manner in which virtual machines 232 access the physical processors 208 available in the computing device 201. Controlling access to the physical processors 208 can include determining whether a virtual machine 232 should have access to a processor 208, and how physical processor capabilities are presented to the virtual machine 232.

In some embodiments, the computing device 201 can host or execute one or more virtual machines 232. A virtual machine 232 can be called a domain, a guest and/or a DOMAIN U or domU. A virtual machine 232 is a set of executable instructions that, when executed by a processor 208, imitate the operation of a physical computer such that the virtual machine 232 can execute programs and processes much like a physical computing device. While FIG. 2A illustrates an embodiment where a computing device 201 hosts three virtual machines 232, in other embodiments the computing device 201 can host any number of virtual machines 232. The hypervisor 202, in some embodiments, provides each virtual machine 232 with a unique virtual view of the physical hardware, memory, processor and other system resources available to that virtual machine 232. In some embodiments, the unique virtual view can be based on any of the following: virtual machine permissions; application of a policy engine to one or more virtual machine identifiers; the user accessing a virtual machine; the applications executing on a virtual machine; networks accessed by a virtual machine; or any other similar criteria. The hypervisor 202, in other embodiments, provides each virtual machine 232 with a substantially similar virtual view of the physical hardware, memory, processor and other system resources available to the virtual machines 232.

Each virtual machine 232 can include a virtual disk 226A-C (generally 226) and a virtual processor 228A-C (generally 228.) The virtual disk 226, in some embodiments, is a virtualized view of one or more physical disks 204 of the computing device 201, or a portion of one or more physical disks 204 of the computing device 201. The virtualized view of the physical disks 204 can be generated, provided and managed by the hypervisor 202. In some embodiments, the hypervisor 202 provides each virtual machine 232 with a unique view of the physical disks 204. Thus, in these embodiments, the virtual disk 226 included in each virtual machine 232 can be unique when compared with the other virtual disks 226.

A virtual processor 228 can be a virtualized view of one or more physical processors 208 of the computing device 201. In some embodiments, the virtualized view of the physical processors 208 can be generated, provided and managed by the hypervisor 202. In some embodiments, the virtual processor 228 has substantially all of the same characteristics of at least one physical processor 208. In other embodiments, the virtual processor 208 provides a modified view of the physical processors 208 such that at least some of the characteristics of the virtual processor 228 are different than the characteristics of the corresponding physical processor 208.

A control program 220 may execute at least one application for managing and configuring the guest operating systems executing on the virtual machines 232 and in some embodiments the computing device 201. In some embodiments, the control program 220 can be called a control operating system, a control domain, domain 0 or dom0. The control program 220, in some embodiments, can be DOMAIN 0 or DOM0 of the XEN hypervisor. Thus, in some embodiments, control program 220 may be executed within a control virtual machine or dom0 virtual machine, may be executed by the hypervisor, or may be executed by an operating system executing the hypervisor. The control program 220 can execute an administrative application or program that can further display a user interface which administrators can use to access the functionality of each virtual machine 232 and/or to manage the virtual machines 232. In some embodiments, the user interface generated by the administrative program can be used to terminate the execution of virtual machines 232, allocate resources to virtual machines 232, assign permissions to virtual machines 232, or manage security credentials associated with virtual machines 232. The control program 220, in some embodiments, can start new virtual machines 232 or terminate execution of executing virtual machines 232. In other embodiments, the control program 220 can directly access hardware and/or resources within the hardware layer 210. In still another embodiment, the control program 220 can interface with programs and applications executing on the computing device 210 and outside of the context of a virtual machine 232. Similarly, the control program 220 can interface with programs and applications executing within the context of a virtual machine 232.

In one embodiment, the hypervisor 202 can execute the control program 220 within a virtual machine 232. The hypervisor 202 can create and start the virtual machine 232. In embodiments where the hypervisor 202 executes the control program 220 within a virtual machine 232, that virtual machine 232 can be referred to as the control virtual machine 232. In still another embodiment, the control program 220 executes within a virtual machine 232 that is authorized to directly access physical resources on the computing device 201.

In some embodiments, a control program 220A (Not Shown) on a first computing device 201A (Not Shown) may exchange data with a control program 220B (Not Shown) on a second computing device 201B (Not Shown). In these embodiments the first computing device 201A may be located remote from the second computing device 201B. The control programs 220A-B can exchange data via a communication link between a hypervisor 202A (Not Shown) executing on the first computing device 201A and a hypervisor 202B (Not Shown) executing on the second computing device 201B. Through this communication link, the computing devices 201A-B can exchange data regarding processors and other physical resources available in a pool of resources. Further, through this connection between hypervisors 202A-B, the hypervisors 202A-B can manage a pool of resources, e.g. the resources available on the first computing device 201A and the second computing device 201B, distributed across one or more computing devices 201A-B. The hypervisors 202A-B can further virtualize these resources and make them available to virtual machines 232 executing on the computing devices 201A-B. In another instance of this embodiment, a single hypervisor 202 can manage and control virtual machines 232 executing on both computing devices 201A-B.

In some embodiments, the control program 220 interacts with one or more guest operating systems 230A-B (generally 230.) The control program 220 can communicate with the guest operating systems 230 through a hypervisor 202. Through the hypervisor 202, the guest operating system 230 can request access to physical disks 204, physical processors 208, memory 216, physical devices 206 and any other component in the hardware layer 210. In still other embodiments, the guest operating systems 230 can communicate with the control program 220 via a communication channel established by the hypervisor 202, such as, for example, via a plurality of shared memory pages made available by the hypervisor 202.

In some embodiments, the control program 220 includes a network back-end driver for communicating directly with networking hardware provided by the computing device 201. In one of these embodiments, the network back-end driver processes at least one virtual machine request from at least one guest operating system 230. In other embodiments, the control program 220 includes a block back-end driver for communicating with a storage element on the computing device 201. In one of these embodiments, the block back-end driver reads and writes data from the storage element based upon at least one request received from a guest operating system 230.

In another embodiment, the control program 220 includes a tools stack 224. In another embodiment, a tools stack 224 provides functionality for interacting with the hypervisor 202, communicating with other control programs 220 (for example, on a second computing device 201B), or managing virtual machines 232 on the computing device 201. In another embodiment, the tools stack 224 includes customized applications for providing improved management functionality to an administrator of a virtual machine farm. In some embodiments, at least one of the tools stack 224 and the control program 220 include a management API that provides an interface for remotely configuring and controlling virtual machines 232 running on a computing device 201. In other embodiments, the control program 220 communicates with the hypervisor 202 through the tools stack 224.

In one embodiment, the hypervisor 202 executes a guest operating system 230 within a virtual machine 232 created by the hypervisor 202. In another embodiment, the guest operating system 230 provides a user of the computing device 201 with access to resources within a computing environment. In still another embodiment, a resource includes a program, an application, a document, a file, a plurality of applications, a plurality of files, an executable program file, a desktop environment, a computing environment, or other resource made available to a user of the computing device 201. In yet another embodiment, the resource may be delivered to the computing device 201 via a plurality of access methods including, but not limited to, conventional installation directly on the computing device 201, delivery to the computing device 201 via a method for application streaming, delivery to the computing device 201 of output data generated by an execution of the resource on a second computing device 201' and communicated to the computing device 201 via a presentation layer protocol, delivery to the computing device 201 of output data generated by an execution of the resource via a virtual machine executing on a second computing device 201', or execution from a removable storage device connected to the computing device 201, such as a USB device, or via a virtual machine executing on the computing device 201 and generating output data. In some embodiments, the computing device 201 transmits output data generated by the execution of the resource to another computing device 201'.

In one embodiment, the guest operating system 230, in conjunction with the virtual machine on which it executes, forms a fully-virtualized virtual machine that is not aware that it is a virtual machine; such a machine may be referred to as a "Domain U HVM (Hardware Virtual Machine) virtual machine". In another embodiment, a fully-virtualized machine includes software emulating a Basic Input/Output System (BIOS) in order to execute an operating system within the fully-virtualized machine. In still another embodiment, a fully-virtualized machine may include a driver that provides functionality by communicating with the hypervisor 202. In such an embodiment, the driver is typically aware that it executes within a virtualized environment.

In another embodiment, the guest operating system 230, in conjunction with the virtual machine on which it executes, forms a paravirtualized virtual machine, which is aware that it is a virtual machine; such a machine may be referred to as a "Domain U PV virtual machine". In another embodiment, a paravirtualized machine includes additional drivers that a fully-virtualized machine does not include. In still another embodiment, the paravirtualized machine includes the network back-end driver and the block back-end driver included in a control program 220, as described above.

Figure 2B:
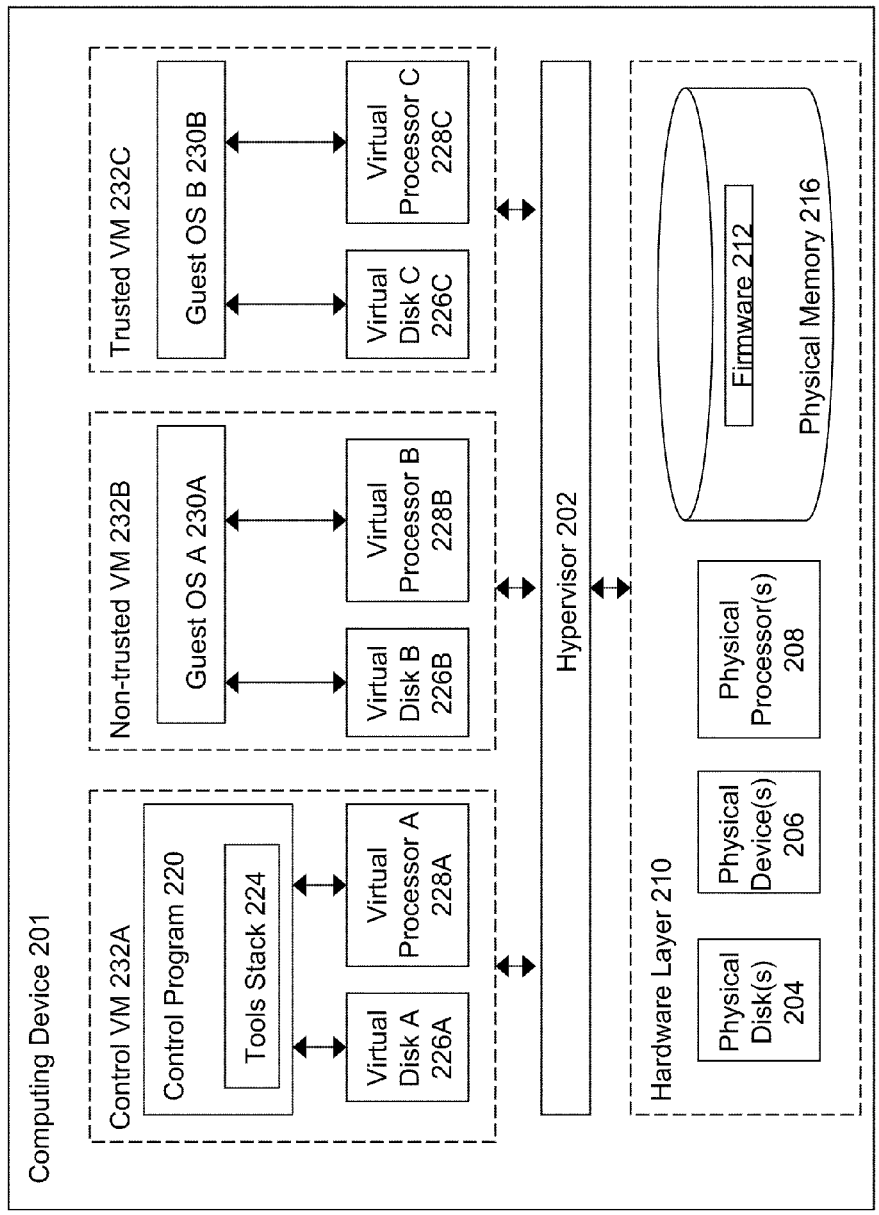

Illustrated in FIG. 2B is another embodiment of a virtualization environment that illustrates a Type 1 hypervisor 202. Executing on the computing device 201 is a hypervisor 202 that can directly access the hardware and resources within the hardware layer 210. Virtual machines 232 managed by the hypervisor 202 can be a non-trusted virtual machine 232B and/or a trusted virtual machine 232C. Whereas the virtualization environment depicted in FIG. 2A illustrates a host operating system 214, the virtualization environment embodiment in FIG. 2B does not execute a host operating system.

Further referring to FIG. 2B, and in more detail, the virtualization environment includes a Type 1 hypervisor 202. Type 1 hypervisors 202, in some embodiments, execute on "bare metal," such that the hypervisor 202 has direct access to all applications and processes executing on the computing device 201, all resources on the computing device 201 and all hardware on the computing device 201 or communicating with the computing device 201. While a Type 2 hypervisor 202 accesses system resources through a host operating system 214, a Type 1 hypervisor 202 can directly access all system resources. The Type 1 hypervisor 202 can execute directly on one or more physical processors of the computing device 201, and can include program data stored in the physical memory 216.

In a virtualization environment that employs a Type 1 hypervisor 202 configuration, the host operating system can be executed by one or more virtual machines 232. Thus, a user of the computing device 201 can designate one or more virtual machines 232 as the user's personal machine. This virtual machine can imitate the host operating system by allowing a user to interact with the computing device 201 in substantially the same manner that the user would interact with the computing device 201 via a host operating system 214. In some embodiments, a first virtual machine may be referred to as a control virtual machine 232A. Control virtual machine 232A may, in some embodiments, execute control program 220 and may provide capabilities for launching and managing one or more other virtual machines 232. Thus, in many embodiments, a control virtual machine 232A may be considered part of domain 0 or a host domain.

Virtual machines 232 can be non-trusted virtual machines 232B and trusted virtual machines 232C. A trusted virtual machine, sometimes referred to as a secure virtual machine, is a virtual machine that is launched responsive to a user providing authentication credentials. In one embodiment, the trusted virtual machine is an encrypted image on disk that boots when the user provides authentication credentials. Authentication credentials may comprise a user name, real name, login name, account name, password, serial number, encryption key, or any other item of information identifying the user. In many embodiments, the trusted virtual machine may be booted responsive to verifying the authentication credentials against an authorized database of users. The database may be hosted by another virtual machine, by a host virtual machine, by the hypervisor, or by another computing device. For example, in one such embodiment, a user may provide authentication credentials to a control program 220 to initiate booting of a trusted virtual machine, and the control program 220 may establish a network communication with a remote computing device and transmit the authentication credentials to the remote computing device. The remote computing device may verify the credentials and respond with an indication of whether the user is authorized to boot the trusted virtual machine. In many embodiments, whether a virtual machine is considered trusted may be equivalent to whether the user booting the virtual machine has permission from a security component to boot the machine.

In some embodiments, a trusted virtual machine may be considered to be a secure virtual machine, and accordingly these terms may be used interchangeably. In some embodiments, whether a virtual machine is a secure virtual machine can be determined based on a comparison of the virtual machine to other virtual machines executing within the same virtualization environment. For example, were a first virtual machine to have access to a pool of resources, and a second virtual machine not to have access to the same pool of resources; the second virtual machine could be considered a non-trusted virtual machine 232B while the first virtual machine could be considered a trusted virtual machine 232A. In some embodiments, a virtual machine's 323 ability to access one or more system resources can be configured using a configuration interface generated by either the control program 220 or the hypervisor 202. In other embodiments, the level of access afforded to a virtual machine 232 can be the result of a review of any of the following sets of criteria: the user accessing the virtual machine; one or more applications executing on the virtual machine; the virtual machine identifier; a risk level assigned to the virtual machine based on one or more factors; or any other similar criteria. For example, in one embodiment, a virtual machine may be considered secure or trusted if the virtual machine's disk image is encrypted or is a read-only image; if an operating system of the virtual machine includes an anti-virus program or an active firewall; or any other criteria.

In some embodiments, unsecure or non-trusted virtual machines 232B may be prevented from accessing resources, hardware, memory locations, and programs that secure virtual machines 232A may access. For example, a trusted virtual machine 232C may be able to access one or more company resources, while the non-trusted virtual machine 232B cannot access any company resources.

C. Communication Between Trusted and Non-Trusted Virtual Machines

In many embodiments, a computing device may host a plurality of virtual machines, including trusted and non-trusted virtual machines. For example, a user may simultaneously use a non-trusted virtual machine for playback of personal music files, while using a trusted virtual machine for accessing a corporate network. Such functions may be separated to keep the corporate network secure, while still allowing users the freedom to operate personal devices and applications. While such isolation may be desirable from a security standpoint, in many embodiments, the non-trusted and trust virtual machines may need to communicate. For example, if a user has a first application with a first window open in a first virtual machine, and a second application with a second window in a second virtual machine, the user may expect only one window to have focus, receive mouse and keyboard input, or be foremost in a z-order at any one time. Accordingly, the two virtual machines may need to communicate such focus management.

Communication between a secure, company-specific virtual machine and an unsecure, personal virtual machine can be difficult. Solutions exist that establish communications between secure and unsecure virtual machines via traditional network connections. These solutions can pose security risks to the virtual machines because virtual machines often need to be isolated on different network segments.

Communication between trusted and non-trusted virtual machines may, in some embodiments, be referred to as virtual-to-virtual or V2V technology. This mechanism may provide systems for inter-domain communication between both privileged and non-privileged domains running under a hypervisor. In one embodiment, the mechanism includes providing an API (Application Programmers Interface) that can be used in both kernel and user modes. The API can be present in any operating system running as a domain under the hypervisor, including Windows and Linux, or any other operating system.

In one embodiment, the V2V API allows two domains or virtual machines to establish a channel of communication. In brief overview, one end of the channel starts as a listening endpoint. The other end can then connect to the listening endpoint. Once the channel is established, the two domains can send messages back and forth on the channel. When either end is finished communicating, it can disconnect the channel and free the associated resources.

In some embodiments, the message passing part of the API can be a low level program that permits any block of data to be sent and received. In some embodiments, V2V provides no transport layer semantics or higher layer functionalities. Thus, in many embodiments and unlike using network interfaces for communicating between virtual machines, messages need not be encapsulated with addresses or other headers. In other embodiments, other protocols can be built on top of the V2V API to provide higher level services.

In some embodiments, underlying event channel and shared memory architecture can be used between front end and back end para-virtual driver pairs. V2V, in some embodiments, establishes an API over these driver pairs to make them generic and reusable. V2V is unique in that it provides a means of communication between domains that is based on the underlying hypervisor functionality. In particular V2V uses the Xen facilities to share memory pages between domains and the functionality to allow domains to send events to other domains via interrupts.

Thus, in some embodiments, these systems and methods permit communication that does not require traditional network connections between domains for communication. Such traditional network connections can pose security risks to domains (e.g. when domains need to be isolated on different network segments). V2V usage, security and access control can also be controlled by components in the control program, or the control program tool stack, discussed above. Although discussed herein primarily in terms of communication between virtual machines with different security or privilege levels, these systems and methods may be used for communications between two non-trusted virtual machines, two trusted virtual machines, a dom0 or control virtual machine and a trusted or non-trusted domU virtual machine, or any other combination of virtual machines.

Figure 3A:
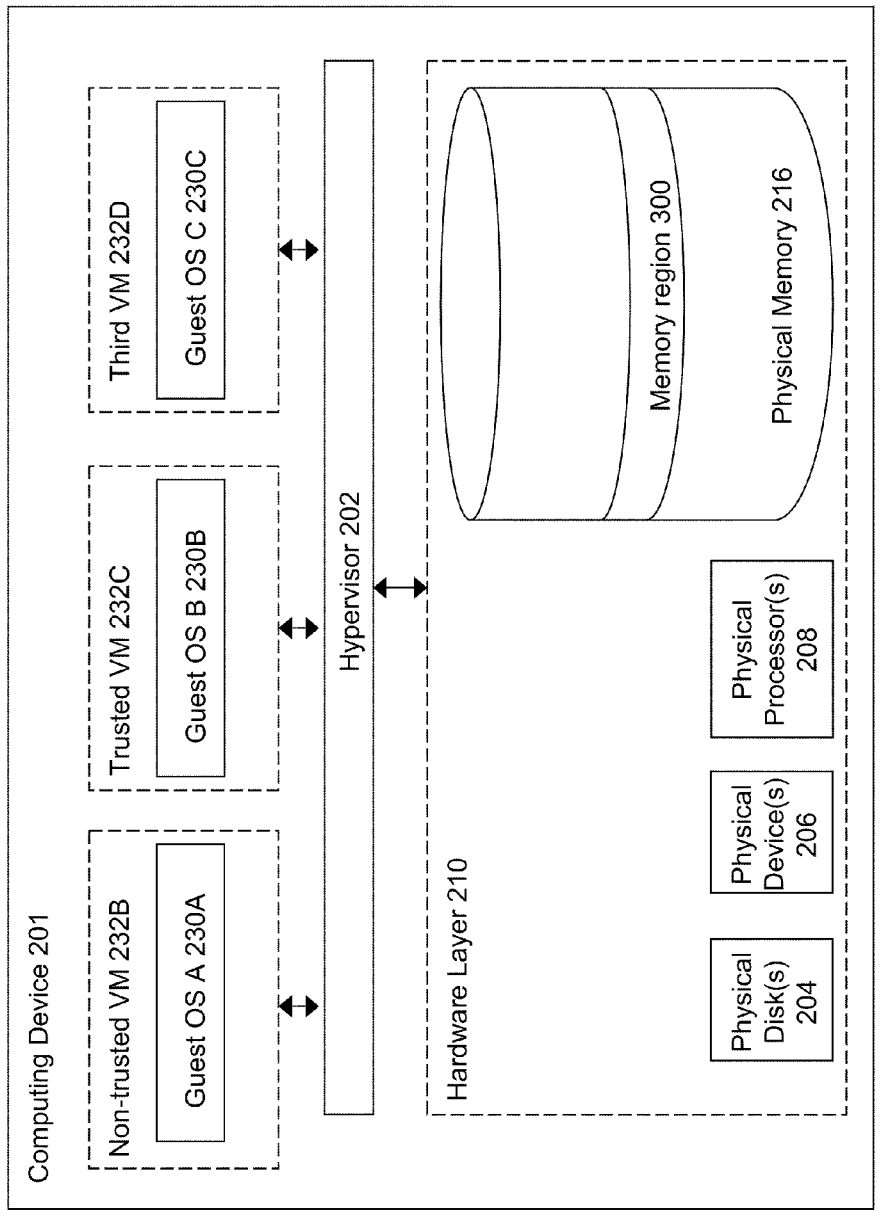
FIG. 3A is a block diagram depicting an embodiment of a system for communication between trusted and non-trusted virtual machines.

Referring briefly now to FIG. 3A, illustrated is a block diagram of an embodiment of a system for communication between trusted and non-trusted virtual machines. In addition to features discussed above in connection with FIGS. 2A and 2B, a computing device 201 may include a non-trusted virtual machine 232B, a trusted virtual machine 232C. The computing device 201 may also include a third virtual machine 232D. Physical memory 216 may include a region of memory 300 that is reserved by the trusted virtual machine 232C, discussed in more detail below. In some embodiments, one or more virtual machines may execute a communication agent (not shown) which may comprise a program, application, service, daemon, sub-routine, logic, or other executable instructions for establishing and communicating via a secure channel.

Figure 3B:
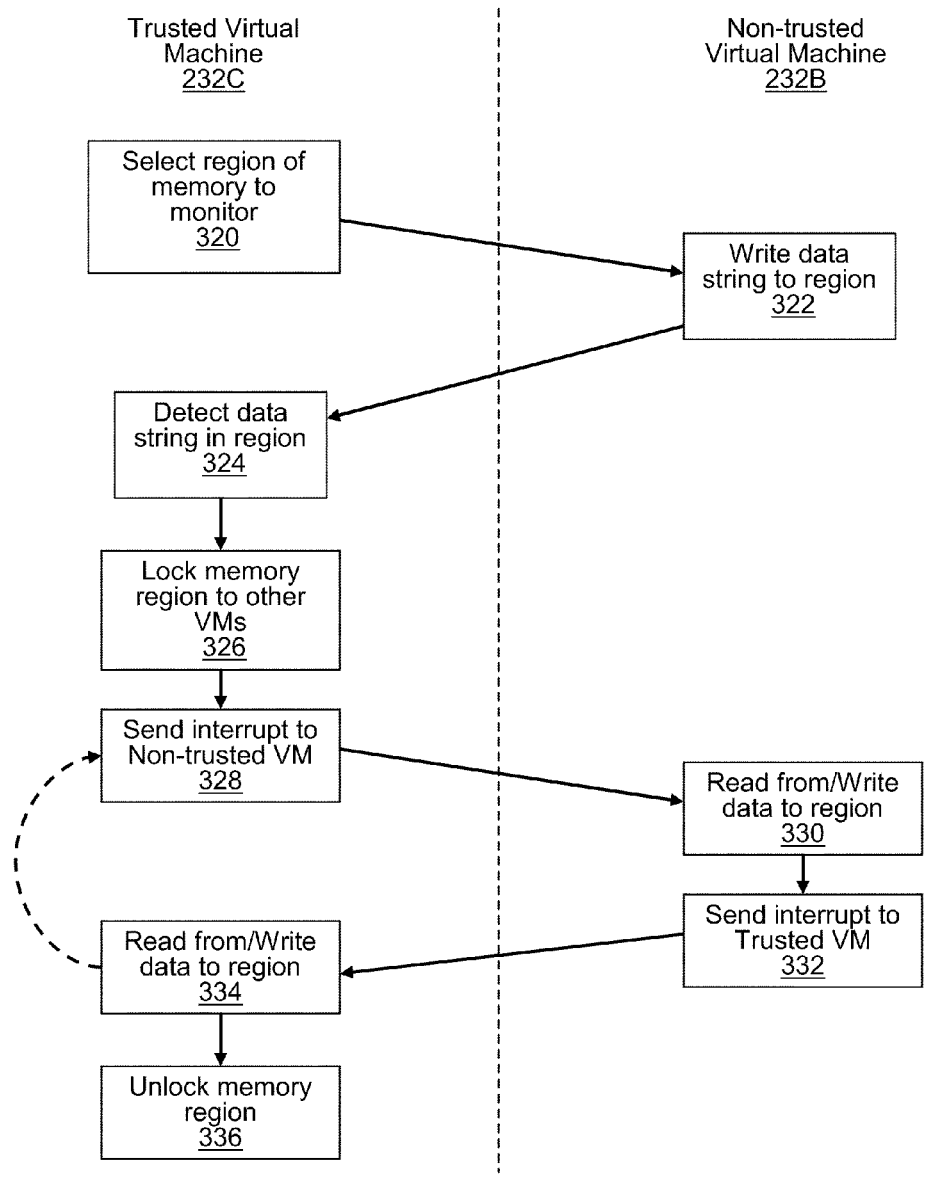
FIG. 3B is a flow diagram of an embodiment of a method for communication between trusted and non-trusted virtual machines.

Referring now to FIG. 3B, illustrated is a flow diagram of one embodiment of a method for establishing a secure communication channel between a non-trusted virtual machine and a trusted virtual machine. In brief overview, a first virtual machine such as a trusted virtual machine, or a communication agent executed by the first virtual machine, may establish itself as a listening endpoint by, at step 320 selecting a region of memory 300 to monitor. At step 322, a second virtual machine such as a non-trusted virtual machine may write a data string to the selected region. At step 324, the trusted virtual machine may detect the data string in the selected region. At step 326, the trusted virtual machine may be lock the memory region to exclude a third virtual machine or others from reading or writing to the memory region, while allowing the trusted virtual machine and non-trusted virtual machine to read and write to the memory region. At step 328, the trusted virtual machine may send an interrupt to the non-trusted virtual machine. At step 330, the non-trusted virtual machine may write data to the region, or as the communication proceeds, may also read data from the region. At step 332, the non-trusted virtual machine may send an interrupt to the trusted virtual machine. At step 334, the trusted virtual machine may read from and/or write data to the region. Steps 328-334 may be repeated until communication is complete. At step 336, the trusted virtual machine may unlock the memory region, allowing a third virtual machine access to the memory region.

Still referring to FIG. 3B and in more detail, in one embodiment a virtual machine establishes itself as a communications endpoint by selecting a region of memory to monitor. In some embodiments, the virtual machine can be a secure or trusted virtual machine, while in other embodiments the virtual machine can be an unsecure or non-trusted virtual machine. In one embodiment, the virtual machine can establish itself as a listening endpoint. In other embodiments, the virtual machine can establish itself as a transmitting endpoint. In still other embodiments, the virtual machine can establish itself as a communication endpoint able to send or receive data over the communication channel.

In one embodiment, the virtual machine can establish itself as a listening endpoint in response to a request from another virtual machine to transfer data to the virtual machine. In some embodiments, at step 320, a virtual machine establishes itself as a listening endpoint by selecting a group of memory addresses, one or more memory pages, or another portion of the physical memory 216 as a common storage region 300 for both the listening virtual machine and the transmitting virtual machine. In other embodiments, a virtual machine can establish itself as a listening endpoint via a communication agent executing within the virtual machine. The communication agent, in response to an indicator, can select one or more memory locations and tag them or otherwise partition them as memory to be exclusively used by the virtual machine and any transmitting endpoint that connects with the virtual machine. In some embodiments, the virtual machine may periodically monitor the memory region for new data, or may receive an interrupt when new data is written to the memory region.

Another virtual machine, in some embodiments at step 322, connects to the listening endpoint of the initial virtual machine to create a communication channel. In some embodiments, the virtual machine establishes itself as a transmitting endpoint when it connects to the listening endpoint of the initial virtual machine. In one embodiment, the transmitting endpoint can connect to the listening endpoint by writing a predetermined string of data to the memory region selected by the listening endpoint. Such predetermined string may comprise an identifier of the transmitting endpoint or virtual machine wishing to establish itself as the transmitting endpoint, to allow the listening endpoint to exclude others from the communication channel. This data may be detected by the listening endpoint at step 324. In another embodiment in which other, non-secure communications paths exist, the transmitting endpoint may use one of these communications paths to send a message to the listening endpointing, indicating it wishes to establish a secure communication channel with the listening endpoint. In some embodiments, a communication agent on the transmitting endpoint transmits a message to a communication agent on the listening endpoint indicating that the transmitting endpoint would like to communicate with the listening endpoint. The message transmitted to the listening endpoint, in some embodiments, is an interrupt that can be received by the listening endpoint virtual machine and processed.

In some embodiments at step 326, upon receiving a notification that a transmitting endpoint would like to communicate with the listening endpoint, the communication agent on that virtual machine will tag the reserved memory so that it can be accessed only by the listening endpoint and the transmitting endpoint. The communication channel established between the listening endpoint and the transmitting endpoint can include the shared memory pages or memory addresses accessible only by the listening endpoint and the transmitting endpoint. In other embodiments, the communication channel can include a secure communication connection between the transmitting endpoint and the listening endpoint. In further embodiments, this secure communication channel can include encoding, encrypting or otherwise encapsulating data such that only the listening endpoint can decode, decrypt or otherwise un-encapsulate the transmitted data.

Upon creating the communication channel between the listening endpoint and the transmitting endpoint, in some embodiments at step 328, the listening endpoint may send an interrupt to the transmitting endpoint to indicate that the communication channel is established and ready for secure transfer of data.

At step 330, the transmitting endpoint can copy data to the shared memory page. Upon copying data to the shared memory page, the transmitting endpoint virtual machine can issue an interrupt, at step 332, to the listening virtual machine to indicate that data was copied into the shared memory. In some embodiments, this interrupt can be issued by a communication agent. In other embodiments, this interrupt can be issued by a physical device or network card.

The listening endpoint, upon determining that data was copied to the shared memory page, can retrieve the copied data from the shared memory page at step 334. Determining that data was copied to the shared memory page can include receiving the interrupt issued by the transmitting virtual machine, and the retrieval may be performed responsive to receipt of the interrupt.

The method may, in some embodiments, include a transmission virtual machine that issues an interrupt to the listening virtual machine when data is copied to the shared memory page, and when the transmitting virtual machine runs out of space to send more data. In some embodiments, the listening virtual machine receives the interrupt and responds by either retrieving data or allocating additional memory addresses or pages to the shared memory repository. Upon allocating additional memory to the shared memory repository, the listening virtual machine can issue an interrupt to the transmitting virtual machine that additional memory was added to the shared memory repository. In some embodiments, the listening virtual machine can respond to the interrupt regarding limited memory by clearing data from the shared memory pages to free up space.

In some embodiments, steps 328-334 may be repeated for the duration of the communication, with either endpoint writing data to the shared memory region and reading data written by the other endpoint. Upon completion of the communication transaction or session, at step 336, in some embodiments, the listening endpoint may unlock the memory region such that a third virtual machine may access the memory region. In other embodiments, the transmitting endpoint may unlock the memory region. In many embodiments, prior to unlocking the memory region, the endpoint may first wipe the memory region or write null or random data to the region to remove any sensitive information.

Through the above discussed method, data of various sizes and content may be transmitted between the trusted and non-trusted virtual machines without other virtual machines being able to intercept or otherwise read the communication, yet without necessarily requiring encryption or encapsulation.

D. Managing Injection of Input Data into a Virtualization Environment

In many embodiments, the security of a secure virtual machine can be compromised by keylogging attacks which, in some instances, include software or devices that can capture the actions of an input device. For example, such software can capture the keys of a keyboard that are actuated by a user. Within the context of a virtualization environment that includes both trusted and non-trusted virtual machines, the input data entered into a trusted virtual machine can be compromised were an application within the non-trusted virtual machine able to monitor and log input into the trusted virtual machines. Few if any solutions exist that reduce the risk posed to trusted virtual machines by the possibility that a non-trusted virtual machine could log the keyboard input into the trusted virtual machine. Absent any solutions, this risk could significantly diminish the security of a trusted virtual machine within a virtualization environment, and could in some cases result in the leak of sensitive corporate information.

In one aspect, a method for preventing such keylogging attacks includes managing the injection of input data into a virtualization environment. An input manager, including a switcher, receives input events and data. Such input events and data may comprise those generated by a keyboard and/or a mouse. The input manager may determine whether to input those events into an active virtual machine. In some embodiments, the input manager executes within the context of a control program executing on a computing device connected to the input devices. The input manager may receive an input event and/or input data and determine whether an application window having focus is a window belonging to a trusted virtual machine or a window belonging to a non-trusted virtual machine. In some embodiments, the input manager further determines whether the input data corresponds to a secure key combination or an otherwise predetermined key combination.

When windows belonging to the trusted virtual machine receive focus, the switcher of the input manager is notified. Thus, the input manager is substantially always informed as to whether a trusted window has focus. In embodiments where a trusted virtual machine window has focus and the input data corresponds to a predetermined key combination (e.g. ctrl+alt, ctrl+backspace, etc.), the input manager can inject the event into a non-trusted virtual machine. In embodiments where the trusted virtual machine window does not have focus, substantially all input events and/or data may be injected into the non-trusted virtual machine window. In still other embodiments where the input data corresponds to a secure key or input combination, the input manager can intercept the input data, input at least a portion of the data into a secure key box, and map the keyboard into the trusted virtual machine.

In some embodiments, the control program can cause an LED or other visual indicator to flash when the user is operating within the context of a trusted virtual machine. In these embodiments, the control program knows when the user is operating within the context of a trusted virtual machine because the switch of the input manager is notified each time a trusted window receives focus or loses focus.

Figure 4A:
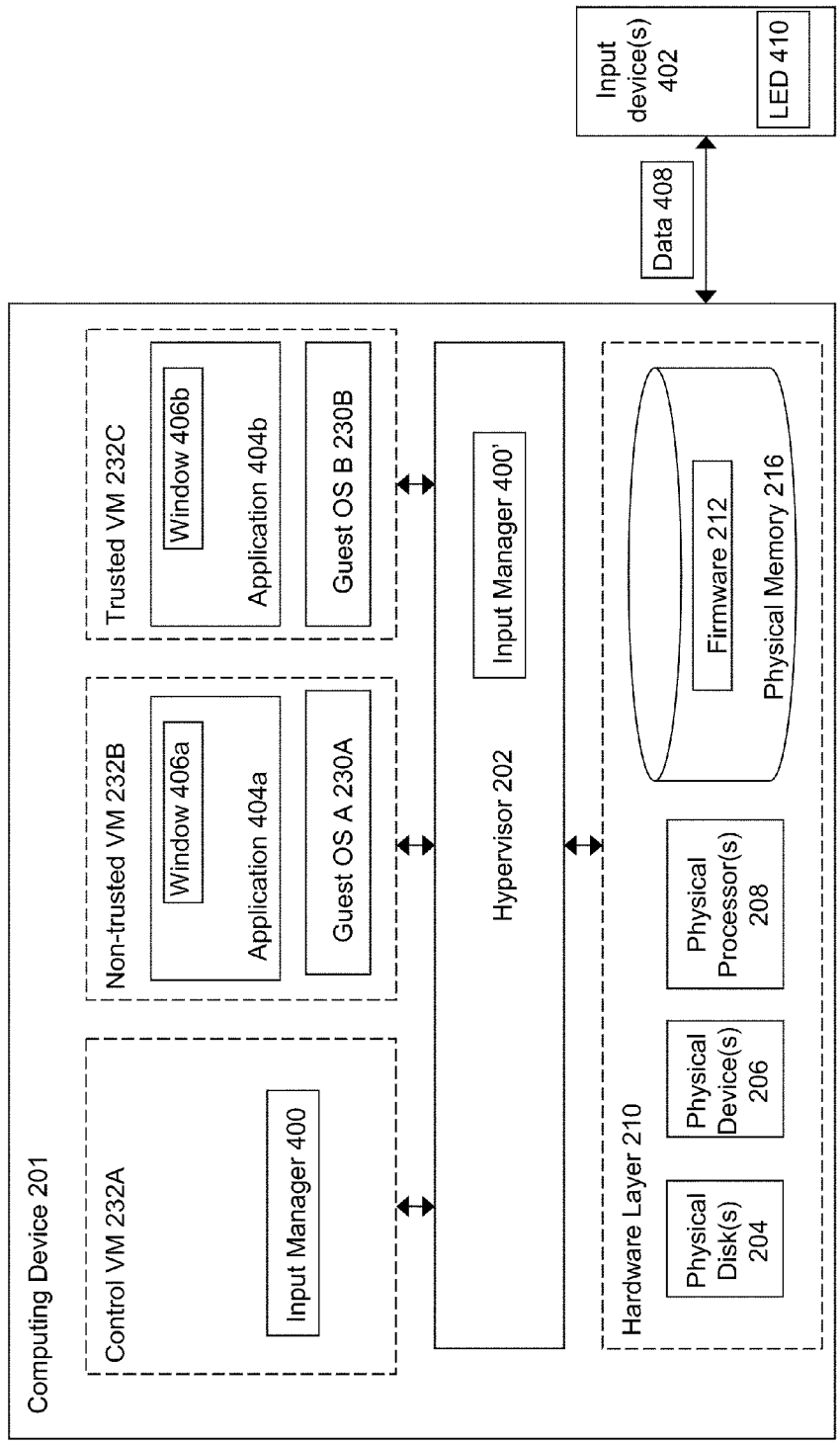
FIG. 4A is a block diagram depicting an embodiment of a system for managing injection of input data into a virtualization environment.

Referring briefly to FIG. 4A, illustrated is a block diagram of an embodiment of a system for managing injection of input data into a virtualization environment. In addition to features discussed above in connection with FIGS. 2A and 2B, a computing device 201 may comprise an input manager 400. Input manager 400 may be executed by a control or host virtual machine 232A, or may be an input manager 400' executed by a hypervisor or an operating system executing a hypervisor. Accordingly, input manager 400 or 400' (referred to generally as input manager 400) may be an application, program, service, daemon, logic, or other executable code executing in a trusted domain or dom0 for managing injection of input data into a virtualization environment.

A computing device 201 may also include or connect to one or more input devices 402. An input device 402 may comprise a keyboard, mouse, touchpad, drawing tablet, joystick, gamepad, control panel, switch panel, biometric sensor, or any other type and form of input device. In some embodiments, an input device 402 may include an output device capable of presenting an indicator to a user. For example, an input device 402 comprising a keyboard may include one or more LEDs 410. Such output device 410 may be capable of control by the software to blink, flash, light up, beep, inflate, vibrate, or otherwise present a visual, auditory or tactile indicator to a user to indicate that a trusted virtual machine currently is receiving input data 408 from input device 402 as opposed to a non-trusted virtual machine. Input data 408 may comprise any type and form of input from the input device 402, such as an alphanumeric string of data, a key combination, a click, a key acuation, an analog or digital value, or any other input. In many embodiments in which input device 402 is a keyboard, input data 408 may comprise a data string of one or more keys pressed sequentially or simultaneously. In some embodiments, the input data 408 may comprise a predetermined data string. The predetermined data string may, in one embodiment, include a key combination commonly used by an operating system, such as alt+tab, control+backspace, or any other similar combination. In another embodiment, the predetermined data string may include a predetermined control string. This control string may be used to trigger creation and focusing of a secure input box generated by a domain0 entity such as the hypervisor or control virtual machine.

A computing device 201 may include a plurality of virtual machines 232, including a non-trusted virtual machine 232B and a trusted virtual machine 232C. The virtual machines may each execute an application 404a and 404b (referred to generally as application 404) and each application, respectively, may generate one or more windows 406a and 406b (referred to generally as window 406). A window 406 may have focus, or be currently selected to receive input. In such cases, the window may be referred to as having focus. Similarly, the application 404 that generated the window may be referred to as having focus. Likewise, the trusted or non-trusted virtual machine executing the application may be referred to as having focus.

Figure 4B:
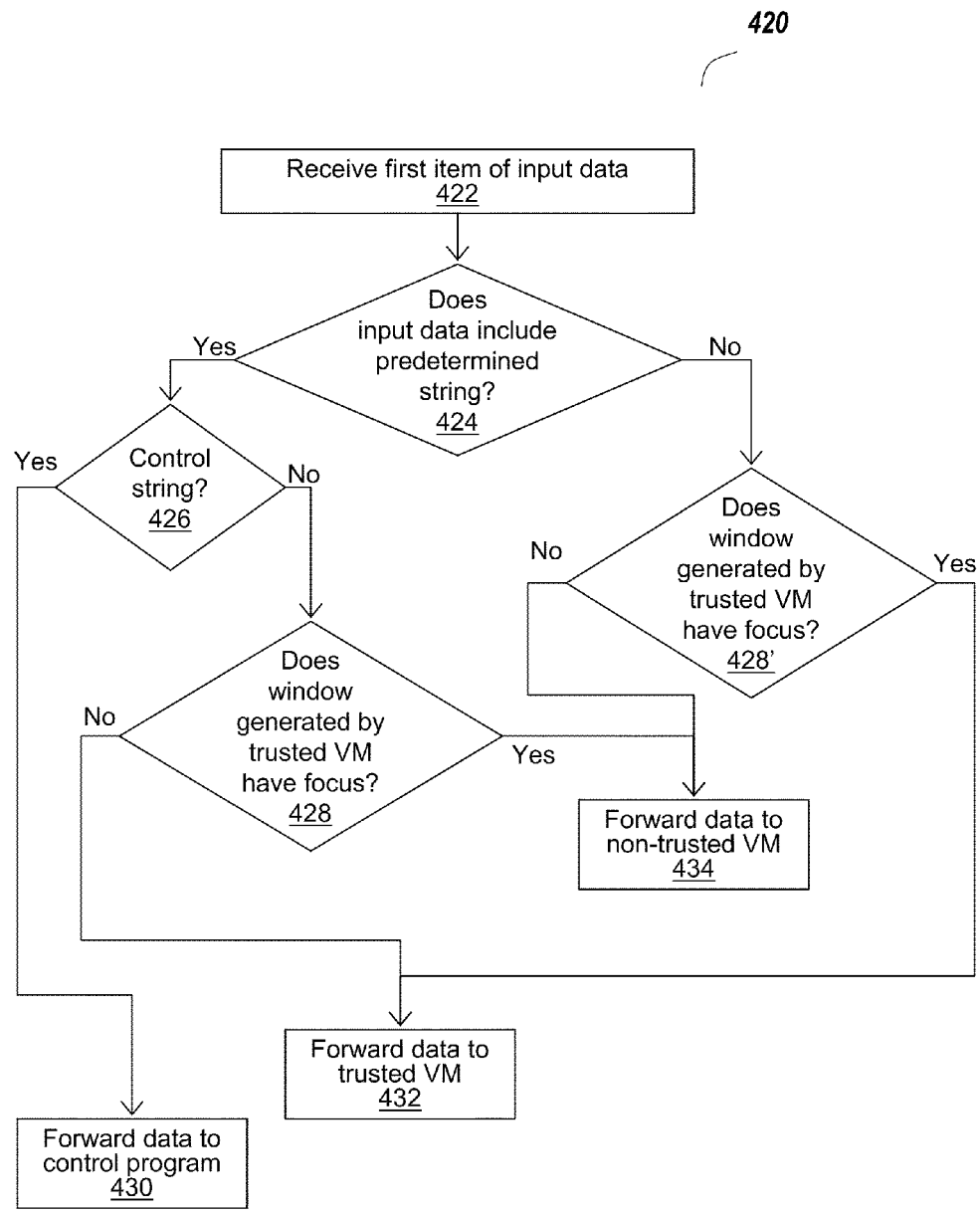
FIG. 4B is a flow chart of an embodiment of a method for managing injection of input data into a virtualization environment.

Referring now to FIG. 4B, illustrated is a flow chart of one embodiment of a method 420 for managing injection of input data into a virtualization environment. In brief overview, at step 422, an input manager may receive a first item of input data. The input data may comprise a single item of data, or may comprise a data string or combination of data, such as a key combination. At step 424, the input manager may determine if the input data includes a predetermined string. As discussed above, multiple strings of data may be predetermined, such as a control string to trigger creation of a secure key input box, and an operating system-used command to switch between a plurality of active applications. Thus, at step 426 in such embodiments, if the input data includes a predetermined string, the input manager may determine if the string is the control string. If so, at step 430, the control string may be forwarded to the control program, or the input device may be mapped to the control program such that the control program receives future input data.

If the input data includes a predetermined string but it is not the control string, then at step 428, the input manager may determine if a window generated by an application executing on a trusted virtual machine has focus. If not, at step 432, the input data may be forwarded to the trusted virtual machine, window, or application, or the input device may be mapped to the trusted virtual machine such that the trusted virtual machine receives future input data. The window of the trusted virtual machine may also be given focus. If, at step 428, a window of the trusted virtual machine does have focus, then at step 434, the input data may be forwarded to a non-trusted virtual machine, window, or application, or the input device may be mapped to the non-trusted virtual machine such that the non-trusted virtual machine receives future input data. A window of the non-trusted virtual machine may also be given focus.

If, at step 424, the input manager determines that the input data does not include a predetermined string, then at step 428', the input manager may determine if a window generated by an application executing on a trusted virtual machine has focus. If so, at step 432, the input data may be forwarded to the trusted virtual machine, window, or application, or the input device may be mapped to the trusted virtual machine such that the trusted virtual machine receives future input data. The window of the trusted virtual machine may also be given focus. If, at step 428', a window of the trusted virtual machine does not have focus, then at step 434, the input data may be forwarded to a non-trusted virtual machine, window, or application, or the input device may be mapped to the non-trusted virtual machine such that the non-trusted virtual machine receives future input data. A window of the non-trusted virtual machine may also be given focus.

Figure 4C:
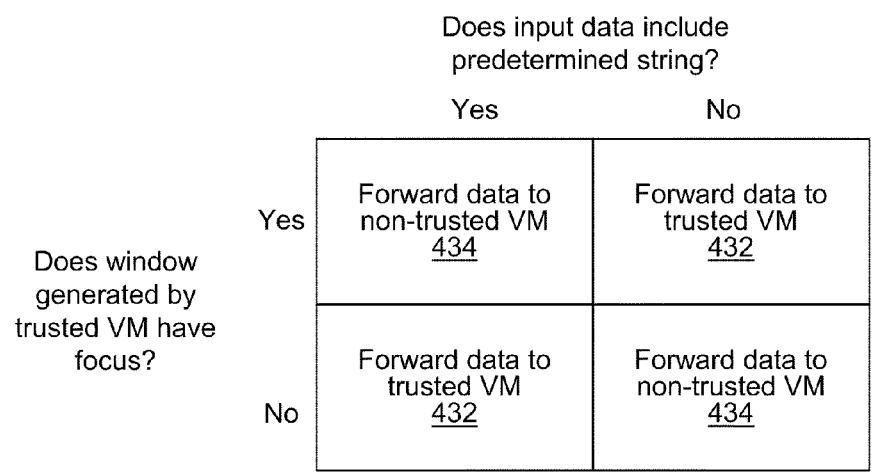
FIG. 4C is a chart of an embodiment of a method of managing injection of input data into a virtualization environment.

Thus, in the embodiment of the method 420 illustrated in FIG. 4B, two triggers are utilized to determine whether the trusted virtual machine receives the input data. First, if the input data does not include a predetermined string, then the input data will be passed to either the trusted or non-trusted virtual machine, depending on which has focus. This allows a user to, for example, continue typing in an application window. However, if the input data does include a predetermined string, then the input may be forwarded or the input device may be remapped to the other virtual machine, i.e. the one that does not currently have focus. This allows the user to use a switcher key combination, for example, to switch input to a trusted and secure virtual machine. This behavior is summarized in the table shown in FIG. 4C.

Additionally, if the input data includes a predetermined control string, then the input data may be forwarded or the input device remapped to a control program. This allows the user to press a special key combination to enter, for example, a management console separate from both the trusted virtual machine and non-trusted virtual machine and hosted by a dom0 entity such as the hypervisor or a control virtual machine. In still another further embodiment, the control string may be used to allow a user to switch from a non-trusted virtual machine to a trusted virtual machine. To ensure the virtual machine remains trusted, the control string may cause the dom0 entity to create an authentication window. The user may input a password or other authentication credentials, which the dom0 entity may verify. Once the user has been authenticated, the input manager may map the input device to the trusted virtual machine. Thus, the control string may be used for a password-protected virtual machine focus switcher.

Still referring to FIG. 4B and in more detail, in one embodiment the input manager can receive input data from an input device at step 422. The input device, in some embodiments, can be any input device. In other embodiments, the input device can be a keyboard and/or a mouse. Input data, in some embodiments, can be received by a driver executing on the computing device 201 within the hardware layer 210. Upon receiving the input data, in one embodiment, the driver can forward a formatted version of the input data to the control program 220 executing on the computing device 201. The input manager, in some embodiments, executes within the control program 220 such that when the control program receives the input data, the input manager also receives the input data.

In some embodiments, at step 424, the input manager can determine whether the input data contains one or more predetermined sequences or data strings. When the input data is generated by a keyboard, the one or more predetermined sequences can include one or more keystrokes. For example, a predetermined sequence can include: CTRL+ALT; CTRL+DELETE; CTRL+BACKSPACE; CTRL+ALT+BACKSPACE. In some embodiments, the predetermined sequence can correspond to an operating-system-specific key combination. When such a combination is received, the input manager can forward the keyboard combination to a non-trusted virtual machine executing on the computing device 201. In some embodiments, the predetermined sequence can correspond to a secure key combination. When such a combination is received, the input manager can responsively map the keyboard into a trusted virtual machine.

The input manager, in some embodiments, can determine whether a trusted virtual machine has focus. When a trusted virtual machine receives focus, the change focus event can be forwarded to the input manager so that the input manager knows substantially all the time whether the secure virtual machine window has focus. In some embodiments, the control program 220 can cause a LED or other visual, auditory, or tactile indicator to light up, turn on, or otherwise activate when the trusted virtual machine window has focus. The input manager, when the trusted virtual machine does not have focus, can inject all input data and events into the non-trusted virtual machine. In other embodiments, the input manager can inject all input data and events into the trusted virtual machine when the trusted virtual machine has focus. In still other embodiments, when the keyboard or input device is mapped into the trusted virtual machine, the input manager can ensure that all alphanumeric key presses are inserted into the trusted virtual machine while all operating-system-specific key presses are inserted into the trusted virtual machine.

In one embodiment, the input manager can input the input data (e.g. key presses, etc.) into a trusted virtual machine or a non-trusted virtual machine based on which type of virtual machine (e.g. trusted or non-trusted) has focus, and whether the input contains a predetermined sequence.

Thus, in many embodiments, the method 420 may determine where key events are directed from the physical device. In an example of one such embodiment, a user may press a key on the keyboard or move the mouse. The event may be received at the driver level by a control program executed by a dom0 entity. In one embodiment, the event may be forwarded to or received by the input manager. In some embodiments, the input manager may comprise a dynamic translator, such as QEMU, created by Fabrice Bellard. In a further embodiment, a dynamic translator may be provided for each virtual machine, trusted or non-trusted. If a window of the trusted virtual machine has focus, then the translator for the trusted virtual machine may allow the event to be injected into the trusted virtual machine. However, if the event is a special key combination, then the input event may be injected into a non-trusted virtual machine. If the window of the trusted virtual machine does not have focus, then the event may be injected into the non-trusted virtual machine. In one embodiment, however, if the event is a secure key combination, then the input manager may direct the key event to a secure key or password input box generated by a dom0 entity, as discussed above.

In many embodiments, when the user clicks on a window to give the trusted window focus, the input switcher may be notified of the change. In a further embodiment, when the user clicks on another window, the input switcher may be notified that the trusted window has lost focus. In other embodiments, the input manager may periodically request an identification of a window with focus.

E. Servicing Interrupts Generated Responsive to Actuation of Hardware Via Virtual Firmware Hardware devices, even relatively standard ones such as keyboards, may frequently include additional features such as media control buttons. Similarly, integrated systems like laptops may include additional keyboard keys, knobs, dials, buttons, or other features. To allow equipment manufacturers to provide these additional features, operating system manufacturers such as Microsoft have provided driver extensions to allow these devices to provide information and notification of components. For example, the Windows Management Instrumentation (WMI) is a set of extensions to the Windows Driver Model which an equipment manufacturer may use to provide information and event notification to the operating system. For example, an equipment manufacturer may provide firmware with tables that describe the added functionality and objects and methods used to control or interact with the functionality. For example, when a user presses a key on a keyboard, an interrupt is generated by the keyboard firmware that is normally captured by the Windows WMI layer, which then directs the operating system to retrieve the descriptive table to determine what the key is intended to trigger.

However, virtualization environments present additional difficulties for manufacturers wishing to add these features.

Because a hypervisor sits between virtual machines and the hardware layer, notifications may not be properly forwarded to one or more virtual machines. A hosted guest operating system may not be able to retrieve the table from the firmware provided by the manufacturer, or even know that it exists. Furthermore, the table cannot simply be retrieved and passed to the guest operating system without significantly modifying the operating system, because it normally expects only to receive objects and methods associated with an interrupt, when said interrupt is generated by the hardware device.

In an embodiment of a system for servicing interrupts generated responsive to actuation of hardware, virtual firmware may be used to communicate requests back and forth between the device firmware and the hosted operating system or systems. A dom0 entity, such as a hypervisor or control virtual machine, has direct access to the hardware of the computing device. Accordingly, when the user presses a key and the firmware generates an interrupt, the dom0 entity can capture the interrupt. The dom0 entity may forward the interrupt to virtual firmware of the guest virtual machine, which may forward the interrupt to the guest operating system as if it was the original hardware device.

The guest operating system, responsive to receiving the interrupt from the virtual firmware, may send a request to the virtual firmware for the objects and methods associated with the interrupt. The virtual firmware may forward the request to the dom0 entity, which may forward the request to the firmware of the hardware device.

The firmware of the hardware device may retrieve the objects and methods associated with the interrupt from memory, such as an Advanced Configuration and Power Interface (ACPI) table, and forward these objects and methods to the dom0 entity. The dom0 entity may forward the objects and methods to the virtual firmware, which may respond to the request from the guest operating system, providing information on how to utilize the functionality of the hardware.

Figure 5A:
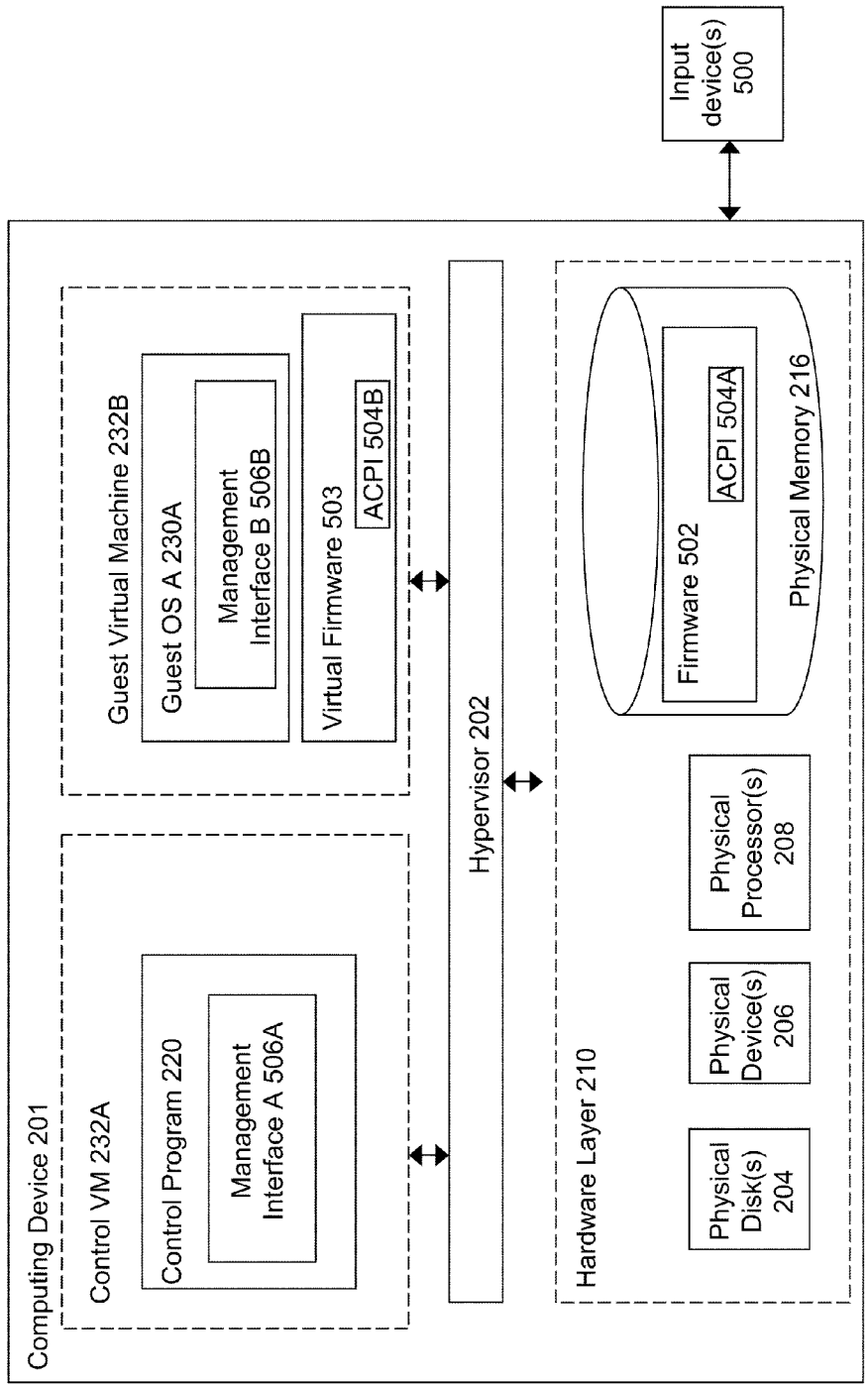
FIG. 5A is a block diagram depicting an embodiment of a system for servicing interrupts generated responsive to actuation of hardware via virtual firmware.

Referring briefly now to FIG. 5A, illustrated is a block diagram of an embodiment of a system for servicing interrupts generated responsive to actuation of hardware via virtual firmware. In addition to features discussed above, a computing device 201 may connect to or communicate with an input device or devices 500. In many embodiments, the input device 500 may be an input device 402 discussed above, or any other input device discussed herein. The input device 500 may communicate with the computing device 201 via a hardware driver able to receive raw data from the device and interpret the raw data into commands and data able to be interpreted by an operating machine or control program 220.

The computing device may include, retrieve or download firmware 502 from the input device 500 and/or may execute the firmware 502. In some embodiments, In some embodiments, the firmware 212 executing on the computing device 201, or more specifically on a processor 208 within the computing device 201, can include an advanced configuration and power interface (ACPI) layer 504A. An ACPI layer 504A can be a layer that provides one or more methods, objects and other management specifications and configurations for devices within the computing device 201. The ACPI layer 504A can further include objects, methods and specifications for managing power within the computing device 201. In some embodiments, the ACPI layer 504A can have exclusive control over all aspects of power management within the computing device 201 and can also configure devices within the computing device 201. The ACPI layer 504A, in some embodiments, can include an ACPI specification that lists one or more operating states. These operating states can outline system configurations such as: which devices in the computing device 201 should receive power; how much power should be delivered to devices within the computing device 201; whether to configure devices within the computing device 201 to terminate or start one or more services or processes; and other such configurations.

In one embodiment, the ACPI layer 504A can include a plurality of tables that include objects and methods for interfacing the firmware 502 with an operating system requesting information about a device or an interrupt generated by a device. For example, were a device connected to or included within the computing device 201 to generate an interrupt, an operating system, control program 220 or other program executing on the computing device 201 can query the ACPI layer 504A tables for information about that device and therefore about the interrupt. This information can be scraped or obtained from the firmware 502, and may include objects or methods associated with the device.

In some embodiments, the firmware 502 can include objects and methods for each device included within the computing device 201. For example, the firmware 502 can include an object for a keyboard that has a device ID specific to the keyboard. In this example, the keyboard object in the firmware 502 can also have methods that are specific to the keyboard. These methods can include functions and processes for receiving input from the keyboard, and functions and processes for sending commands to the keyboard. The ACPI layer 504A, in some embodiments, permits operating systems, control programs and other applications and processes to access the keyboard object within the firmware 502 and to further access the keyboard methods within the firmware 502 by acting as an interface between the firmware 502 and the operating system or program.

Just as the computing device 201 can include firmware 502, so can the virtual machines 232 executing on the computing device 201. In one embodiment, one or more virtual machines 232 executing on the computing device 201 may each include virtual firmware 503. Virtual firmware 503 may be a virtualized view of firmware 502 that executes on the computing device 201. In one embodiment, the control program 220 can generate virtual firmware 503 by analyzing the device objects within the firmware 502 on the computing device 201, and listing them in a table within the virtual firmware 503. The control program 220 can, in some embodiments, generate the virtual firmware 503 in response to a lifecycle event such as: startup of the control program 220; startup of a virtual machine 232; migration of a virtual machine 232; power down of the control program 220; power down of a virtual machine 232; boot-up of the computing device 201; or any other similar lifecycle event. The table included in the virtual firmware 503, in some embodiments, is similar to the firmware 502 in that it lists each device managed by the firmware 502 as well as an identifier of the device.

The virtual firmware 503 can, in some embodiments, include a virtual ACPI layer 504B. In some embodiments, the virtual ACPI layer 504B can function substantially similar to that of the computing device 201 ACPI layer 504A in that the virtual ACPI layer 504B can act as an interface between guest operating systems 230, control programs 220 and other applications, and the virtual firmware 503 on a machine 232.

In still other embodiments, the guest operating systems 230, control program 220 and other applications or services executing within the virtual machine(s) 232 can include a management interface 506A-B (generally referred to as a management interface 506). In some embodiments, the management interface 506 may be a windows management interface that interfaces directly with the ACPI layer within firmware to receive information about a device. In one embodiment, the management interface 506B can interface directly with the virtual ACPI layer 504B to obtain object information and methods associated with or assigned to a device within the firmware 502. For example, the management interface 506B can communicate with the virtual ACPI layer 504B to obtain information about a keyboard interrupt generated when a user actuates a key on the keyboard.

Figure 5B:
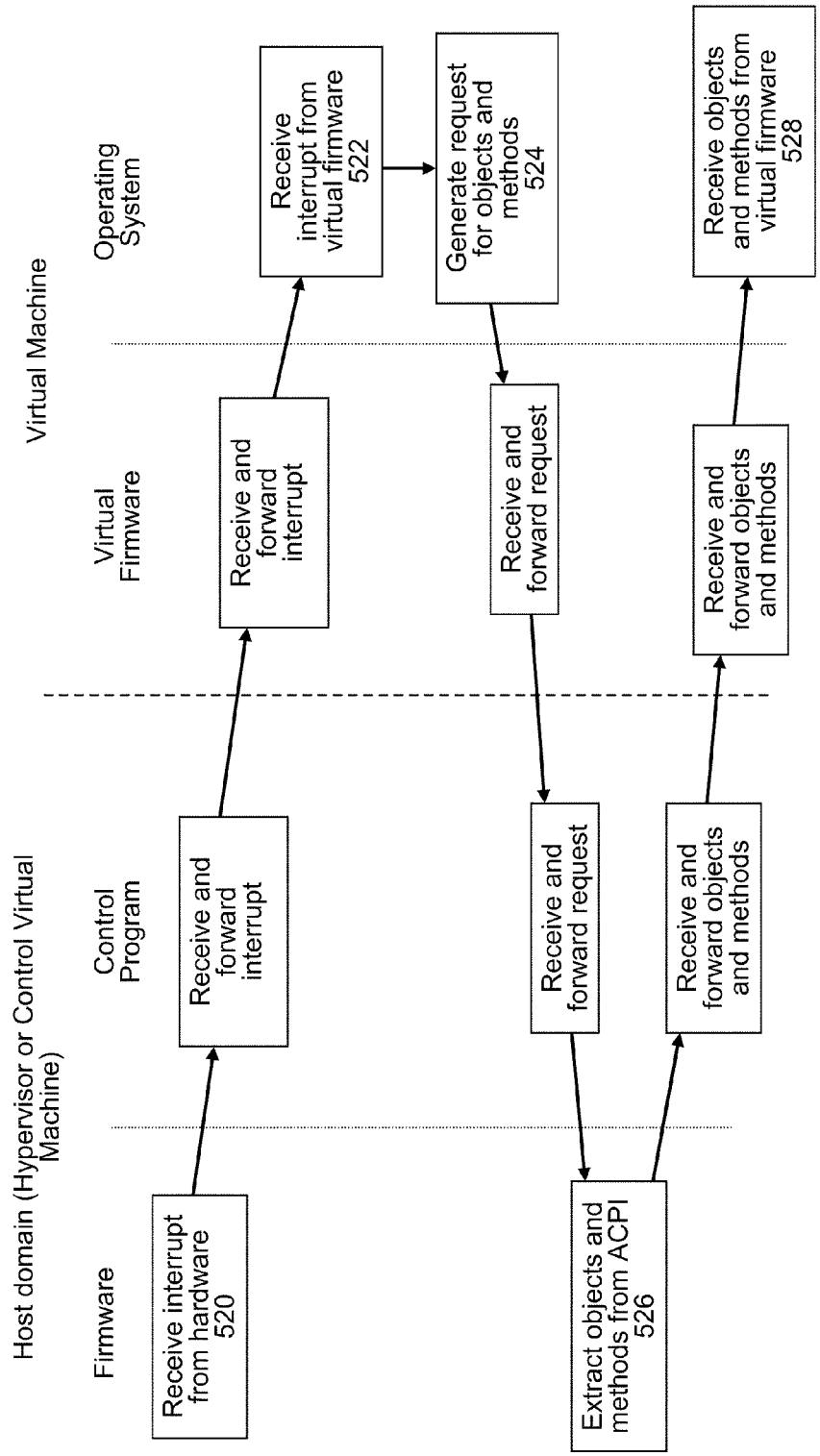
FIG. 5B is a flow diagram of an embodiment of a method for servicing interrupts generated responsive to actuation of hardware via virtual firmware.

Referring now to FIG. 5B, illustrated is a flow diagram of a method for servicing interrupts generated responsive to actuation of hardware via virtual firmware. In one embodiment, firmware of a computing device 201, which may be referred to as physical firmware as opposed to virtual firmware, may receive an interrupt from hardware at step 520 and forward the interrupt to a control program 220. The control program 220 may then inject into or forward the interrupt to virtual firmware executing on a virtual machine 232. Upon receipt of the interrupt, the virtual firmware may forward the interrupt to an operating system of the virtual machine.

At step 522, the operating system of the guest virtual machine may receive the interrupt from the virtual firmware. At step 524, responsive to receiving the interrupt, the operating system may generate a request for objects and methods associated with the interrupt, and may transmit this request to the virtual firmware. The virtual firmware may forward the request to the control program, which may forward the request to the physical firmware.

At step 526, responsive to receiving the request, the physical firmware may extract objects and methods associated with the interrupt from an ACPI table. The physical firmware may transmit the extracted objects and methods to the control program, which may forward them to the virtual firmware. The virtual firmware may forward the objects and methods to the operating system of the guest virtual machine. At step 528, the guest operating system may receive the requested objects and methods from the virtual firmware, allowing the guest operating system to properly interact with the hardware device.

Further referring to FIG. 5B, and in more detail, in one embodiment the firmware of the computing device 201 may receive an interrupt at step 520 and forward the interrupt to the control program 220. In some embodiments, the firmware of the computing device 201 facilitates the forwarding of the interrupt to the control program 220. The interrupt, in some embodiments, can be generated in response to the actuation of a key on a keyboard or in response to some other input event. For example, the interrupt can be generated in response to: the actuation of a key on a keyboard; the turning of a dial on a keyboard; touching a touch pad on the keyboard; clicking a mouse button, moving a mouse, or any other input event.

The control program 220, upon receiving the interrupt, can inject the interrupt into the virtual firmware on the virtual machine. In some embodiments, injecting the interrupt into the virtual firmware may comprise providing the interrupt to the virtual firmware such that the virtual firmware can receive the interrupt in much the same manner that the firmware of the computing device 201 receives the interrupt. Thus, the virtual firmware can facilitate the forwarding of the interrupt to an operating system 230 executing within a virtual machine 232.

In some embodiments, the virtual firmware forwards the interrupt to an operating system 230 of the virtual machine 232. Forwarding the interrupt to an operating system 230 of the virtual machine 232 can include forwarding the interrupt to a management interface of the virtual machine 232. The management interface can execute according to a windows management interface specification, and can interface directly with an ACPI layer of the virtual firmware.

At step 522, in some embodiments, an operating system 230 of the virtual machine 232 may receive the interrupt from the virtual firmware. At step 524, responsive to receiving the interrupt, the operating system may issue a request to the virtual firmware for objects and methods associated with the interrupt. The virtual firmware may in turn forward the operating system request to the control program 220, which receives the request and issues the request to the firmware of the computing device 201. In some embodiments, issuing the request to the firmware of the computing device 201 may include issuing a request for objects and methods associated with the interrupt to an ACPI layer of the firmware. In other embodiments, issuing a request to the virtual firmware may include issuing a request for objects and methods associated with the interrupt to an ACPI layer of the virtual firmware. In many embodiments, issuing a request for objects and methods can include issuing a request for objects and methods associated with the device that generated the interrupt. For example, the operating system 230 can request objects and methods associated with the keyboard and in some instances, the actuated key.

At step 526, responsive to receiving the request for objects and methods associated with the interrupt, an ACPI layer of the firmware of the computing device 201 may return to the requesting program (e.g. the control program 220) objects and methods associated with the device generating the interrupt and/or the interrupt. The control program 220 can receive the associated objects and methods, and can forward these objects and methods to the virtual firmware of the virtual machine 232. An ACPI layer of the virtual firmware can respond to the operating system's request by returning to a management interface of the operating system, the received objects and methods. At step 528, a management interface of the operating system 230 may receive the objects and methods associated with the interrupt and process them.

Thus, the operating system 230 may use the received objects and methods to interact with the virtual firmware as if it were the firmware of the input device, and the virtual firmware and control program together may form a communication chain for passing interrupts and requests from the operating system to the physical firmware.

F. Allocating a Universal Serial Bus (USB) Device to a Trusted Virtual Machine or a Non-Trusted Virtual Machine As discussed above, in many embodiments of virtualization environments, a user may simultaneously use both a trusted virtual machine and a non-trusted virtual machine. The operating systems executing within the two virtual environments often do not communicate regarding low level functions such as receiving plug-and-play and other devices. Thus, there can be situations where a control program must determine which virtual environment receives access to a universal serial bus (USB) device connected to the computing device, such as a USB thumb drive, web camera, graphics interface, or other USB device. In many cases, this determination can include determining the level of access a virtualization environment can have to a USB device. Absent policies or other directions indicating which virtual machine receives access to the USB device, issues may arise when an application is writing data to a disk, or when an application needs to continuously read data from a disk in order to finish a transaction.

Figure 6A:
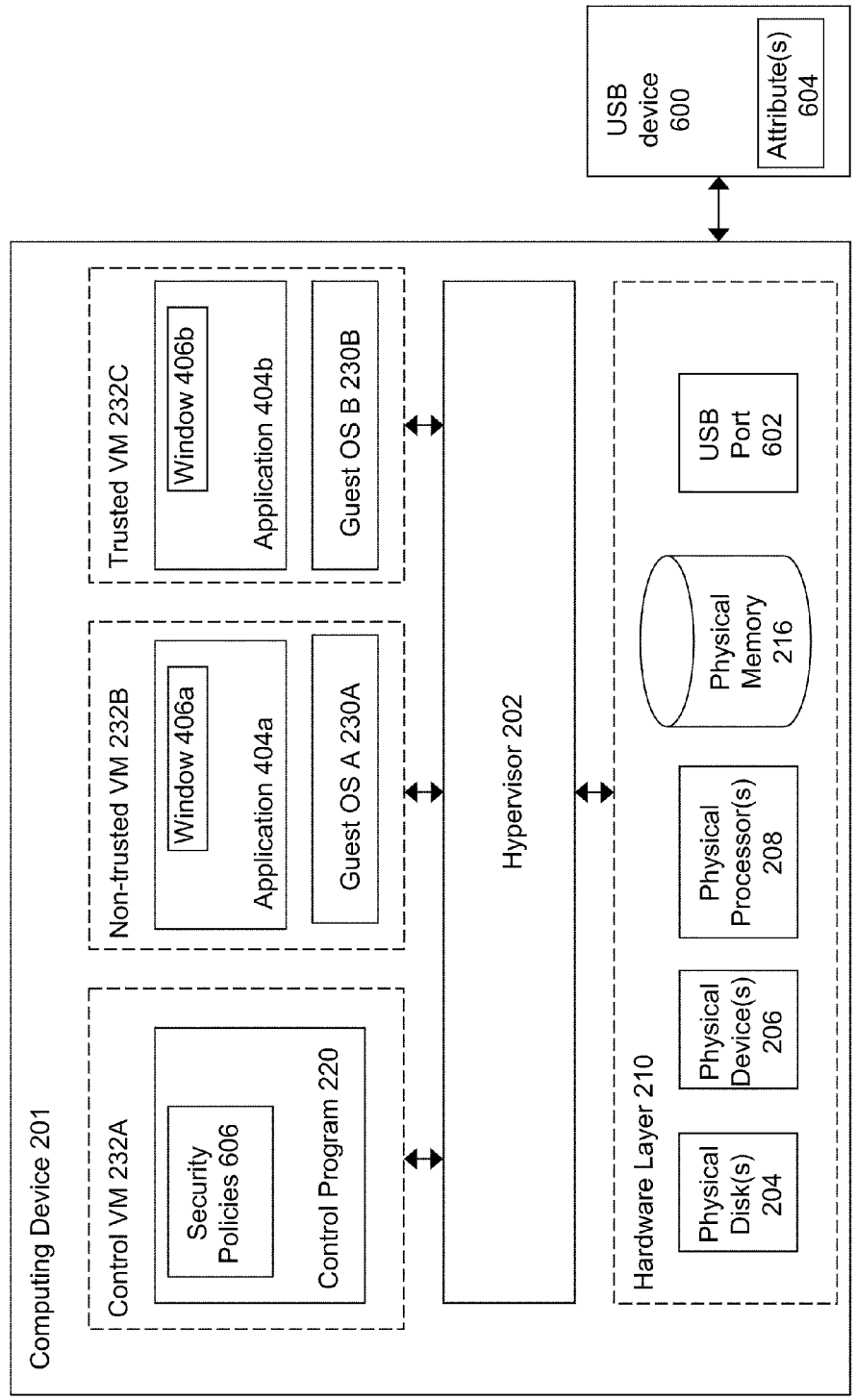
FIG. 6A is a block diagram depicting an embodiment of a system for allocating a universal serial bus (USB) device to a trusted virtual machine or a non-trusted virtual machine.

Referring briefly now to FIG. 6A, illustrated is a block diagram of an embodiment of a system for allocating a USB device to a trusted virtual machine or a non-trusted virtual machine. USB devices are plug-and-play devices and thus may frequently include firmware and ACPI tables. Accordingly, the discussion above regarding servicing interrupts via virtual firmware should be considered in connection with this section as well, and each virtual machine may comprise virtual firmware and ACPI tables. A computing device 201 may connect to or communicate with a USB device 600 via a USB port 602. The USB device may have one or more attributes 604, such as a serial number, device type, presence of encryption, or other features.

In some embodiments, a control program 220 may include or access a set of security policies 606 stored on the computing device 201 in a memory element or storage repository accessible to the control program 220. In some embodiments, the security policies 606 can be stored in a database on the computing device 201. The security policies 606, in some embodiments, can be a set of policies used by the control program 220, a policy engine of the control virtual machine 232A or hypervisor 202, or any other program to determine any of the following: whether a virtual machine 323 can access one or more memory elements, devices, processors or disks; whether a user can access one or more memory elements, devices, processors or disks; whether a device should be made available to one or more virtual machines 232; whether one or more commands generated by an application executing within a virtual machine 232 should be forwarded to a device on the computing device 201; and whether one or more requests generated by an application executing within a virtual machine 232 should be forwarded to a device on the computing device 201.

The policy engine may comprise an agent, service, program, application, routine, logic or other executable code for using the security policies 606 to determine whether one or more actions are permitted. In some embodiments, the policy engine can operate in lieu of other programs executing within the context of the control program 220. In other embodiments, the policy engine can operate in conjunction with the other programs.

Figure 6B:
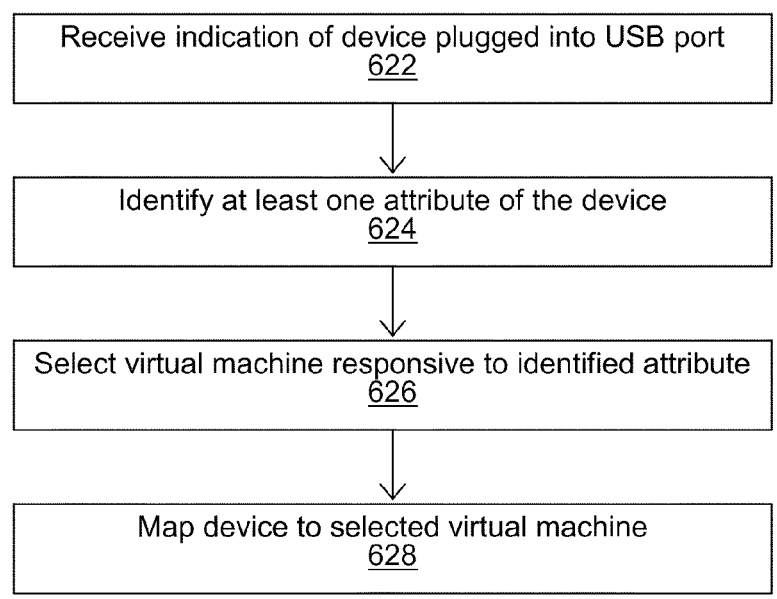
FIG. 6B is a flow chart of an embodiment of a method for allocating a universal serial bus (USB) device to a trusted virtual machine or a non-trusted virtual machine.

Illustrated in FIG. 6B is a flow chart of an embodiment of a method 620 for assigning a USB device to at least one virtual machine. At step 622, in some embodiments, a control program executing on a computing device within a virtualization environment may receive data that indicates a device was plugged into a USB port of the computing device. The control program may, at step 624, identify one or more attributes of the device. In a further embodiment, the control program may identify a security level of the device, responsive to application of one or more security policies to the one or more identified attributes. At step 626, the control program may select a virtual machine from a plurality of virtual machines, and at step 628 may grant the selected virtual machine access to the device or map the device to the selected virtual machine.

Still referring to FIG. 6B and in more detail, in one embodiment at step 622, the control program may receive data indicating that a device was plugged into a USB port of the computing device. Receiving data indicating that a device was plugged into a USB port, in some embodiments, can include receiving an interrupt generated responsive to device being plugged into the USB port. The interrupt can be serviced by firmware and forwarded to the control program as discussed above in connection with FIGS. 5A-5B. In other embodiments, the data can include a plug-and-play event notification generated by the control program or an operating system executing on the control virtual machine.

In some embodiments, at step 624, the control program may identify one or more attributes of the device. Identifying the device attributes may include querying the USB port for information about the device. This information may include any of the following: serial number; device identifier; device type; a device driver of the device; the presence of encrypted data on the device; or data on the device being locked or read-only. In some embodiments, the control program can query the USB port for information about the device. The USB port in turn can send the control program the device information within which the control program can identify relevant attributes of the device.

In a further embodiment, the control program may identify a security level of the device. Identifying a security level of the device may include using a serial number of the device or a device type of the device to query security policies for a security level of the device. The security policies can indicate whether the device should be allowed to be passed into one or more virtual machines executing on the computing device 201.

Based on an identification of the device attributes and/or an identification of a security level of the device, the control program may determine which virtual machine should receive the device. Upon making this determination, at step 626, the control program may select the determined virtual machine from amongst one or more virtual machines executing on the computing device. In some embodiments, the control program may reference a table that lists one or more device identifiers or device types and the virtual machines that can receive these devices. In other embodiments, the control program can by default pass the device to an active virtual machine. For example, if the applications in a virtual machine currently have focus or are currently executing, the control program can select that virtual machine by default.

In some embodiments, the control program may grant the selected virtual machine access to the device and/or map the device to the selected virtual machine at step 628. Granting access to the device can include passing the device to the selected virtual machine. In other embodiments, granting access to the device may include updating the selected virtual machine's virtualized view of available physical resources to include the device.

One advantage of the above technique is that, because a virtual machine's access to the USB device is decided by a entity external to the virtual machine, namely control program 220, security policies may be applied to the virtual machine's access at a level below the virtual hardware drivers. This may close off security holes while still allowing access to the USB device that ordinarily can only be resolved by disabling the USB device. For example, if a USB thumb drive has a rootkit hidden on it and set to execute automatically, ordinarily, granting access to the USB drive to a virtual machine would allow the rootkit to execute. While the operating system of the virtual machine may include defenses against such intrusion, these defenses usually operate at a software level above the USB driver, and accordingly may not be able to prevent all such attacks. Furthermore, because the defenses execute on the operating system that is the subject of the rootkit's attacks, the rootkit may be able to apply countermeasures to these defenses.

Conversely, in the method and system described above, control program 220 is monitoring and controlling access to the USB drive while executing externally to the virtual machine and operating system accessing the USB drive, either on a control virtual machine or on the hypervisor. Thus, the operating system executing the control program 220 is not the subject of the rootkit's attacks and may be unaffected by the rootkit. Additionally, the control program 220 can control a virtual machine's access to the USB drive at the hardware level.

Figure 6C:
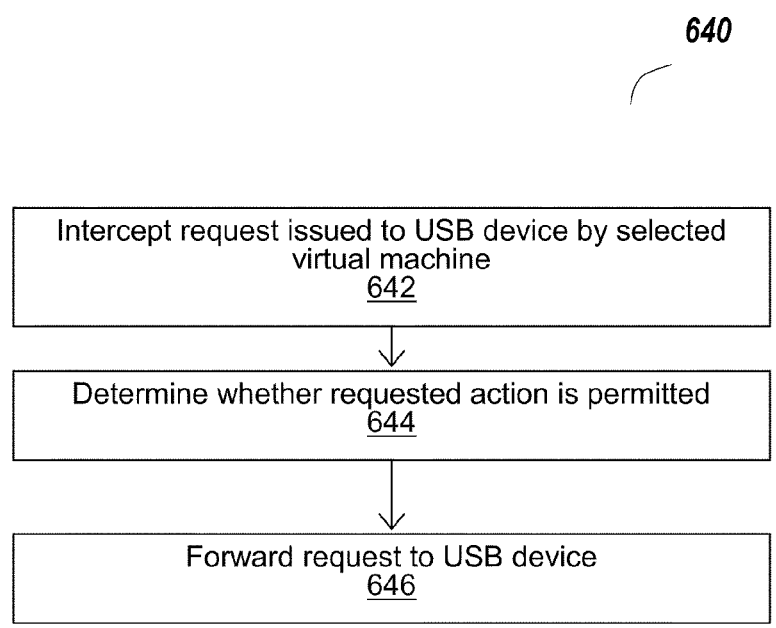
FIG. 6C is a flow chart of an embodiment of a method for applying a policy to a USB device allocated to a trusted virtual machine or a non-trusted virtual machine.

Referring now to FIG. 6C, illustrated is a flow chart of one embodiment of a method 640 for controlling a virtual machine's access to a device communicating with a USB port. In brief overview, at step 642, a control program 220 can intercept a read/write request issued to the device by a virtual machine having access to the device. For example, the virtual machine may have been granted access to the device using the method 620 discussed above. At step 644, the control program 220 may determine whether the requested action is permitted and, at step 646, may forward the read/write request to the device upon determining the requested action is permitted.

Further referring to FIG. 6C, and in more detail, at step 642 in one embodiment the control program can intercept a read/write request issued to the device. In some embodiments, the read/write request can be generated by a guest operating system executing on the virtual machine. In other embodiments, the read/write request can be generated by an application executing on the virtual machine. The control program can intercept all read/write requests issued by the virtual machine to the device. In some embodiments, the control program can also intercept all commands issued to the device including ejection commands, print commands, etc.

At step 644, the control program can determine whether the requested action is permitted. This determination, in some embodiments, can be made by querying security policies. Using the device attributes and an identifier of the virtual machine, the control program can query the security policies to determine whether a requested action is permitted. For example, the control program may use the fact that the requesting virtual machine is a trusted virtual machine, the fact that the device is a storage device, and the fact that the requested action is a request to write data to the storage device to determine whether the write should be allowed. In this example, the security policies may indicate that trusted virtual machines should not be allowed to write data to external storage devices, to prevent theft of sensitive information.

Based on this indication, the control program may determine that the requested action is not permitted. In some embodiments, the control program can return to the requesting application or virtual machine an error message indicating the requested action is not permitted. In other embodiments, the control program may determine that the requested action is permitted. Accordingly, at step 646, the control program may forward the request to the USB device.

G. Controlling Virtual Machine Access to an Optical Disc Drive

Managing access for a plurality of virtual machines to USB devices such as thumb drives, where the device may be mapped to a single virtual machine at a time, or access to an internal hard drive where different partitions may be mapped to a single virtual machine at a time, may be relatively straightforward due to this one-to-one mapping, although, as discussed above, determining which virtual machine can access the device may be more complicated. A similar mapping has been used for controlling access to optical disc drives, where a user explicitly maps an optical drive to a virtual machine through a control program. If the user wishes to use a second virtual machine to read a CD, the user must explicitly map the optical drive to the second virtual machine, essentially "installing" the optical drive as a new device. This may add undesirable complexity, particularly when a user is switching back and forth between a plurality of virtual machines.

It may be preferable in many instances to have a plurality of virtual machines each act as if they simultaneously have access to the optical disc drive, eliminating a requirement that the user manually switch access to the drive back and forth. One embodiment of a solution for granting a virtual machine exclusive access to an optical disc drive may performed in response to determining the virtual machine initiated a transaction with the optical disc drive. A drive manager executing on the computing device may obtain a transaction stream generated by an optical disc drive connected to the computing device. The drive manager may convert the transaction stream to a command stream. Based on an analysis of the command stream, the drive manager may determine which virtual machine of a plurality of virtual machines initiated a transaction with the optical disc drive. In response to this determination, the drive manager may lock the optical disc drive to grant the virtual machine exclusive access to the optical disc drive. In one embodiment, the drive manager may determine, subsequent to locking the optical disc drive, that the virtual machine stopped transacting with the optical disc drive. In response to this determination, the drive manager may unlock the optical disc drive.

Figure 7A:
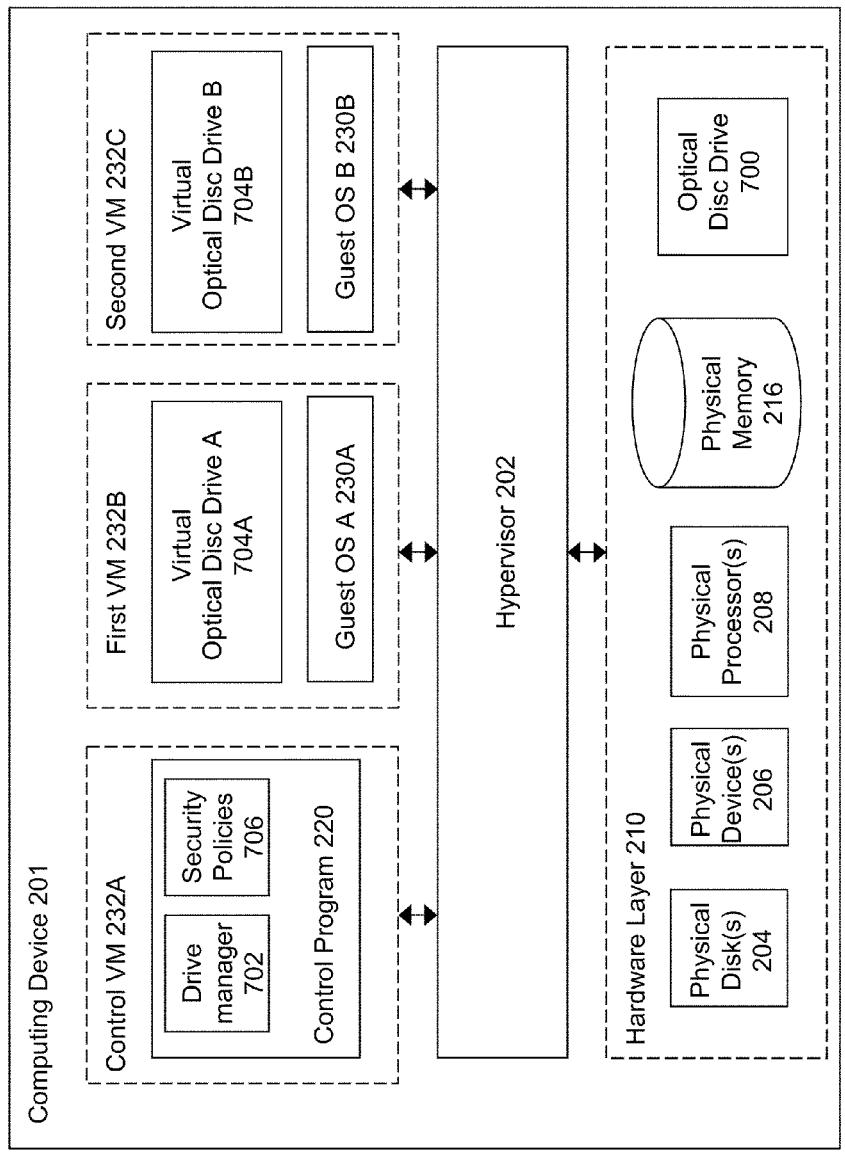
FIG. 7A is a block diagram depicting an embodiment of a system for controlling virtual machine access to an optical disc drive.

Referring now to FIG. 7A, illustrated is a block diagram of an embodiment of a system for controlling virtual machine access to an optical disc drive. In addition to other features discussed herein, a computing device may include an optical disc drive 700. In some embodiments, a control program 220 may comprise a drive manager 702. Although shown on the control virtual machine, in many embodiments the control program 220 may execute on the hypervisor 202. The hypervisor 202 may host a plurality of guest virtual machines 232B-232C, and each guest virtual machine may include a virtual optical disc drive 704A-704B (referred to generally as a virtual optical disc drive 704).

Still referring to FIG. 7A, and in more detail, the hardware layer 210 can, in some embodiments, include an optical disc drive 700. The optical disc drive 700 can be any optical disc drive, while in other embodiments the optical disc drive 700 can be any disk drive described herein. In some embodiments, the optical disc drive 700 can be a DVD drive; a DVD-R or DVD-RW drive; a CD drive; CD R/W drive; a BluRay drive; or any other disc drive. While FIG. 3B illustrates an optical disc drive 700, in some embodiments the disk drive can be a magnetic disk drive, such as a floppy disk drive; a ZIP drive; a tape drive; or any other magnetic disk drive.

In some embodiments, virtual machines 232 can include one or more virtual optical disc drives 704A-704B (generally optical disc drives 704). These virtual optical disc drives 704 can, in some embodiments, be a virtualized view of physical disc drives 700 on the computing device 201. Guest operating systems 230 executing on the virtual machines 232 can interact with the virtual disc drive 704 much the same way that the guest operating system 230 would interact with a physical disc drive 700. In many embodiments, and unlike traditional manual remapping of optical disc drives to virtual machines, these virtual disc drives 704 may appear accessible to each guest operating system 230 simultaneously. Therefore, the guest operating systems 230 can issue read and write commands to the virtual disc drive 704. In some embodiments, a drive manager 702 executing within the context of the control program 220 can intercept these read/write commands and send them to the physical disk drives 700.

In some embodiments, a drive manager 702 can execute within the control program 220. The drive manager 702, in some embodiments, can intercept read/write requests issued by applications executing within the virtual machines 232 and determine whether to pass those read/write requests to an optical disc drive 700 in the hardware layer 210. The drive manager 702 can also receive from the disc drive 700 a stream of transactions, and can intuit from the stream of transactions the current actions of the disc drive 700. In some embodiments, the drive manager 702 may convert the transaction stream to a stream of commands and analyze the generated command stream. Through this analysis, the drive manager 702 can determine whether the disc drive 700 is reading from a disc, writing to a disc, ejecting a disc, receiving a disc, idle, etc. Thus, the drive manager 700 can intuit from the transaction stream a state of the disk drive disc.

In one embodiment, a set of security policies 706 can be stored on the computing device 201 in a memory element or storage repository accessible to the control program 220. In some embodiments, the security policies 706 can be stored in a database on the computing device 201. The security policies 706, in some embodiments and similar to security policies 606 discussed above, can be a set of policies used by the control program 220, a policy engine, or any other program to determine any of the following: whether a virtual machine 323 can access one or more memory elements, devices, processors or discs; whether a user can access one or more memory elements, devices, processors or discs; whether a device should be made available to one or more virtual machines 232; whether one or more commands generated by an application executing within a virtual machine 232 should be forwarded to a device on the computing device 201; and whether one or more requests generated by an application executing within a virtual machine 232 should be forwarded to a device on the computing device 201.

Similarly, in some embodiments a policy engine executing on the computing device 201 can use the security policies 606 to determine whether one or more actions are permitted. In some embodiments the policy engine 606 can operate in lieu of other programs executing within the context of the control program 220. In other embodiments, the policy engine can operate in conjunction with the other programs.

Figure 7B:
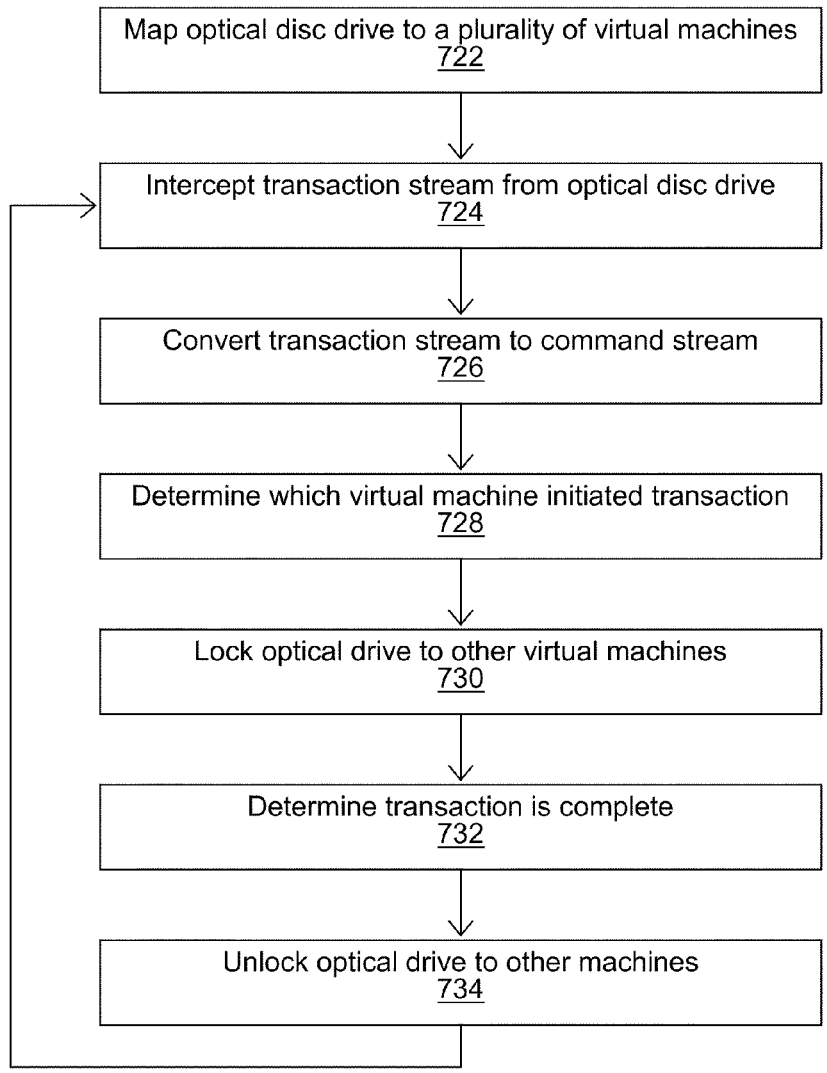
FIG. 7B is a flow chart of an embodiment of a method for controlling virtual machine access to an optical disc drive.

Illustrated in FIG. 7B is a flow chart of one embodiment of a method 720 for controlling access to a disk drive. At step 722, a drive manager, control program, or hypervisor may map an optical disc drive to a plurality of virtual machines. At step 724, the drive manager can receive or obtain a transaction stream from the optical disc drive and interpret and/or convert the transaction stream at step 726. Upon interpreting the transaction stream, at step 728, the drive manager may identify from the interpreted stream one or more transactions initiated by a virtual machine and determine which virtual machine initiated the transaction. Using this determination, the drive manager can then control access to the optical disc drive at step 730.

In some embodiments, the drive manager may continue monitoring communications between the disc drive and the determined virtual machine. Upon determining the transaction is complete at step 732, at step 734 the drive manager may unlock the optical drive or allow other virtual machines to transmit requests to the optical drive.

Further referring to FIG. 7B, and in more detail, in one embodiment the method 720 can be carried out by a drive manager. In other embodiments, the method 720 can be carried out by the control program. In still other embodiments, the method 720 can be carried out by any combination of the drive manager and the control program.

In one embodiment, at step 722, the drive manager, control program, control virtual machine, or hypervisor can map an optical disc drive connected to a computing device to a plurality of virtual machines executing on the computing device. In some embodiments, mapping the optical disc drive may comprise updating a virtualized view of hardware of each virtual machine to include the optical disc drive. In one embodiment, mapping the optical disc drive may comprise providing a virtual optical disc drive on each virtual machine, the virtual optical disc drive associated with the physical optical disc drive.

In some embodiments, the drive manager may receive requests to read from a disc within the disc drive, or requests to write to a disc within the disc drive. These requests can be issued by one or more guest operating systems 230 executing within the context of a virtual machine 232. In other embodiments, these requests can be issued by one or more applications executing within the context of a virtual machine 232. For example, the drive manager can intercept a read request issued by a guest operating system 230 to a disc drive. The issued request can include commands instructing the disc drive to return to the guest operating system 230 the data stored in one or more sectors of memory. The drive manager can intercept this request to determine whether to forward the request to the physical disc drive.

In some embodiments, the drive manager can receive a transaction stream generated by the disc drive at step 724. In one embodiment, the drive manager may obtain the transaction stream responsive to intercepting a read/write request. In other embodiments, the drive manager may continuously interpret the transaction stream to track the state of the disc drive. In still another embodiment, the drive manager obtains or receives the transaction stream when a second virtual machine 232B issues a read/write request while a first virtual machine 232A accesses the disc drive.

The transaction stream received from the disc drive, in some embodiments, can include a constant stream of small computer system interface (SCSI) commands output by the disc drive. In other embodiments, the transaction stream can include data formatted according to any type of communication protocol or standard. Typically, the SCSI commands are transmitted by the disc drive over an ATAPI or ATA interface or cable. The commands can be more generally referred to as machine commands, and in many embodiments they must be converted by a driver into a transaction format that can be processed by an operating system. When an operating system, in some embodiments, issues a command to the disc drive, that command is converted into a machine command that can be interpreted by the disc drive.

In one embodiment, the drive manager may receive the transaction stream generated by the disc drive and convert the transaction stream into commands that can be interpreted by the operating system or control program 220 at step 726. Converting the transaction stream can include reading through the transactions and matching sections of the transaction stream to a corresponding operating system command.

In some embodiments, the drive manager can determine whether a virtual machine 232 has initiated one or more transactions with the disc drive at step 728. In some embodiments, this determination can further include determining a state of the disc drive, where the state can be any of the following states: reading from a disc; writing to a disc; ejecting a disc; receiving commands; issuing commands; transmitting data; or any other state of the disc drive.

Upon determining whether the virtual machine 232 initiated a transaction with the disc drive, the drive manager may then control access to the optical disc drive at step 730. In one embodiment, controlling access to the optical disc drive may comprise locking the optical drive to prevent other virtual machines from accessing the drive, reading data from the drive, issuing requests to the drive, or otherwise interacting with the drive. In other embodiments, controlling access to the disc drive can include determining whether an application or virtual machine has permission to access the disc drive, and preventing unqualified applications from issuing read/write requests to the disc drive. In still other embodiments, controlling access to the disc drive can include receiving a read/write request from a virtual machine 232, determining another virtual machine 232 is accessing the disc drive, and returning to the initial virtual machine a message indicating the disc drive is in use. In still another embodiment, controlling access to the disc drive may include buffering a request from a second virtual machine while a first virtual machine is accessing the disc drive, such that the buffered request may be issued to the disc drive when the first virtual machine has completed accessing the disc drive. In many embodiments, controlling or locking the optical drive to other virtual machines while a first virtual machine is accessing the disc drive may be performed external to the guest virtual machines, by the control virtual machine or hypervisor, such that the operating system of each other guest virtual machine does not know that it is temporarily prevented from accessing the disc drive.

In one embodiment, the drive manager may grant a first virtual machine access to the disc drive at step 730. The drive manager may then receive a read/write request issued by an application executing in a second virtual machine, and in some embodiments, may respond with a response indicating the drive is not available.

In some embodiments, granting exclusive access to the disc drive can include identifying the type of transaction to be carried out by the virtual machine. In other embodiments, granting exclusive access to the disc drive can include determining security credentials, access rights, or other similar permissions for the virtual machine and/or the application issuing the read/write requests.

In many embodiments, the drive manager may grant exclusive access to the disc drive to a virtual machine during the pendency of a transaction. In other embodiments, the drive manager may grant exclusive access during a period of time required to receive an acknowledgement, data, response or other information from the disc drive.

In some embodiments, the drive manager can receive or intercept another read/write request from another virtual machine while an initial virtual machine transacts with and otherwise accesses the disc drive. Thus, the drive manager receives the other virtual machine's read/write request at the same time that an initial virtual machine transacts with the disc drive. The drive manager can determine that another virtual machine is transacting with the disc drive by analyzing the transaction stream generated by the disc drive. In other embodiments, the drive manager can track when and to which virtual machine and/or application the drive manager has granted exclusive access to the disc drive.

In some embodiments, upon determining that an initial virtual machine is transacting with the disc drive, the drive manager can return to the other virtual machine or application executing on the other virtual machine, a response indicating the drive is not available. The response can, in some embodiments, include an error message or device busy alert. In other embodiments, the drive manager can prevent applications on another virtual machine from viewing the disc drive when the disc drive is exclusively assigned to an initial virtual machine. In still other embodiments, the drive manager can store the read/write request to a queue or buffer, and forward the request to the disc drive once the initial virtual machine stops transacting with the disc drive. In one embodiment, the drive manager can issue a notice to the virtual machine and/or application indicating that the device is unavailable, while substantially simultaneously storing the request to a queue.

At step 732, in many embodiments, the drive manager can determine that an initial virtual machine stopped transacting with a disc drive. In some embodiments, the drive manager can make this determination by receiving an indicator from the virtual machine that the transaction has ended. In other embodiments, the drive manager can make this determination by interpreting the transaction stream generated by the disc drive to determine a series of actions taken by the disc drive. Transactions in which the disc drive indicates it has finished a task can in some embodiments indicate that a virtual machine stopped transacting with the disk drive.

The drive manager can then revoke exclusive access to the disc drive at step 734. In some embodiments, the drive manager can revoke exclusive access by allowing other virtual machines to access the disc drive. In one embodiment, the drive manager can revoke exclusive access by updating a database, list or table to indicate that the virtual machine no longer has exclusive access to the disc drive. Steps 724-734 may be repeated, such that upon receiving a read/write request for the disc drive, issued by another virtual machine, the drive manager can grant the other virtual machine exclusive access to the disc drive. In other embodiments in which the drive manager has queued or buffered requests from the other virtual machines, the drive manager may grant each virtual machine exclusive access in turn and transmit the corresponding buffered requests to the disc drive to step through the queue. This may be done in a first-in, first-out (FIFO) order, a first-in, last-out (FILO) order, a round robin method, or any other order.

H. Providing Access to Virtual Machines to Data Associated with a Connection to a Wireless Local Area Network, Via a Designated Wireless Local Area Network Driver Conventionally, when a number of virtual machines share access to a wireless local area network (LAN) driver, one of the virtual machines is nominated as the controller of the wireless local area network driver and, therefore, to access to the wireless local area network. The controller typically runs a communications stack, which may be referred to as a supplicant stack. The controller handles, via the wireless LAN driver, the process of connecting to a wireless network. However, other virtual machines attempting to access data identifying a characteristic of the established connection, which is made available by the driver, are prevented from doing so because, typically, only the controller can access this data.

In some embodiments of a solution for providing access to a plurality of virtual machines to characteristics and data associated with a connection to a wireless LAN, a paravirtual wi-fi driver is a driver that sits in the guest operating system of a virtual machine and appears to the guest operating system as a wireless network card. The guest operating system commands to this wireless card and the virtualization layer (e.g. the control program) can determine which virtual machine 232 should have access to the network. In some embodiments, the guest operating system never gives over the network key, the guest OS merely negotiates with the control program for access. In some embodiments, a guest virtual machine controlling and maintaining network connections may include additional DNS and routing tables corresponding to a second virtual machine and may act, via the paravirtual wi-fi driver, as a network bridge to the second virtual machine. In many embodiments, this bridging behavior will not be apparent to an operating system of either the guest operating system or the second virtual machine, as the bridged data may be passed through a V2V or private communication channel rather than a network connection, even an internal one.

Figure 8A:
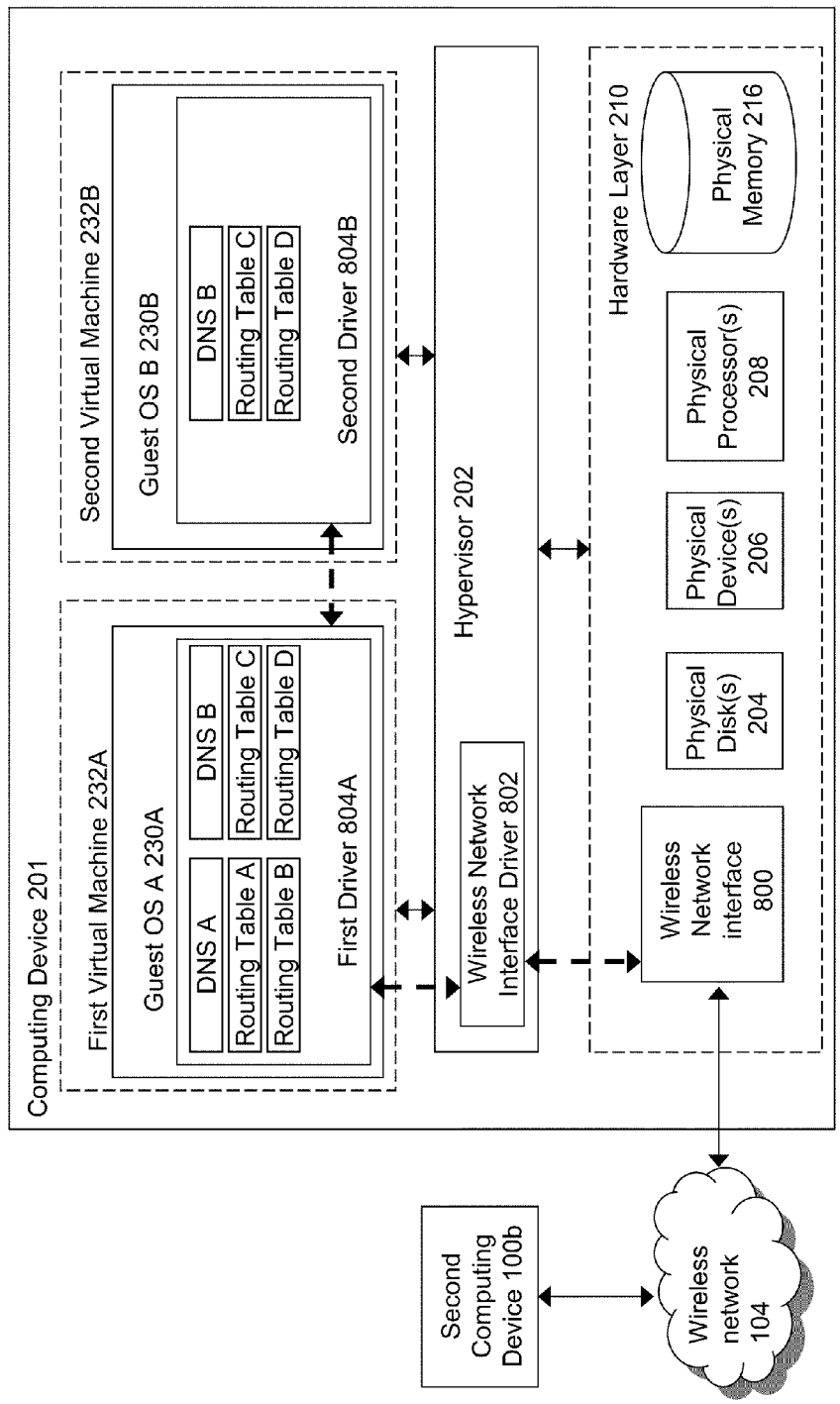
FIG. 8A is a block diagram of an embodiment of a system for providing to virtual machines, via a designated wireless local area network driver, access to data associated with a connection to a wireless local area network.

Referring now to FIG. 8A, a block diagram depicts one embodiment of a system for providing, to virtual machines on a physical device, via a designated wireless local area network driver, access to data associated with a connection to a wireless local area network. In brief overview, and in addition to many of the components discussed in more detail above, the system includes a wireless network interface 800, a wireless network interface driver 802, a first driver 804A, and a second driver 804B. The first driver 804A may be executed by a first virtual machine 232A, which executes on a physical computing device A 201. The first driver 804A may establish, via a communications stack not illustrated, a connection to a second computing device 100*b* via a wireless local area network 104 and maintain the established connection. The second driver 804B may be executed by a second virtual machine 232*b*, which executes on the physical computing device 201. In some embodiments, the second driver 804B may request access to data identifying a characteristic of the established connection. The second driver 804B may receive, from the first driver 804A, the requested data. The second driver 804B may, in some embodiments, display the data to a user of the physical computing device 201. In some embodiments, the hypervisor 202 may enable access by the first driver 804A to the wireless network interface and disable access by the second driver 804B to the wireless network interface.

Still referring to FIG. 8A and in greater detail, a driver may comprise a software application executed by a computing device that controls a device connected, directly or indirectly, to the computing device. In one embodiment, the first driver 804A is a driver executed by a virtual machine monitor, not illustrated, executed by another virtual machine; for example, a control program 220 executing in a control virtual machine may execute the virtual machine monitor, which executes the first driver 804A. In another embodiment, the other second driver 804B is authorized to access the physical wireless network interface card 800. In still another embodiment, the second driver 804B is a virtual driver allocated access to a virtualized wireless network interface card. In yet another embodiment, the first driver 804A and the second driver 804B are drivers executed on the physical computing device A 201*a* that provide functionality for controlling a physical card 800.

In one embodiment, the first driver 804A is a wireless local area network driver (which may be referred to as a Wi-Fi driver). In another embodiment, the first driver 804A controls, via a communications stack, a physical network interface card 800 with which the physical computing device 201 may connect to a second computing device 100*b* via a wireless local area network 104. In another embodiment, the first driver 804A is a virtualized software program that communicates, via a communications stack, with a physical driver 802, which, in turn, controls the physical network interface card 800 with which the physical computing device 201 connects to the second computing device 100*b* via the wireless local area network 104. In still another embodiment, the second driver 804B is also a Wi-Fi driver.

Each of first driver 804A and second driver 804B may include or communicate with a network communications stack or protocol stack provided by the guest operating system 230 executing the driver 804. In some embodiments in which a dom0 entity executes a wireless network interface driver 802 (sometimes referred to as the physical driver, as opposed to the virtual drivers 804), these communications stacks may be referred to as supplicant stacks. The communications stacks may comprise software implementations of a computer networking protocol suite.

In one embodiment, the wireless network interface 800 may comprise a wireless network interface card of any type and form, including a PCI card, a USB wireless network interface, a PCMCIA wireless network interface, or any other type of wireless network interface. In some embodiments, the wireless network interface 800 may comprise an internal card installed inside the physical computing device 201.

In some embodiments, a wireless network interface card 800 converts data from the physical computing device 201 into radio signals. In one of these embodiments, the wireless adapter card 800 includes an antenna that transmits the radio signals to a wireless router in the network 104 for forwarding to the second computing device 100*b*. In one embodiment, the hypervisor 202 is a hypervisor as described above. In another embodiment, the hypervisor 202 includes functionality for enabling or disabling access, by a driver, to a communications stack. In still another embodiment, and by way of example, the hypervisor 202 includes a component for transmitting a message to a virtual machine with an instruction to enable or disable a driver.

In one embodiment, a virtual machine monitor executed by an operating system of a virtual machine executes the first driver 804A. In another embodiment, the virtual machine monitor is a component executed by the control program 220 discussed above. In another embodiment, the virtual machine monitor is the control program 220.

In some embodiments, the first driver 804A communicates, via a physical wireless network interface driver 802 executed by a dom0 entity such as the hypervisor 202 or a control virtual machine, with wireless network interface 800. The dom0 entity may allow the first virtual machine 232A access to the wireless network interface 800 in this manner, while preventing a second virtual machine 232B from accessing the interface. This may be done to allow the first virtual machine 232A continuous and exclusive access to the wireless network interface 800 to maintain a wireless connection. For example, the wireless connection may include broadcasted keep-alives and other communications messages between the computing device 201 and a wireless router or base station, even when no IP connections to another computing device 100*b* are active.

In one embodiment, the first driver 804A may act as a network bridge for the second driver 804B and/or the second virtual machine 232B. In many embodiments, this may be done without an operating system 230 of either virtual machine 232 needing to be configured to bridge the network connection, and avoids the first virtual machine 232 needing to have two separate network drivers active to bridge the connection. In one such embodiment, data and requests of the bridged connection may be passed between the first driver 804A and the second driver 804B using shared memory pages or V2V messages, as discussed above. In many embodiments, the first driver 804A may comprise a Domain Name Service (DNS) table A and incoming and outgoing routing tables A and B for the guest operating system A 230A. Additionally, the first driver 840A may comprise a DNS table B and incoming and outgoing routing tables C and D for the guest operating system B 230B of the second virtual machine 232B. By maintaining these additional routing and DNS tables, the first driver 804A may direct communications properly between the wireless network interface 800 and applications of the first virtual machine 232A or the second virtual machine 232B. In many embodiments, the first driver 804A may receive the DNS table B, and routing tables C and D from the second driver 804B, which may store identical tables.

Figure 8B:
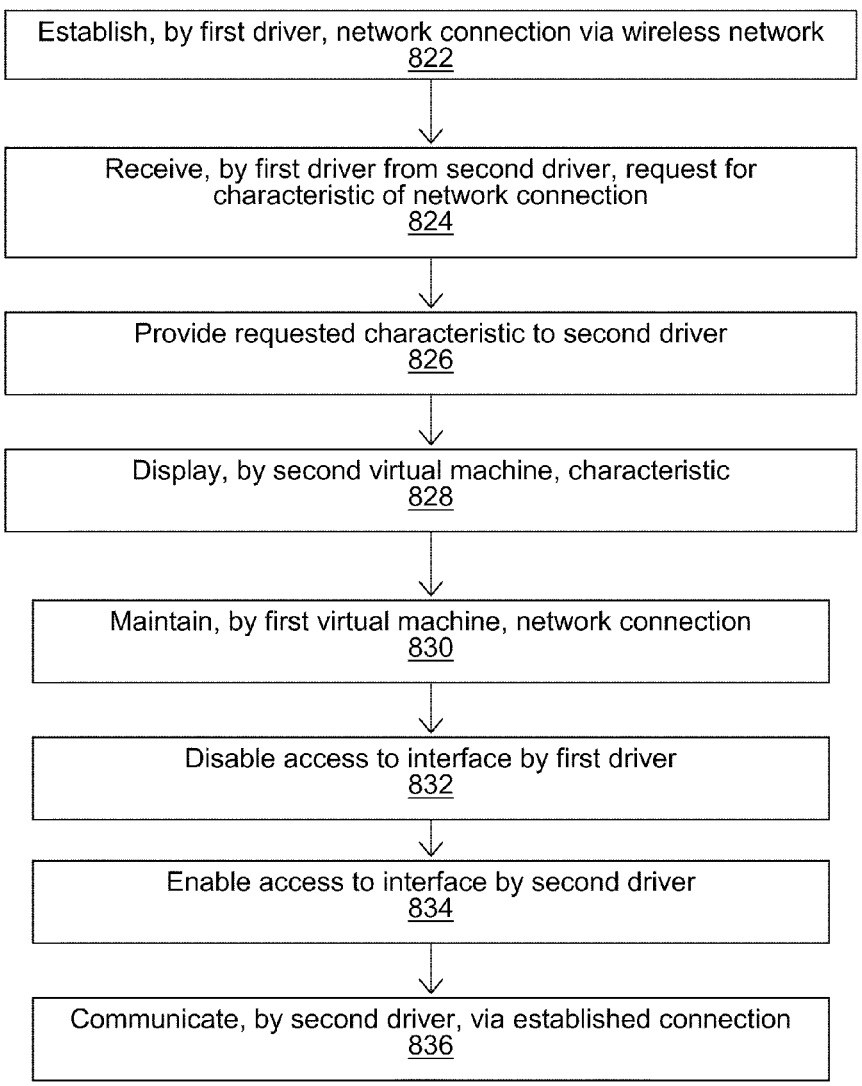
FIG. 8B is a flow chart of an embodiment of a method for providing to virtual machines, via a designated wireless local area network driver, access to data associated with a connection to a wireless local area network.

Referring now to FIG. 8B, a flow diagram depicts one embodiment of a method 820 for providing, to virtual machines on a physical device, via a designated wireless local area network driver, access to data associated with a connection to a wireless local area network. In brief overview, the method 820 includes establishing, at step 822 by a first driver executed by a first virtual machine hosted by a hypervisor executed by a first computing device, a network connection via a wireless network. At step 824, the first driver may receive from a second driver executed by a second virtual machine hosted by the hypervisor a request for a characteristic of the network connection. At step 826, the first driver may provide the requested characteristic to the second driver. At step 828, in some embodiments, an operating system of the second virtual machine may display the characteristic to a user.

At step 830, in some embodiments, the first virtual machine may maintain the established network connection. At step 832, in one embodiment, the hypervisor may disable access to the wireless network interface by the first driver. At step 834, the hypervisor may enable access to the wireless network interface by the second driver. At step 836, the second driver may communicate via the established network connection.

Still referring to FIG. 8B and in greater detail, at step 822, a first driver executed a first virtual machine executing on the physical computing device may establish a network connection via a wireless network. In some embodiments, the hypervisor 202 enables access by the first driver to a communications stack associated with a physical wireless network interface. Access by a second driver executed by a second virtual machine to the communications stack may be disabled. The first driver may establish, via the communications stack of the physical wireless network interface, a connection to a second computing device via a wireless local area network. In one embodiment, the first driver maintains the established connection. In another embodiment, the first driver receives connection-related data—such as an identification of the wireless local area network, an identifier of a level of signal strength of the connection, or other data identifying a characteristic of the connection.

In some embodiments, establishing and/or maintaining a network connection may comprise providing authorization or login credentials to a wireless router or base station. For example, in one such embodiment, the first driver may provide a wired equivalent privacy (WEP) key or a wifi-protected access (WPA or WPA2) key to the wireless router.

At step 824, in some embodiments, the second driver may request, from the first driver, access to data identifying a characteristic of the established connection. In one embodiment, the first driver receives from the second driver a request for an identification of a signal strength of the established connection. In another embodiment, the first driver receives from the second driver a request for an identification of the wireless local area network.

At step 826, the first driver may provide the requested characteristic to the second driver. In some embodiments, the first driver may provide the requested characteristic via a V2V channel or shared memory region or other inter-virtual machine communication channel.

At step 828, in some embodiments, the second virtual machine, an operating system of the second virtual machine, an application of the second virtual machine, or the second driver may display, to a user of the computing device, the received data. Displaying the received data may comprise displaying the network name, SSID, connection strength or other variables in a manner typically used by the operating system of the second virtual machine to display such data when executing on a non-virtualized machine.

At step 830, in some embodiments, the first virtual machine and/or the first driver may maintain the network connection. In some embodiments, the first virtual machine may maintain the network connection by transmitting a signal to a base station or wireless router to keep the wireless connection alive.

In some embodiments, at step 832, the hypervisor may disable access, by the first driver, to the communications stack of the physical wireless network interface or otherwise enable access to the interface. In some embodiments, disabling access by the first driver may comprise disabling access without closing an established or maintained network connection. This may be done to enable another virtual machine to utilize the established connection.

At step 834, in one embodiment, the hypervisor may enable access to the interface by the second driver. In one embodiment in which the first driver provided login credentials or keys to establish the connection, enabling access by the second driver may comprise not requiring the user or the second driver to provide such login credentials or keys to utilize the established network connection. Rather, the network connection established by the first driver may be utilized by the second driver without requiring additional authentication. This may be done, for example, by not closing the established connection when transferring access from the first driver to the second driver. Accordingly, at step 836, the second driver may communicate via the established connection.

I. Preventing Access to Display Graphics Generated by a Trusted Virtual Machine

As discussed above, in many instances a user may use a non-trusted virtual machine and a trusted virtual machine simultaneously. For example, the user may run a media player application on a non-trusted virtual machine while working on corporate data on a trusted virtual machine. In some cases, an application executing within a unsecure or non-trusted, user-specific virtual machine, may request screen graphics generated by applications executing within a secure, trusted, company-specific virtual machine. Typically each virtual machine has access to a single graphics processing unit (GPU), therefore each virtual machine typically has access to most aspects of the GPU. In particular, in many cases each virtual machine has read/write access to memory used by the GPU to store rendered images and other graphics data. Thus, in the above-mentioned scenario, the non-trusted virtual machine can read the graphics generated by the trusted virtual machine by reading from the GPU memory. This situation is not ideal because it can open security loopholes whereby users can obtain information from a trusted virtual machine simply by capturing screen images or "screen-scraping."

In one solution to this problem, a graphics manager executing on the computing device, may receive a request from the trusted virtual machine to render graphical data using a graphics processing unit of the computing device. The graphics manager may select and assign a secure section of memory of the graphics processing unit to the trusted virtual machine. The graphics manager may render graphics from graphical data generated by trusted secure virtual machine to the secure section of the graphics processing unit memory. If the graphics manager receives a request from an application executing on a non-trusted virtual machine to read graphics that are rendered from the trusted virtual machine graphical data, and that are stored in the secure section of the graphics processing unit memory, the graphics manager can prevent the application from reading the trusted virtual machine graphics from the secure section of the graphics processing unit memory.

Figure 9A:
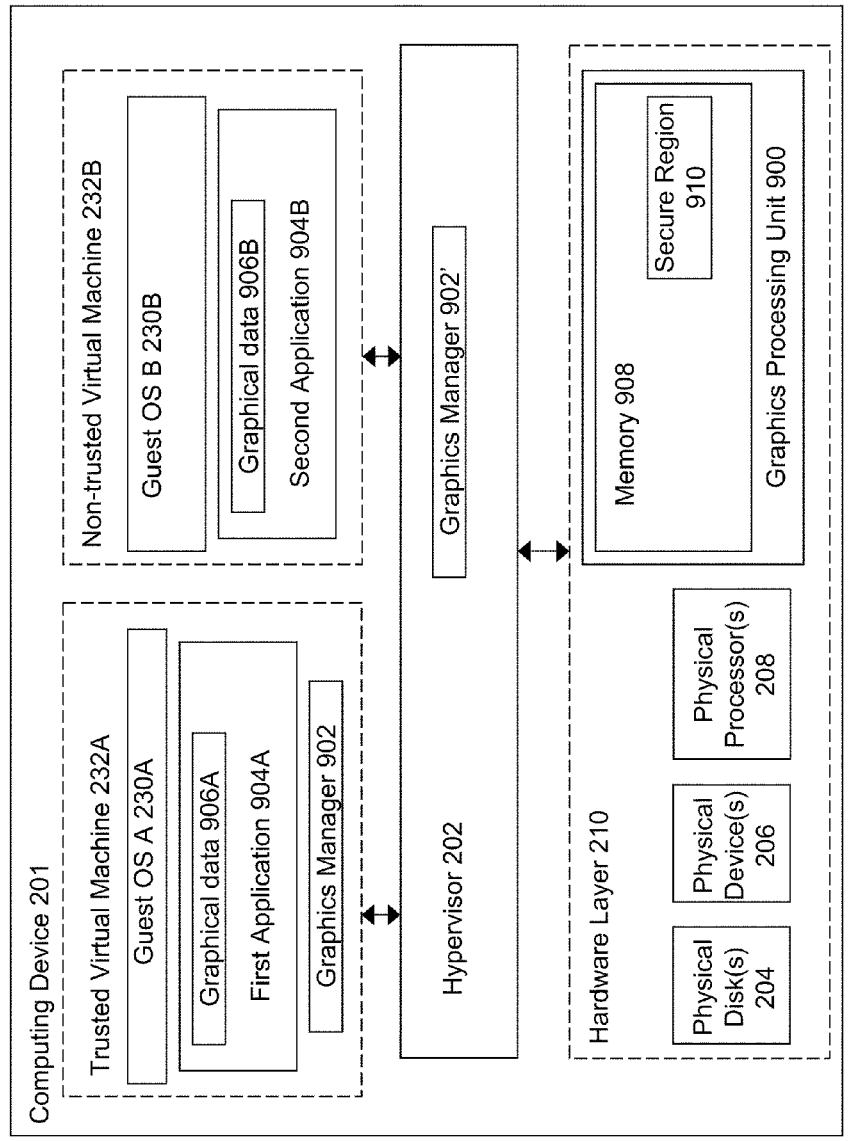
FIG. 9A is a block diagram of an embodiment of a system for preventing access to display graphics generated by a trusted virtual machine.

Referring now to FIG. 9A and in brief overview, in one embodiment of a system for preventing access to display graphics generated by a trusted virtual machine, in addition to other components discussed herein, a computing device 201 may comprise a graphics processing unit (GPU) 900, which may include or access a memory unit 908. The system may also include a graphics manager 902 executed by a trusted virtual machine and/or a control virtual machine or control program 220 discussed above, or a graphics manager 902' executed by a hypervisor 202. Thus, the graphics manager 902 may be executed by a trusted dom0 entity. The system may include a trusted virtual machine 232A, which may execute a first application 904A. The first application 904A may generate graphical data 906A, such as windows, toolbars, buttons, video, images, or other data. In some embodiments, the first application 904A may comprise a remote access application, such as an ICA or Remote Desktop Protocol client and may connect to a server and display graphical data 906A generated remotely and delivered to the application. Similarly, the system may include a non-trusted virtual machine 232B which may execute a second application 904B, generating graphical data 906B.

A graphics processing unit (GPU) 900, in some embodiments, can be included in the hardware layer 210 of the computing device 201. The graphics processing unit 900 can be any processor able to render graphics. In some embodiments, the graphics processing unit 900 may include memory 908 that the graphics processing unit 900 can use to store rendered graphics and other graphics data. In other embodiments, the graphics processing unit 900 is allocated a portion of the physical memory 216, discussed above, which the graphics processing unit 900 can use to store graphics information and rendered graphics.

In some embodiments, the system may include a graphics manager 902. The graphics manager 902 may be executed in any trusted environment, including a control virtual machine and/or a hypervisor 202. The graphics manager 902 can act as a layer between the virtual machines 232, such that the graphics manager 902 can intercept requests issued to the physical GPU 900 by applications 904A-904B executing on the virtual machines 232. While FIG. 9A illustrates a graphics manager 902 that executes on the trusted virtual machine 232A, in some embodiments the graphics manager 902 may be included within a control program 220, a tools stack 224, or executed by the hypervisor, an underlying operating system, or a control virtual machine. In some embodiments, the graphics manager 902 assigns graphics memory locations to applications 904 and/or virtual machines 232 executing on the computing device 201. In other embodiments, the graphics manager 902 segments the GPU memory 908 into secure and unsecure memory sections. In still other embodiments, the graphics manager 908 segments physical memory 216 assigned to the GPU 900 into secure and unsecure memory sections including a secure region 910.

When an application 904 issues a request or command to the GPU 900, in some embodiments, the graphics manager 902 can intercept that request and determine whether the command or request should be forwarded to the GPU 900. The graphics manager 902, in some embodiments, may make that determination by reviewing one or more security policies, discussed in more detail above, to determine whether the application 904 has permission to write to memory or read from a particular area of memory, referred to as a secure region 910. In some embodiments, the graphics manager 902 forwards identifying information about the application 904 and the virtual machine 232 on which the application 904 executes, to a policy engine, discussed above. Based on the received information and one or more security policies, the policy engine may determine whether the command or request should be pushed through to the GPU 900 and relays this determination to the graphics manager 902.

Figure 9B:
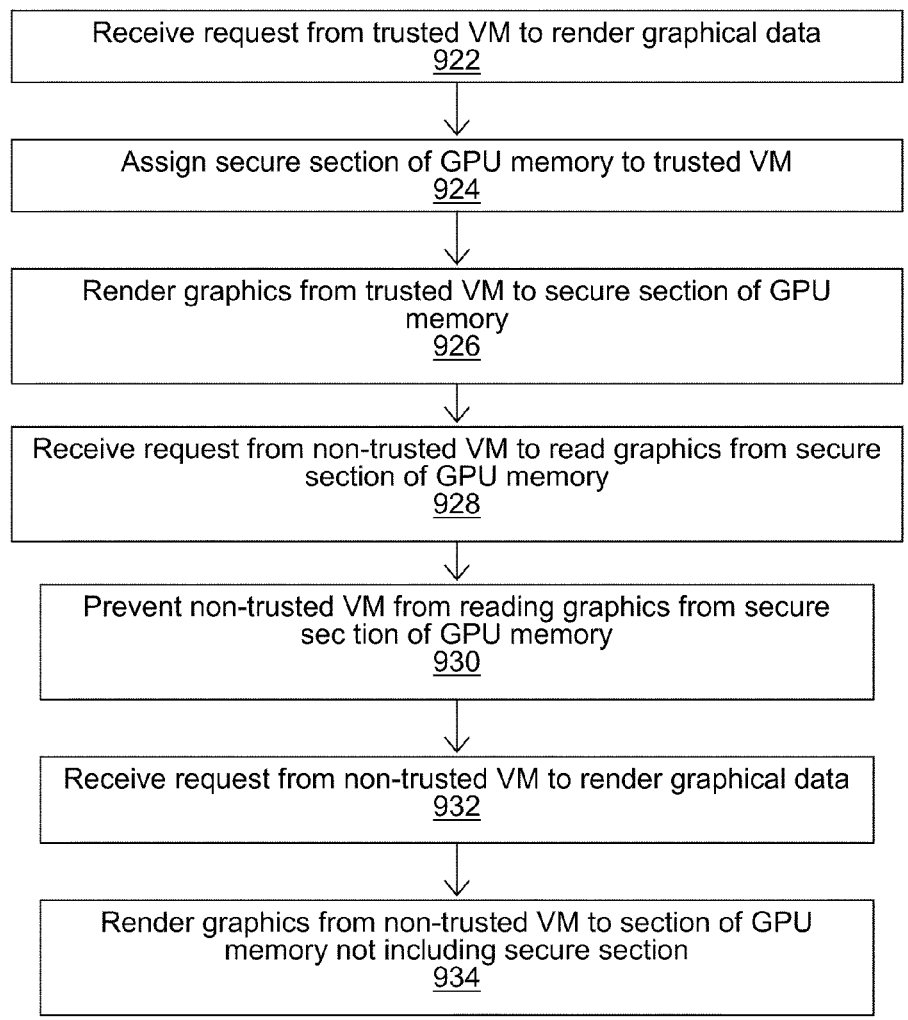
FIG. 9B is a flow chart of an embodiment of a method for preventing access to display graphics generated by a trusted virtual machine.

Illustrated in FIG. 9B is one embodiment of a method 920 for segmenting GPU 900 memory into an unsecure and secure section of memory. A graphics manager may receive a request, issued by a trusted virtual machine to the GPU, to render one or more graphics at step 922. The graphics manager may, at step 924, assign a secure section of GPU memory to the trusted virtual machine or an application of the trusted virtual machine. The graphics manager can then render the graphical data and store the rendered images in a secure section of the GPU memory at step 926.

At step 928, in some embodiments, the graphics manager may receive a request, issued from a non-trusted virtual machine to the GPU, requesting to read image data from the secure section of GPU memory. Upon receiving this request, the graphics manager can prevent the unsecure virtual machine from reading the secure section of memory at step 930. In some embodiments, at step 932, the graphics manager may receive a request from the non-trusted virtual machine to render graphical data. At step 934, the graphics manager may direct the GPU to render the graphics from the non-trusted virtual machine to a section of the GPU memory not including the secure section of memory.

Further referring to FIG. 9B and in more detail, in one embodiment the graphics manager may receive a request from a secure or trusted virtual machine to render graphics from graphics data at step 922. In some embodiments, the trusted virtual machine generates this request in response to a request issued by an application executing on the trusted virtual machine. For example, an application executing on the trusted virtual machine can generate graphics commands and graphical data. The application can issue a request to the guest operating system executing on the trusted virtual machine, asking the guest operating system to render graphics from the graphics commands and graphical data. In some embodiments, the guest operating system can forward this request to the control program 220 which can forward the request to the graphics manager. In one embodiment, the request can include the graphics data and graphics commands. In another embodiment, the request can be a request for access to the GPU. Although referred to as receiving a request, in many embodiments, requests to render graphical data are transmitted from the guest operating system or application on the virtual machine to the GPU, but are intercepted or redirected to the graphics manager.

In some embodiments, the graphics manager can partition the memory of the GPU to create a secure memory section at step 924. The graphics manager can segment, partition or otherwise assign a segment of the GPU memory as a secure section of the GPU memory. In some embodiments, the graphics manager can assign the trusted virtual machine a secure section of memory. Assigning the virtual machine a secure section of memory can include generating an entry in a database indicating that a particular range of memory addresses are assigned to the trusted virtual machine.

At step 926, in some embodiments, the GPU receives the graphics commands and graphics data from the graphics manager, renders graphics from this information and stores the rendered graphics in the secure section of the GPU memory. In one embodiment, the graphics manager, after segmenting or partitioning the GPU memory so that a portion of the memory is assigned to store graphics rendered from graphical data generated by a trusted virtual machine, passes the graphics information to the GPU. When passing the graphics information to the GPU, the graphics manager can also pass metadata or additional instructions instructing the GPU to render the images to the secure memory section of the GPU memory.

While FIG. 9B illustrates a method 920 that partitions or segments GPU memory, in other embodiments the method 920 can include partitioning or segmenting physical memory 216 assigned to the GPU. In still other embodiments, the graphics manager may not physically segment or partition the GPU memory, but rather assign a range of memory addresses to the trusted virtual machine. The memory address assignations can be stored in a database on the control virtual machine and can be accessed by the graphics manager. In other embodiments, the assigned memory addresses can be stored in any list, database or storage repository accessible by the graphics manager.

In some embodiments, the graphics manager can receive a request from a non-trusted virtual machine to read image data from the secure section of GPU memory at step 928. In response to this request, at step 930, the graphics manager may prevent the non-trusted virtual machine from reading the secure section of memory. In some embodiments, receiving the request to read image data from the secure section of the GPU memory can include intercepting a read request issued by an application executing on a non-trusted virtual machine, where the read request can be issued by the application to the GPU. Preventing the non-trusted virtual machine from reading the secure section of memory can include first analyzing security and/or access credentials of the non-trusted virtual machine. In some embodiments, the graphics manager prevents access after determining that the non-trusted virtual machine lacks the access rights or security credentials to read secure images. Upon determining that the non-trusted virtual machine lacks access rights, in some embodiments the graphics manager can return an error indicating that the memory location is unavailable. In other embodiments, the graphics manager can return data in another section of memory accessible by the non-trusted virtual machine. For example, in response to a print screen request issued by the non-trusted virtual machine, the graphics manager could return only those portions of the screen to which the non-trusted virtual machine has access. Thus, in some embodiments, the sections of the screen corresponding to the trusted virtual machine may be blacked out or otherwise deleted from the print screen image returned to the non-trusted virtual machine. Removing a section of the screen can include paging out the raster from the screen and checking the writes. In other embodiments, a stencil could be used to identify the pixels to which the non-trusted virtual machine has access, and drawing an image that includes only those pixels while the rest of the pixels are drawn a default color value.

In a further embodiment, at step 932, the graphics manager may receive a request from the non-trusted virtual machine to render graphical data. The graphics manager may receive the request in a similar manner to those discussed above with regard to receiving a request from the trusted virtual machine to render graphical data. In many embodiments, the graphics manager intercepts or receives the request via a redirection.

At step 934, responsive to receiving the request from the non-trusted virtual machine, the graphics manager may direct the GPU to render the graphics from the non-trusted virtual machine and store the rendered graphics to a section of the GPU memory not including the secure section partitioned off for the trusted virtual machine. This may be done to avoid graphics corruption, for example.

In one embodiment, both the non-trusted virtual machine and the trusted virtual machine have full access to the GPU. In many embodiments each virtual machine has the ability to reverse engineer the screen properties to figure out where to send pixels. However, through the methods and systems discussed herein, non-trusted virtual machines are unable to obtain access to graphics generated by trusted virtual machines.

J. Securing Sensitive Information Using a Hypervisor-Trusted Client

There exist many client-server systems where a client device provides sensitive user information to a server over a network. In many instances, these systems are vulnerable to security attacks via key-loggers, screen scrapers or other malware that can capture the sensitive information provided by the client device during a user session or while a user accesses resources and applications provided by the server. A client device or computer can capture and/or store sensitive user information such as passwords or other user-specific access information when a user requests to access information on a server. In some instances, a user can request access to corporate resources such as applications or desktops. The client device can capture password or other sensitive access information and present this captured information to a corporate computer along with a request for access to the desired resource. The corporate computer in turn can determine whether to permit the user to access the requested resource.

During these scenarios, the applications used to request access may execute within the context of a non-trusted operating system or may communicate over an unsecure or non-trusted network, e.g. a home computer, a kiosk, a user's personal computer, a mobile device, etc. Thus, the security of the user-provided information can be compromised by malware or other similar applications that can obtain sensitive information. Current solutions for reducing the risk of disclosing passwords or other secret information include end point scanning and remediation. One disadvantage of this approach is that it can take time for the scan and any necessary remediation to complete. The scan may also be limited in terms of the threats it can identify. Furthermore, remediation can lead to end user confusion.

Other solutions include using XENCLIENT published by Citrix Systems together with a separate enterprise controlled operating system and use that for access to enterprise resources. One advantage to this solution is that it enables off-line access to corporate resources, as they have effectively been downloaded into the trusted corporate image. A disadvantage, however, is that it requires a client side, corporate maintained image, and all the overheads and delays that result from getting it there. Furthermore, the client itself may not be secure.

Accordingly, one solution may involve using a trusted virtual machine image to control remote access to applications hosted by a remote presentation application. This application, in some embodiments, can be XENAPP published by Citrix Systems. In other embodiments, other remote presentation applications can be used.

When the user logs in or starts an application for accessing a device, e.g. CITRIX RECEIVER, the user may be asked to provide a password. In some embodiments, the password is needed to get a list of available applications, or access the Merchandizing Server and Delivery Services.

Instead of collecting the credentials itself through the traditional authentication plug-in, the application can call the hypervisor. In response, the hypervisor can start the authentication component. This component may show a window to collect credentials. Using virtualization technology for directed I/O (VT-D) pass-through, the hypervisor may display this window directly by writing to the video buffer, and the hypervisor may verify that the mouse and keyboard are connected to the hypervisor environment, rather than a non-trusted user image or virtual machine.

Credentials may be collected and can be stored in the secure environment of the hypervisor. These credentials may be transmitted to the server for authentication. The authentication server may return a set of capabilities, potentially one for each of the services that the application's plug-ins may need to access. In some embodiments, the hypervisor may pass all the non-sensitive capabilities to the application on the return call, but may keep the capability for the actual ICA connection.

Thus, in some embodiments, when the application detects the user wants to connect to an application on the server, the application may initiate or launch a proxy agent in domU or the user's non-trusted virtual machine. The proxy agent may communicate with a dom0 entity such as the hypervisor or a control virtual machine, and request launch of the remote client agent, e.g. an ICA application. The dom0 entity may start the client agent, responsive to this request. In some embodiments, the proxy agent may provide the client agent with information needed to initiate a connection to a remote application server, such as an IP address, server identification, or other non-sensitive information.

Once the client agent has established a communications session with the remote server, the client agent, executing in the trusted dom0 domain, may display its output by directly writing to the video buffer. This output may be placed so that it is visible in the same screen area as a window generated by the domU proxy agent occupies. However, a screenshot made in domU will not show the contents of the client agent's output window. In one embodiment, the client agent may display its output via a secure memory region of the GPU, as in the system discussed above with regard to preventing access to display graphics generated by a trusted virtual machine.

In many embodiments, the client agent and proxy agent may communicate with one another via either an ICA virtual channel, or using V2V communications or the systems discussed above for communication between a trusted virtual machine and a non-trusted virtual machine. The communications may allow the proxy agent executing in domU to indicate to the dom0 client agent when it is being given focus. Upon receiving focus, the dom0 client agent may obtain control over the keyboard and mouse. In one embodiment, this may be done using the systems and methods discussed above regarding injecting input data into a trusted virtual machine or a non-trusted virtual machine. Accordingly, keystrokes and mouse clicks, including passwords and other login credentials, can be fed to the server via the trusted dom0 entity, and remain invisible and inaccessible to applications in a domU virtual machine.

In some embodiments, when the user suspends the session, the client agent in dom0 may retain information about the session. In a further embodiment, no information may be retained by the domU proxy agent.

Figure 10A:
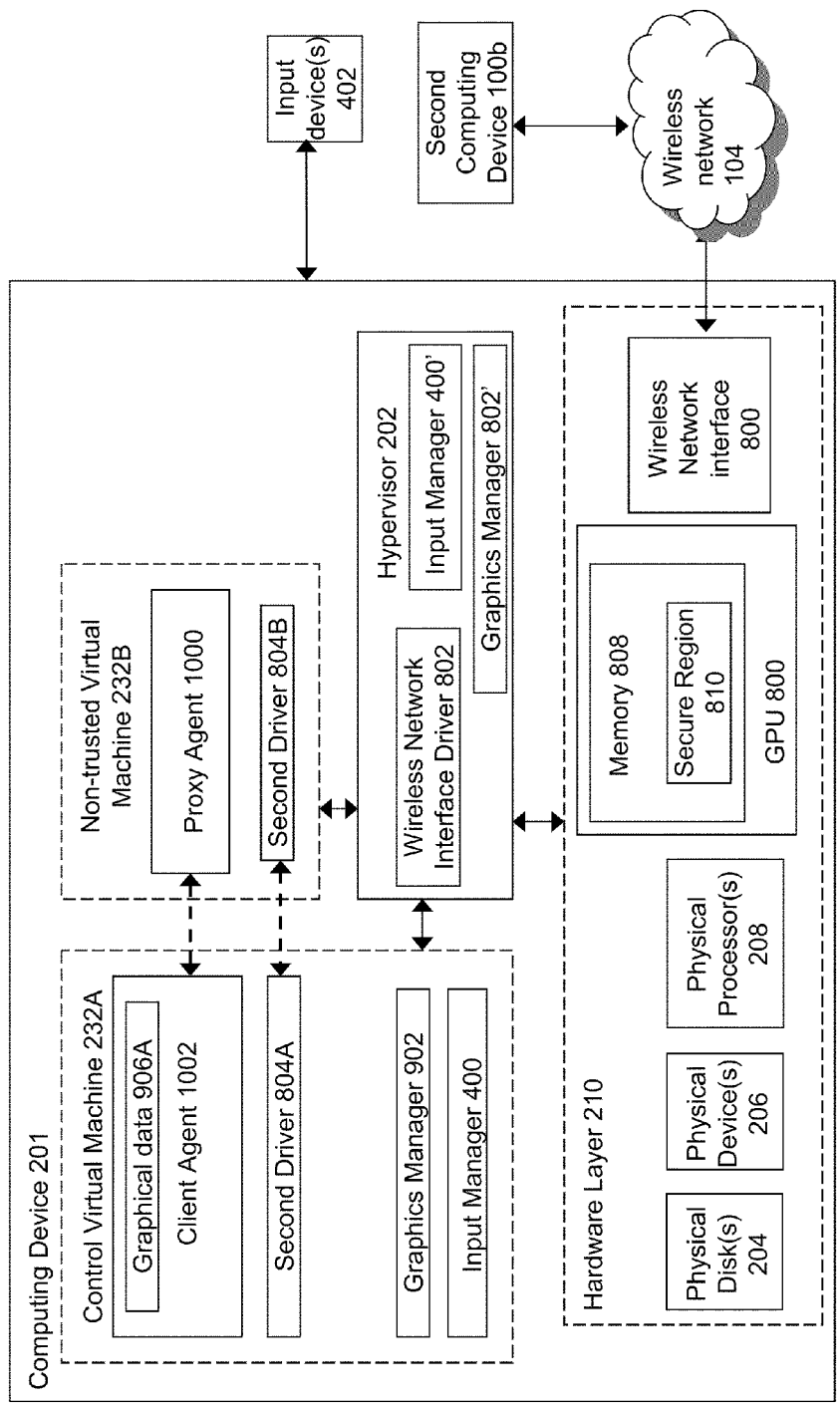
FIG. 10A is a block diagram of an embodiment of a system for securing sensitive information using a hypervisor-trusted client.

Referring briefly to FIG. 10A, illustrated is a block diagram of a system for securing sensitive information using a hypervisor-trusted client. In addition to features and elements discussed in more detail above, the system may include a proxy agent 1000 executed by a non-trusted virtual machine, and a client agent 1002 executed by a dom0 entity, such as a control virtual machine. Although illustrated on the control virtual machine, in many embodiments, the client agent 1002 may be executed by the hypervisor or an underlying operating system.

In some embodiments, the proxy agent 1000 may comprise an application, service, daemon, routine, function, or other executable code for initiating, responsive to a user request, a client agent 1002 in a trusted dom0 domain. The proxy agent 1000 may further comprise functionality for generating a proxy window in a screen region. As discussed above, such proxy window may occupy the same region of the screen as a window containing output data generated by the client agent. The proxy window may be behind, in a z-order, the output data, or may be in front of the output data but transparent. In many embodiments, generating the proxy window may be done to cause a guest operating system to create a taskbar button for the proxy window. Accordingly, a user of the guest operating system may cause the proxy window to gain focus by selecting its taskbar button, selecting the proxy window, using an operating system-provided application switcher, or via other means. When the proxy window obtains focus, the proxy agent 1000 may transmit a message to the client agent 1002, indicating that the proxy window has gained focus in the guest operating system, using any of the methods discussed above. Responsive to receiving the message, the client agent 1002 may move its output window forward in a z-order, unpause a paused connection, take control of a keyboard, mouse, or other input device, or perform other functions. Similarly, when the proxy window loses focus, such as from the user clicking on the window of another application in the guest operating system, the proxy agent 1000 may transmit a corresponding message to the client agent 1002 indicating the proxy window no longer has focus. Responsive to receiving such message, the client agent 1002 may pause the connection, move the output window back in a z-order, release control of the keyboard, mouse, or other input device to the guest operating system, or perform other such functions.

In many embodiments, the client agent 1002 may comprise an application, service, daemon, subroutine, function, logic, or other executable code for establishing a connection to a remote server and displaying graphical output data. In many embodiments, the client agent 1002 may comprise an ICA client or RDP client. In some embodiments, the client agent 1002 may provide functionality for obtaining user credentials, such as login information and passwords, and transmitting these credentials to the remote server. In a further embodiment, the client agent 1002 may encrypt the credentials prior to transmission.

Using the above systems, a user of a guest operating system executing on the non-trusted virtual machine may not be aware that the client agent is executing in a dom0 entity such as a control virtual machine or the hypervisor. By using the proxy window in the same location as the graphical output data presented by the client agent, the user may interact with the client agent as if it were executing on the guest operating system. However, sensitive information gathered by and presented by the client agent may remain inaccessible to the guest operating system or applications executed by the non-trusted virtual machine.

Figure 10B:
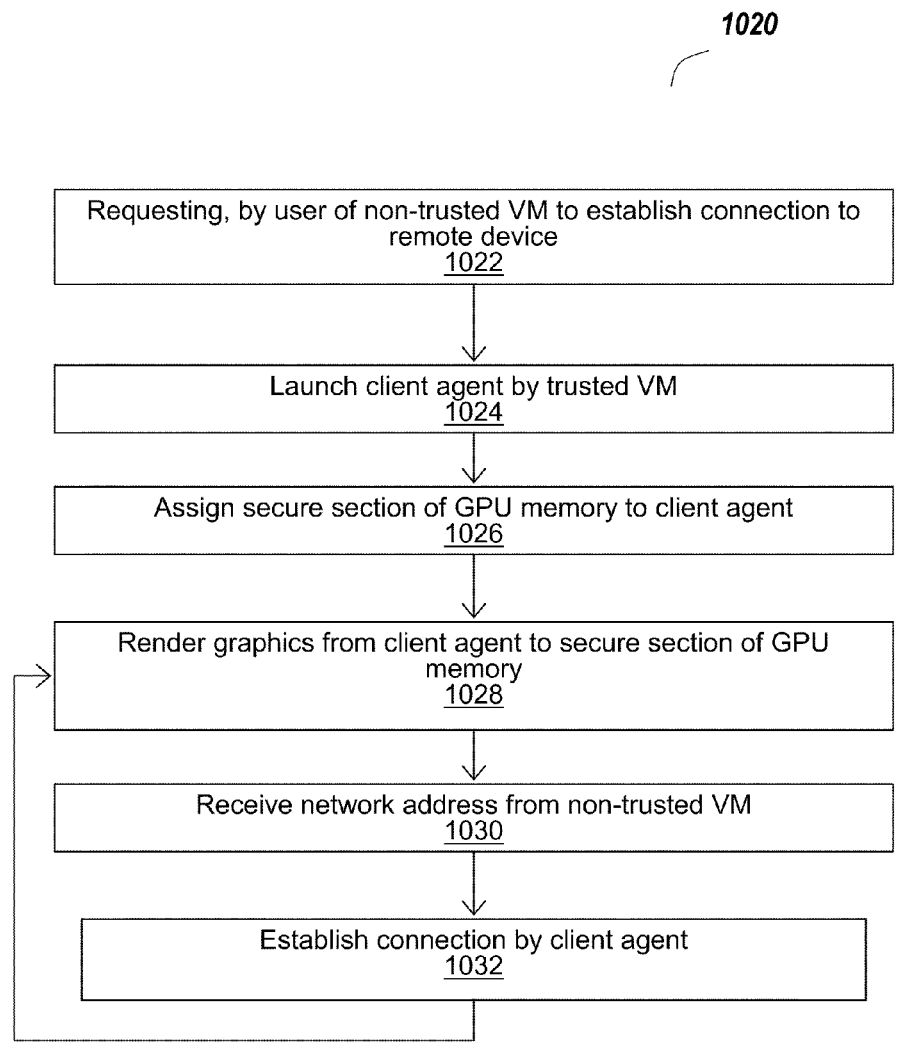
FIG. 10B is a flow chart of an embodiment of a method for securing sensitive information using a hypervisor-trusted client.

Referring now to FIG. 10B, illustrated is a flow chart of a method 1020 for securing sensitive information by using a hypervisor-trusted client. In brief overview, at step 1022, a user of a non-trusted virtual machine may request to establish a connection to a remote device, such as a remote application server. The non-trusted virtual machine or an operating system of the non-trusted virtual machine may launch a proxy agent. At step 1024, the proxy agent may request a trusted virtual machine, the hypervisor, or another dom0 entity to launch a client agent. At step 1026, in one embodiment, a graphics manager may assign a secure section of GPU memory to the client agent. In another embodiment, this step may be avoided by allowing the client agent to write directly to a video buffer using VT-D pass through. At step 1028, the client agent may render graphics to the secure section of GPU memory, or write directly to the video buffer. At step 1030, the client agent may receive a network address of the remote device from the non-trusted virtual machine. At step 1032, the client agent may establish a connection with the remote device using the received network address.

In some embodiments, the client agent may gather credentials from a user in a secure, trusted environment, by taking control of the user's keyboard and/or mouse or other input devices. For example, the client agent may receive this data through the methods discussed above regarding injecting input data into a secure virtual machine.

In one embodiment, the proxy agent may generate a window in the same screen location as the output data displayed by the client agent. The window may be behind the output data in a z-order, or may be in front and transparent. When the user of the guest operating system on the non-trusted virtual machine clicks on the window, or a taskbar button or other user interface element associated with the window, the proxy agent window may receive focus. Because this window is transparent or behind the client agent's graphics output data, the user may believe they're clicking on a window of an application executing on the remote device and displayed via the remote client agent. Accordingly, the user may interact with the remote application without realizing that the client agent is not executing within the guest operating system or non-trusted virtual machine.

Although discussed above in terms of virtual machines and guest operating systems, in many embodiments, the machine may execute only the one operating system in domU and the user may be unaware that a hypervisor is executing beneath the operating system. Accordingly, the user may be further unaware that the client agent is executing any other than within the domU operating system.

In some embodiments, the above methods and systems may be used to access applications or desktops no matter where they are hosted, including applications hosted on a server farm, in the enterprise, hosted service or in the cloud; desktops hosted on a server farm, in the enterprise, hosted service or in the cloud; applications hosted on a client side secure or trusted operating system via a trusted virtual machine; a whole desktop hosted on a client side secure or trusted operating system; or any other remote application or desktop.

In some embodiments, these methods and systems describe executing the application, e.g. the ICA client, inside an non-trusted image while connecting to applications served from a trusted image. By doing this, the application executing in the trusted image can be isolated from an unsecure or non-trusted users' environment.

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, floppy disk, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C#, PROLOG, or in any byte code language such as JAVA. The software programs may be stored on or in one or more articles of manufacture as object code.

Having described certain embodiments of methods and systems for providing seamless thumbnails for hosted applications, it will now become apparent to one of skill in the art that other embodiments incorporating the concepts of the invention may be used.

What is claimed:

1. A method for managing forwarding of input events in a virtualization environment to prevent keylogging attacks, comprising:

receiving, by an input manager executed by a processor of a computing device, a first item of input data from an input device communicating with the computing device; and identifying, by the input manager, whether the first item of input data includes a predetermined string;

forwarding, by the input manager, the first item of input data to:

(i) a trusted guest virtual machine executing in the virtualization environment responsive to identifying that the first item of input data includes the predetermined string and the predetermined string does not comprise a predefined control string, and a window generated by the trusted guest virtual machine does not have focus;

(ii) a non-trusted guest virtual machine executing in the virtualization environment responsive to identifying that the first item of input data includes the predetermined string and the predetermined string does not comprise the predefined control string, and the window generated by the trusted guest virtual machine has focus;

(iii) the trusted guest virtual machine responsive to identifying that the first item of input data does not include the predetermined string, and the window generated by the trusted guest virtual machine has focus;

(iv) the non-trusted guest virtual machine responsive to identifying that the first item of input data does not include the predetermined string, and the window generated by the trusted guest virtual machine does not have focus; and (v) a control virtual machine executing in the virtualization environment responsive to identifying that the first item of input data includes the predetermined string and the predetermined string comprises the predefined control string.

2. The method of claim 1, wherein the first item of input data includes a predetermined string comprising a secure key combination.

3. The method of claim 1, further comprising:

determining whether a window generated by an application executed by the trusted guest virtual machine has focus.

4. The method of claim 1, wherein forwarding the first item of input data to the control virtual machine comprises forwarding the first item of input data to an application executed by a hypervisor executing in the virtualization environment or the control virtual machine.

5. The method of claim 4, wherein forwarding the first item of input data to the application comprises providing, by the application, access to a management console, an authentication window or a secure input box.

6. The method of claim 4, wherein forwarding the first item of input data to the application comprises mapping the input device to the control virtual machine.

7. The method of claim 1, further comprising generating a visual indicator to indicate that the first item of input data is forwarded to the trusted guest virtual machine.

8. The method of claim 1, wherein receiving the first item of input data by the input manager comprises receiving the first item of input data by the input manager executed by the control virtual machine or a hypervisor executing in the virtualization environment.

9. The method of claim 1, further comprising notifying, by the trusted guest virtual machine, the input manager when the window generated by the trusted guest virtual machine receives focus.

10. A system for managing forwarding of input in a virtualization environment to prevent keylogging attacks, comprising:
a computing device comprising a processor executing a hypervisor, a control virtual machine, a trusted guest virtual machine, a non-trusted guest virtual machine, and an input manager in the virtualization environment; and
an input device communicating with the computing device, wherein the input manager is configured to:
receive a first item of input data from the input device,
identify whether the first item of input data includes a predetermined string, and
forward the first item of input data to:
(i) the trusted guest virtual machine responsive to identifying that the first item of input data includes the predetermined string and the predetermined string does not comprise a predefined control string, and a window generated by the trusted guest virtual machine does not have focus;
(ii) the non-trusted guest virtual machine responsive to identifying that the first item of input data includes the predetermined string and the predetermined string does not comprise the predefined control string, and the window generated by the trusted guest virtual machine has focus;
(iii) the trusted guest virtual machine responsive to identifying that the first item of input data does not include the predetermined string, and the window generated by the trusted guest virtual machine has focus;
(iv) the non-trusted guest virtual machine responsive to identifying that the first item of input data does not include the predetermined string, and the window generated by the trusted guest virtual machine does not have focus; and
(v) the control virtual machine responsive to identifying that the first item of input data includes the predetermined string and the predetermined string comprises the predefined control string.

11. The system of claim 10, wherein the first item of input data includes a predetermined string comprising a secure key combination.

12. The system of claim 10, wherein the input manager determines whether a window generated by an application executed by the trusted guest virtual machine has focus.

13. The system of claim 10, wherein the input manager forwards the first item of input data to the control virtual machine, comprising forwarding the first item of input data to an application executed by the hypervisor or the control virtual machine.

14. The system of claim 13, wherein the input manager forwards the first item of input data to the application, the application providing access to a management console, an authentication window or a secure input box.

15. The system of claim 10, wherein the input manager is further configured to generate a visual indicator to indicate that the first item of input data is forwarded to the trusted guest virtual machine.

16. The system of claim 13, wherein the computing device maps the input device to the control virtual machine.

17. The system of claim 10, wherein the input manager executes on the control virtual machine or the hypervisor.

18. The system of claim 10, wherein the input manager is notified by the trusted guest virtual machine when the window generated by the trusted guest virtual machine receives focus.

* * * * *